US012737768B2

(12) United States Patent
Abdelrahman et al.

(10) Patent No.: US 12,737,768 B2
(45) Date of Patent: Sep. 15, 2026

(54) DATA TRANSFER ACROSS LAYER 2 NETWORKS

(71) Applicant: U.S. Bank National Association, Minneapolis, MN (US)

(72) Inventors: Ahmed M. Abdelrahman, Dallas, TX (US); Samuel Assefa, Watertown, MA (US); Giacomo Domeniconi, Queens, NY (US); Christopher Swanson, Blaine, MN (US); Michael Villano, Laguna Niguel, CA (US)

(73) Assignee: U.S. Bank National Association, Minneapolis, MN (US)

(*) Notice: Subject to any disclaimer, the term of this patent is extended or adjusted under 35 U.S.C. 154(b) by 305 days.

(21) Appl. No.: 18/493,487

(22) Filed: Oct. 24, 2023

(65) Prior Publication Data

US 2024/0330935 A1 Oct. 3, 2024

Related U.S. Application Data

(60) Provisional application No. 63/492,770, filed on Mar. 28, 2023, provisional application No. 63/492,771, (Continued)

(51) Int. Cl.
*G06Q 20/40* (2012.01)
*G06F 9/54* (2006.01)
(Continued)

(52) U.S. Cl.
CPC ............ *G06Q 20/405* (2013.01); *G06F 9/54* (2013.01); *G06Q 20/4014* (2013.01); *G06Q 20/407* (2013.01)

(58) Field of Classification Search
CPC ............ G06Q 20/405; G06Q 20/4014; G06Q 20/407; G06F 9/54
See application file for complete search history.

(56) References Cited

U.S. PATENT DOCUMENTS 11,068,470 B2 7/2021 Keskar
11,151,276 B1 * 10/2021 Wang .................... G06Q 20/02
(Continued)

FOREIGN PATENT DOCUMENTS

CN 110633200 A 12/2019
CN 108234677 B 4/2021
(Continued)

OTHER PUBLICATIONS

Pajoo, Houshyar et al.; https://www.mdpi.com/1424-8220/21/3/772; entitled: Multi-layer blockchain-based security architecture for internet of things; published Jan. 24, 2021; 26 Pages.
(Continued)

*Primary Examiner* — Oleg Survillo
(74) *Attorney, Agent, or Firm* — Merchant & Gould P.C.

(57) ABSTRACT

A system for facilitating communication between layer 2 networks is disclosed. The system may include a first layer 2 network and a second layer 2 network. One or more of the first or second layer 2 network may include a communication platform that is configured to define a protocol for establishing communication between the first and second layer 2 network. Furthermore, based at least in part on the protocol, a bridge may be generated that communicatively couples the first and second layer 2 networks. In some embodiments, generating a bridge may include generating a smart contract to facilitate communication between the first and second layer 2 networks.

19 Claims, 23 Drawing Sheets

Related U.S. Application Data filed on Mar. 28, 2023, provisional application No. 63/492,773, filed on Mar. 28, 2023.

(51) Int. Cl.

| | |
|---|---|
| ***G06Q 20/06*** | (2012.01) |
| ***G06Q 20/38*** | (2012.01) |
| ***H04L 9/00*** | (2022.01) |
| ***H04L 9/32*** | (2006.01) |

(56) References Cited

U.S. PATENT DOCUMENTS 11,257,079 B2 2/2022 Kuchkovsky Jimenez et al.
11,281,660 B1 3/2022 Pike et al.
11,449,911 B2 9/2022 Fang et al.
11,880,809 B2 1/2024 Williams et al.
11,909,858 B1 2/2024 Hron, II et al.
12,259,970 B1 * 3/2025 Silva ..................... G06F 21/554
12,271,876 B2 4/2025 Yantis et al.
12,406,241 B2 9/2025 Yantis et al.
12,483,557 B1 * 11/2025 Ketharaju ............... H04L 63/10
2019/0034404 A1 1/2019 Anderson et al.
2019/0102850 A1 4/2019 Wheeler et al.
2019/0236594 A1 8/2019 Ehrlich-Quinn
2019/0236598 A1 8/2019 Padmanabhan
2019/0305958 A1 10/2019 Qiu
2019/0305966 A1 10/2019 Qiu
2020/0034469 A1 1/2020 Sato et al.
2020/0119905 A1 4/2020 Revankar et al.
2020/0125391 A1 4/2020 Lee et al.
2020/0133921 A1 4/2020 Lee et al.
2020/0250549 A1 8/2020 Kikinis
2020/0278958 A1 * 9/2020 Zhang ................ G06Q 20/3678
2020/0401573 A1 12/2020 Coleman
2021/0019737 A1 * 1/2021 Vladi ..................... G06Q 20/02
2021/0103603 A1 4/2021 Iftemi
2021/0241273 A1 8/2021 Abad et al.
2021/0243011 A1 * 8/2021 Amin ................... G06Q 20/385
2021/0248594 A1 8/2021 Yantis et al.
2021/0311925 A1 10/2021 Tian
2021/0319432 A1 10/2021 Yantis et al.
2021/0319433 A1 10/2021 Yantis et al.
2021/0342836 A1 11/2021 Cella et al.
2021/0357195 A1 11/2021 Zhu et al.
2022/0156725 A1 * 5/2022 Iwama ............... G06Q 20/3676
2022/0222245 A1 * 7/2022 Pezeshki ............. G06F 16/2379
2022/0292268 A1 9/2022 Shillingford et al.
2022/0318399 A1 10/2022 Rodler et al.
2022/0327529 A1 10/2022 Williams
2022/0366494 A1 11/2022 Cella et al.
2023/0004423 A1 1/2023 Fatahi et al.
2023/0006976 A1 1/2023 Jakobsson et al.
2023/0018175 A1 1/2023 Kaplan et al.
2023/0072988 A1 3/2023 Mathews et al.
2023/0186262 A1 6/2023 Busch
2023/0208869 A1 6/2023 Bisht et al.
2023/0224306 A1 7/2023 Singh
2023/0237482 A1 7/2023 Ramaswamy et al.
2023/0289724 A1 * 9/2023 Halbfinger ........... G06Q 10/087
2023/0334470 A1 10/2023 Beller et al.
2023/0362010 A1 11/2023 Reeve et al.
2023/0367788 A1 * 11/2023 Grant ...................... G06F 16/27
2023/0376949 A1 * 11/2023 Filter ................. G06Q 20/1235
2023/0384967 A1 * 11/2023 Singh ..................... G06N 20/00
2023/0403288 A1 12/2023 Bakshi et al.
2024/0029034 A1 1/2024 Bakshi et al.
2024/0029183 A1 1/2024 Bakshi et al.
2024/0031159 A1 1/2024 Bakshi et al.
2024/0089128 A1 3/2024 Vialar et al.
2024/0185191 A1 6/2024 Bernardi
2024/0202679 A1 * 6/2024 Mayerchak ............... H04L 9/50
2024/0202846 A1 * 6/2024 Wang ..................... G06Q 50/16
2024/0267412 A1 8/2024 Banerjee et al.
2024/0289802 A1 8/2024 Mendez Viera
2024/0330080 A1 10/2024 Abdelrahman et al.
2024/0330927 A1 10/2024 Abdelrahman et al.
2024/0333741 A1 10/2024 Abdelrahman et al.
2024/0394705 A1 11/2024 Abdelrahman et al.
2025/0392483 A1 12/2025 Fiebrink et al.

FOREIGN PATENT DOCUMENTS

CN 112926968 A 6/2021
IN 202211022588 4/2022
WO 2020195639 A1 10/2020
WO 2020243961 A1 12/2020
WO 2023144770 A2 8/2023

OTHER PUBLICATIONS

Dibouliya, Ashish; https://www.irjet.net/archives/V9/112/IRJET-V911247; entitled: Design of a Hybrid Authentication Technique for User and Device Authentication for an integrated IOT environment using Blockchain Authentication and Artificial Intelligence; published Dec. 12, 2022; 10 Pages.

Friedman, Nat; Blog Engineering, entitled: Introducing GitHub Copilot: your AI pair programmer; published Jun. 29, 2021; 8 Pages.

Augur Turbo—Contract API; Last Access Date Oct. 10, 2023; 6 Pages.

Peterson, Jack; Forecast Foundation; entitled: Augur: a Decentralized Oracle and Prediction Market Platform; Dated Jul. 12, 2018; 19 Pages.

Office Action issued in U.S. Appl. No. 18/493,572 on Dec. 18, 2024.

* cited by examiner

DATA TRANSFER ACROSS LAYER 2 NETWORKS

CROSS-REFERENCE TO RELATED APPLICATIONS

The present application claims priority from U.S. Provisional Patent Application No. 63/492,770, filed on Mar. 28, 2023, U.S. Provisional Patent Application No. 63/492,771, filed on Mar. 28, 2023, and U.S. Provisional Patent Application No. 63/492,773, filed on Mar. 28, 2023: the disclosures of which are hereby incorporated by reference in their entireties.

BACKGROUND

Smart contracts encompass a set of digital instructions designed for execution within a distributed ledger network, such as a blockchain network. These self-executing contracts facilitate customizable procedures tailored to the specific needs and requirements of the parties involved in the transaction. By embedding the agreed-upon terms into a programmable format, smart contracts can be executed automatically by the distributed ledger system without the need for intermediaries.

Typically, a skilled programmer or specialist creates the smart contract by programing the contractual terms and conditions in a manner that is compatible with and executable by a distributed ledger network. Once deployed to the distributed ledger network (e.g., a blockchain network), smart contracts are typically immutable, meaning that they cannot be altered or modified after their initial implementation. This immutability serves to bolster the trust and security of the transactions facilitated by the smart contract.

However, despite their numerous advantages, smart contracts may be susceptible to hacking attacks or unintended outcomes due to flaws in logic design or programming errors. Ensuring the robustness and security of smart contract code can mitigate these vulnerabilities and maintain the integrity of transactions within the distributed ledger network.

Still further, distributed ledger networks may include both on- and off-blockchain solutions. To effectively implement an off-blockchain solution, some type of interface is created to define a way to transfer transaction records between that off-blockchain solution and the blockchain or another off-blockchain solution. Such interfaces, or bridges, define a protocol for transaction transfer (e.g., by locking an existing transaction in one chain or solution) and minting an equivalent in the destination chain or solution. These bridges are high-value targets for hacking or malfeasance, especially for those used to transfer high-value assets.

SUMMARY

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

In a first aspect, a system for facilitating communication between layer 2 networks is disclosed. The system comprises a first layer 2 network comprising a first layer 2 solution, a first bridge coupling the first layer 2 solution with a layer 1 blockchain, and a layer 2 communication platform: a second layer 2 network comprising a second layer 2 solution and a second bridge coupling the second layer 2 solution with the layer 1 blockchain: wherein the layer 2 communication platform is configured to: define a protocol for establishing communication between the first layer 2 network and the second layer 2 network; and based at least in part on the protocol, generate a third bridge coupling the first layer 2 network and the second layer 2 network.

In a second aspect, a method for enabling communication between layer 2 networks is disclosed. The method comprises identifying an external layer 2 network: defining a protocol for establishing communication between an internal layer 2 network and the external layer 2 network, wherein the internal layer 2 network includes a first layer 2 solution communicatively coupled with a layer 1 blockchain, and wherein the external layer 2 network includes a second layer 2 solution communicatively coupled with the layer 1 blockchain; and based at least in part on the protocol, generating a bridge coupling the first layer 2 solution and the second layer 2 solution.

In a third aspect, a platform for enabling communication between layer 2 networks is disclosed. The platform comprises a processor; and memory: wherein the memory stores instructions that, when executed by the processor, cause the platform to: identify an external layer 2 network: define a protocol for establishing communication between an internal layer 2 network and the external layer 2 network, wherein the internal layer 2 network includes a first layer 2 solution communicatively coupled with a layer 1 blockchain, and wherein the external layer 2 network includes a second layer 2 solution communicatively coupled with the layer 1 blockchain; and based at least in part on the protocol, generate a bridge coupling the first layer 2 solution and the second layer 2 solution.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
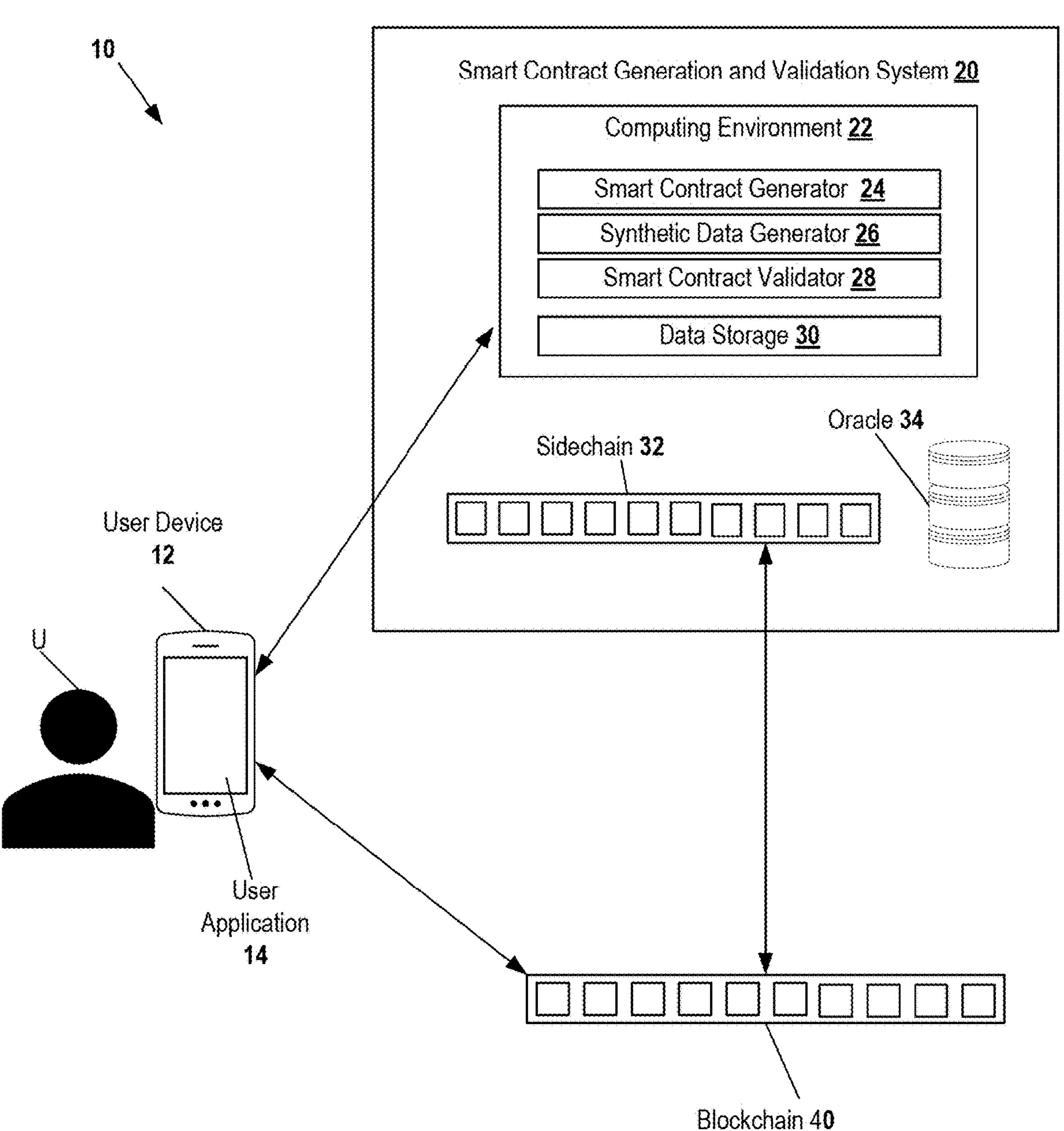
FIG. 1 illustrates an example environment for a smart contract generation and validation system, in accordance with some embodiments of the present disclosure.

Reference will now be made in detail to exemplary aspects of the present disclosure that are illustrated in the accompanying drawings.

In general, this application includes systems and methods for generating, validating, and optimizing, smart contracts. In example applications, such smart contracts may be used to implement various decentralized finance and/or recordkeeping infrastructure features: examples may include interfaces between different blockchains, such as cross-chain bridges, as well as transaction monitors and the like. In such embodiments, mechanisms leveraging an artificial intelligence system may be used to create and validate smart contracts using synthetically created data. Such an approach, using generative artificial intelligence systems and smart contracts, may be used to create, recreate, clone, and destroy cross-chain bridges on demand to enhance cross-chain security and optimize operations are also provided.

Smart contracts, which can implement self-executing contracts with terms of agreement directly reflected in executable code, may be used in a variety of contexts. For example, smart contracts may be utilized in financial services contexts to create and manage tokens used in decentralized finance scenarios, such as coin offerings or token generation events. Smart contracts may also be used in the context of automated execution of trades in derivatives and/or prediction markets. Of course, financial system applications are only one possible implementation of smart contracts and a smart contract generation and management infrastructure such as disclosed herein. Records management in the context of insurance contracts and automated claims resolution, healthcare, energy, or other governmental recordkeeping, may be implemented using smart contracts as well. Accordingly, although particular examples are described herein that relate to use of smart contracts as defining monitoring and/or interfaces among different blockchain systems are described, it is recognized that this represents only some of the possible implementations of the techniques described herein.

In several of the particular aspects described, generative artificial intelligence and/or deep learning technologies are leveraged. For example, smart contracts may be utilized to implement interfaces, such as bridges, between layer 2 networks. Layer 2 networks generally refer to off-blockchain networks or systems built on top of a blockchain that may be used to extend the capabilities of an underlying base network (also generally referred to as a layer 1 network). In further aspects, such bridges or other blockchain structures may be monitored using artificial intelligence systems to determine when and how to perform the creation, cloning, and destruction of cross-chain bridges.

I. Smart Contract Generation and Validation

In some aspects, systems and methods for generating and validating smart contracts are disclosed. In some embodiments, a smart contract is validated using synthetic data. In some embodiments, artificial intelligence (AI) is leveraged to create, validate, and optimize smart contracts before deploying the smart contract on a distributed ledger. In some embodiments, generative AI, deep learning, or combinations thereof are used to create the smart contract logic and design. In some embodiments, the generative AI implemented as a language model is used.

A language model is artificial intelligence configured to produce output based on language. Example language models include Markov models, neural networks, models based on transformers, large language models, among others. In many examples, the language model is a probabilistic model that produces text output based on an input prompt and data on which the model has been trained. In examples, the model represents language in an embedding space (e.g., using an embedding function, such as word2vec) to facilitate operations that produce useful output from the model. The phrase "large language model" is often used to describe language models that have been trained on "large" data sets. Currently, large language models often have more than seven billion parameters, with some having on the order of tens or even hundreds of billions of parameters. Examples of large language models include GPT-4 by OPENAI, PALM by GOOGLE, LLAMA by META, and CLAUDE by ANTHROPIC. Language models and especially large language models are often trained on a corpus of data and then fined tune for specific applications (e.g., to answer questions or respond to prompts in a particular way) and aligned (e.g., specifically trained to not produce inappropriate output).

An advantage of the smart contract generation, validation and/or optimization process described herein includes improved security for the smart contract, thereby making the smart contract less vulnerable to hacking attacks. Additional advantages of systems and methods disclosed herein include improving logic and code design, resulting in more efficient smart contracts being executed on the distributed ledger. For example, requiring less processing during execution and/or memory usage.

In one non-limiting embodiments, an AI system is trained to create optimized and secure smart contracts. The AI system uses generative AI configured to receive smart contract text-based documents as input and provide more optimized and secure smart contract computer code as output. In an example, the output is configured to be executed on a distributed ledger network (e.g., such as a blockchain network).

In some embodiments, the smart contracts are evaluated and/or validated using synthetic data. In some embodiments, the synthetic data is generated using a language model In some embodiments, a generative AI system creates a dataset that is used as seed data for a synthetic data engine which produces a larger dataset to simulate a large number of interactions and hacking scenarios. In some embodiments, the synthetic data can simulate millions of interactions and hacking scenarios.

In this application, reference is made to certain data as being "synthetic". Synthetic data can be distinguished from "natural" data based on the process or context by which the data aspect being described is formed. For instance, synthetic data can be characterized as arising from an artificial process or in a context that is not "real world" data even if the synthetic data is meant to mimic real world data.

FIG. 1 illustrates an example environment 10 for a smart contract generation and validation system 20, in accordance with some embodiments of the present disclosure. The environment 10 includes a user device 12 operating at least one user application 14 to interface with one or both of the system 20 and a blockchain 40 via a network (e.g., via a connection to a public network, such as the Internet). Also shown in FIG. 1 is a user U.

The user device 12 is a computing device operated by the user U. Examples of the user device 12 include laptops, desktops, smart phones, tablets, or other personal computing devices. In some embodiments, the computing environment 22 includes the components and functionality of the computing environment 1600, as illustrated and described in FIG. 22. The user device 12 operates at least one user application 14 to interface with one or both of the computing environment 22 of the system 20 and the blockchain 40, among other systems. In some embodiments, the user application 14 is provided by, or on behalf of, an entity which manages the smart contract generation and validation system 20. Many user applications can be configured to interface and interact with the blockchain 40. In some embodiments, the user U may be a customer that access the blockchain 40 via the user device 12 and an authenticated interface. The user device 12 may also interact with the internal sidechain 32 via transactions.

The smart contract generation and validation system 20 is configured to generate optimized and validated smart contracts. In some embodiments, the user U sends a request to generate a smart contract from the user device 12 to the smart contract generation and validation system 20, which generates, validates, and deploys a smart contract based on a desired functionality of the requesting user. The smart contract generation and validation system 20 includes a computing environment 22, an internal sidechain 32, and an oracle 34.

The computing environment 22 may comprise one or more computing devices which provide the smart contract generation and validation services described herein. In some embodiments, the computing environment 22 includes the components and functionality of the computing environment 1600, as illustrated and described in FIG. 22. In the example shown, the computing environment 22 includes subsystems for a smart contract generator 24, a synthetic data generator 26, and a smart contract validator 28. Other subsystems can also be included, such as different combinations of the foregoing subsystems. Such subsystems may be implemented using separate logical or physical computing components executable on a computing infrastructure such as is described below. For instance, the generators 24, 26 and validator 28 can be implemented as applications running on the computing environment 22 by the execution of instructions by one or more processors of the computing environment 22.

Figure 23:
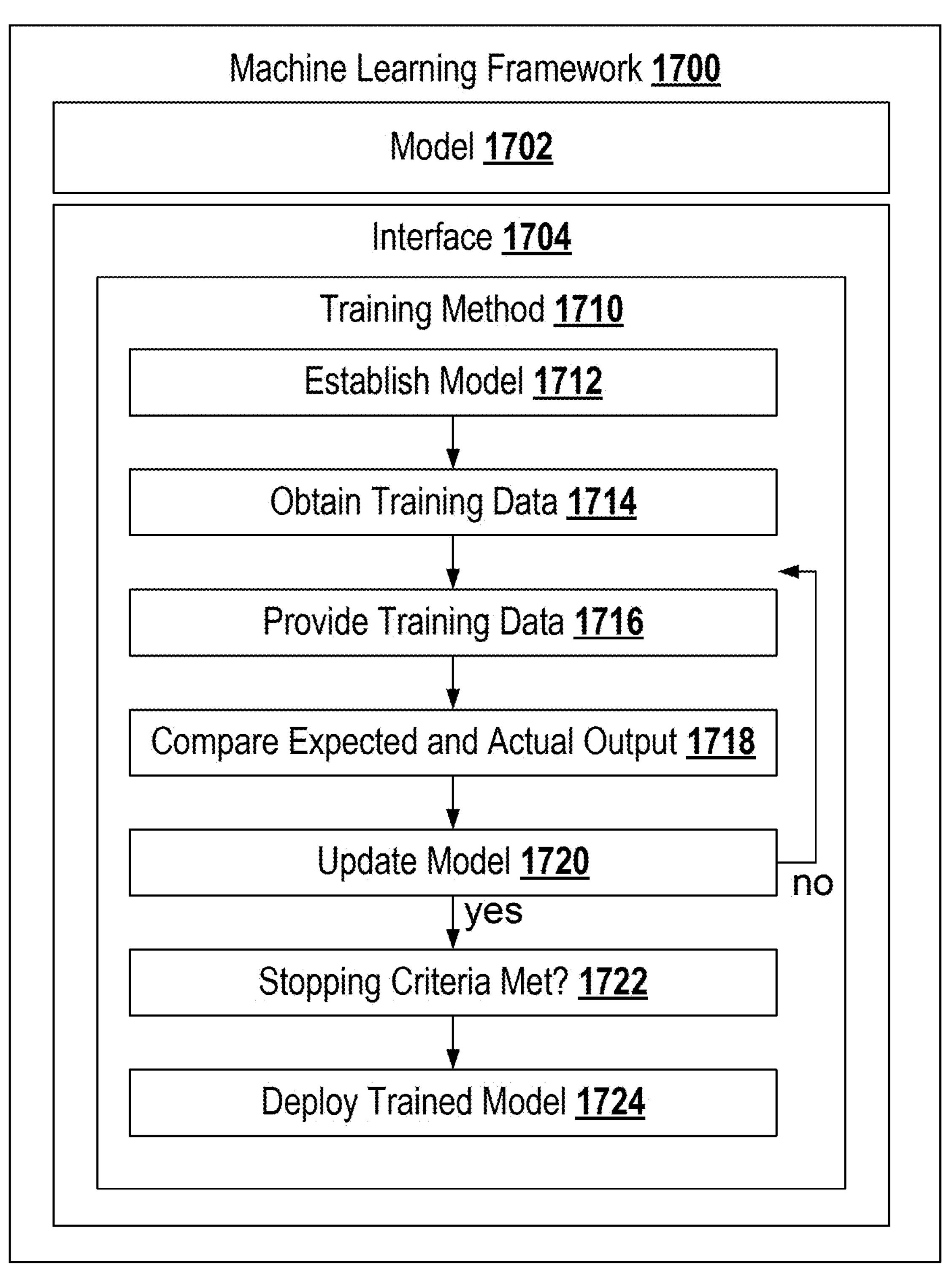
FIG. 23 illustrates an example machine learning framework, in accordance with some embodiments of the present disclosure.

In example embodiments, the smart contract generator 24 processes inputs to generate a smart contract according to a received request. An example method 50 for generating a smart contract is illustrated and described in FIG. 2. In some embodiments, the smart contract generator 24 uses AI technology to generate the smart contract, such as one or more language models. Other machine learning and deep learning frameworks and technology can also be used. An example machine learning framework 1700 is illustrated and described in FIG. 23.

The synthetic data generator 26 processes inputs to generate data for validating the smart contract code generated by the smart contract generator 24. In some embodiments, AI technology is used to generate the synthetic data. In some examples, the AI technology includes a large language model. Other deep learning and machine learning frameworks and technology can also be used.

The smart contract validator 28 validates the smart contract code generated by the smart contract generator 24 with the test data generated at the synthetic data generator 26. The smart contract validator 28 validates that the smart contract code runs correctly in various scenarios caused by interactions with the smart contract.

Figure 3:
FIG. 3 illustrates an example method for validating a smart contract, in accordance with some embodiments of the present disclosure.
Figure 3:
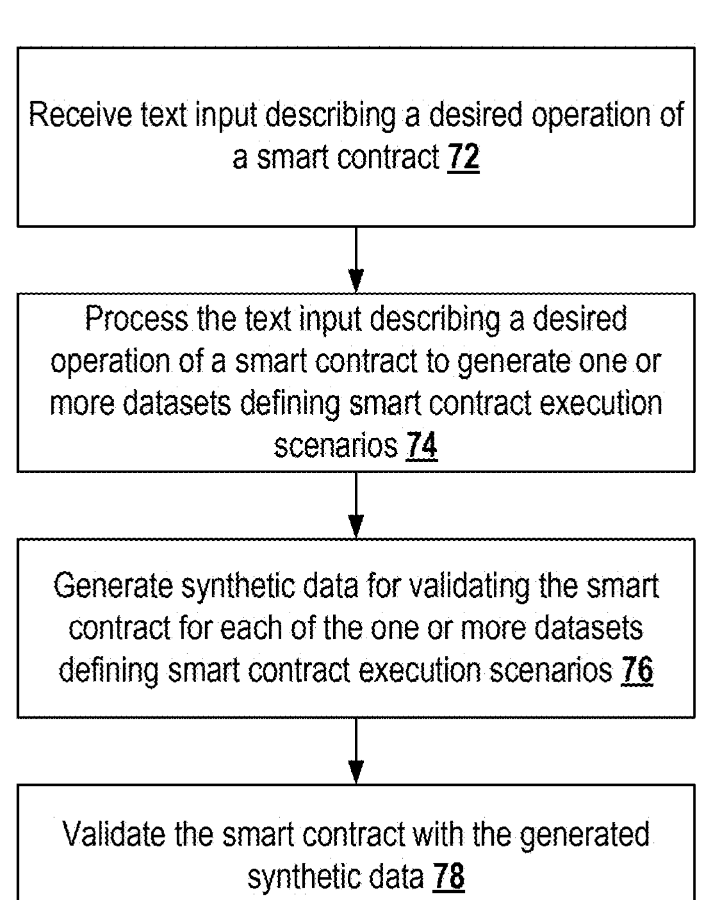

An example method for generating synthetic data (e.g., by the synthetic data generator 26) and validating a smart contract (e.g., via the smart contract validator 28) is illustrated and described in reference to FIG. 3.

The data storage 30 stores data for the smart contract generation and validation system 20. In some embodiments, the data stored includes customer data, model variables, example smart contract code (e.g., used to train one or more models to generate/validate a smart contract), etc. In examples, the data storage 30 stores instructions that, when executed, cause performance of operations described herein.

The sidechain 32 is a chain associated with or connected to a primary chain, such as the blockchain 40, and can operate with its own consensus rules (e.g., unique from an associated blockchain 40), transaction types, and token economics relative to the blockchain 40. The sidechain 32 may parallel a primary associated blockchain 40 in one or more respects. In the example shown, the sidechain 32 is an internal sidechain managed and/or orchestrated by an entity and is communicatively coupled to the main blockchain 40 to access information or data that is not available within the sidechain 32. As such, the sidechain 32 may be referred to herein, in some instances, as an internal sidechain, as it is not decentralized, but instead is managed by an individual entity. However, other types of sidechains may be used as well. Such sidechains may generally be referred to as layer 2 blockchain solutions or layer 2 solutions, and represent one example of such a layer 2 solution.

In the example shown, the sidechain 32 may register a variety of transactions by users, including the user U, as well as transactions bridged to the sidechain 32 from the main blockchain 40. In some examples, the sidechain 32 may be used to process transactions of smart contracts, for example to approve smart contract-based transactions that are preformed separately from the blockchain 40.

The oracle 34 is a mechanism for the sidechain 32 to access information from external sources and or the data storage 30, to the extent such other data is not natively available on the sidechain 32. In various embodiments, the oracle 34 can be implemented in a variety of ways, depending on the specific needs of the sidechain 32. For example, the oracle 34 may be configured to obtain data from trusted third-party data sources and/or decentralized data feeds to ensure accuracy and integrity of obtained data, and may provide additional descriptive information that may be relevant to a smart contract maintained on the sidechain 32 for example related to a transaction that may not be obtained directly as part of the transaction itself.

The blockchain 40 is, in the example shown, an electronic, decentralized ledger. In some examples, transactions or data records, referred to as "blocks", are cryptographically linked and secured in a linear, chronological order to form a continuous chain. Each block typically contains a cryptographic hash of the previous block, a timestamp, and transaction data. This design inherently resists data modification as altering any singular block would necessitate changes in all subsequent blocks, thereby making any tampering evident. In some examples, Blockchain systems utilize a consensus mechanism to ensure that all participants in the network agree on the validity of the transactions. Once a block has been added to the blockchain, it is typically immutable, meaning that its data cannot be altered without altering all subsequent blocks, which requires consensus of the majority of the network. This ensures that a blockchain retains a verifiable and permanent record of all transactions that have taken place. Examples of blockchain networks include Ethereum and Bitcoin.

In some embodiments, an entity, for example an enterprise entity, manages portions of the environment 10. In some embodiments, the enterprise may develop and manage the user application 14. In some embodiments, the enterprise develops, manages, and/or is responsible for a layer 2 blockchain solution. In some embodiments, the enterprise uses a smart contract generation and validation system as described herein to automate or partially automate business logic of the enterprise and/or of customers of the enterprise.

Figure 2:
FIG. 2 illustrates an example method for generating a smart contract, in accordance with some embodiments of the present disclosure.
Figure 2:
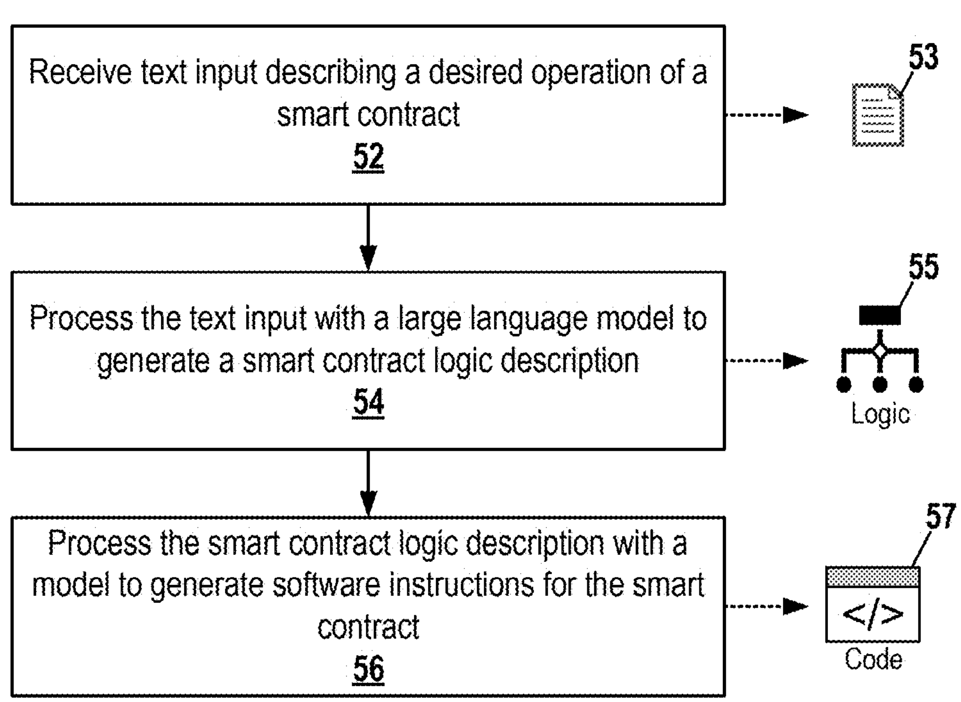

FIG. 2 illustrates an example method 50 for generating a smart contract, in accordance with some embodiments of the present disclosure. In some embodiments, the method 50 is performed using the smart contract generation and validation system 20. In some embodiments, the method 50 is implemented as instructions that are executed within a computing environment 22 as part of the smart contract generator 24. The method 50 includes the operations 52, 54, and 56.

As a specific example, a user may want to create a prediction market smart contract corresponding to whether the month of January will be snowier than average in Minnesota.

In the example shown, operation 52 includes receiving text 53 in the form of text input describing a desired operation of a smart contract. In some examples, the text 53 instructions for intended function and/or operation of the smart contract on a requested distributed ledger. The text 53 can include a description (e.g., prompt) of desired features of the smart contract and/or external documents. In some embodiments, the text input includes documentation defining requested functionality of the smart contract. In some embodiments, the text 53 includes business logic documentation. External documentation inputs can outline any business/economic logic which can be converted into smart contract code. In some embodiments, at least some of the text 53 is received from a speech-to-text system in communication with a user via a microphone picking up the voice of the user and converting the voice to at least a portion of the text-based prompt. In some embodiments, the text 53 indicates what blockchain network the smart contract is to operate on. In some embodiments, the text 53 indicates whether the smart contract is for deployment on one or both of a layer 1 blockchain and a layer 2 blockchain. In some instances, the text 53 is validated to determine whether adequate information is received from the user. In an example, this is determined following operation 54. In another example, a large language model is provided the text 53 as part of a prompt that asks what more information should be obtained before generating a smart contract using this input. The resulting answer can then be used to prompt the user to provide more information about the smart contract. This can improve the reliability of downstream products.

Continuing the specific example, the system may receive text 53 from a user over a web form that states: "I want to create a prediction market smart contract for whether this January will be snowier than average in Minnesota". The system may process this text 53 and determine that more information would be beneficial. The system may then ask the user to provide information regarding, for example, where specifically should the snowfall be determined, what blockchain should be used for the contract, and what specific number should be used as the average snowfall. The system may then receive updated text 53 from the user that states: "I want a prediction market smart contract published on the Ethereum network. The prediction should be whether the total amount of snowfall reported by the Minneapolis-Saint Paul Airport for January 2024 will exceed twelve inches".

In the example shown, operation 54 includes processing the text 53, for example with a large language model to generate a smart contract logic description, shown as logic description 55. The smart contract logic description represents a conversion of the input logic described in the text 53 into smart code logic, e.g., such illustrating example logic paths as would be executed on the blockchain in response to different conditions. In some embodiments, the smart contract logic description includes a flow (e.g., in text or visual form, such as a flow chart) describing the intended function and/or operation of the smart contract. In some embodiments, the large language model is part of a generative AI system. In some instances, the logic description 55 is not an executable smart contact. The logic description 55 may be an intermediary between the text 53 and executable smart contract code. The logic description 55 can be pseudocode or algorithmic description.

Continuing the snowfall smart contract example, the resulting logic 55 can describe such operations as steps and components necessary for: creating the contract, escrowing funds, supporting third party interactions with the contract (e.g., creating, providing, and settling shares in the outcome of the contract), handling reported outcomes (e.g., procedures for checking an outcome, handling disputes of the outcome, and validating the outcome), reporting a status of contract, other components, or combinations thereof.

In the example shown, operation 56 includes processing the smart contract logic description with a model to generate software instructions for the smart contract, for example shown as code 57. In some embodiments, a model separate from the large language model processes the smart contract logic output from the operation 54 to generate optimized smart contract code. In some embodiments, this model is trained using a large volume of optimized smart contract code in order to generate highly secured and optimized smart contract code. For example, the model may be trained using complementary sets of logic descriptions and corresponding software instructions such that, given a particular set of smart contract logic, the model may generate software instructions therefrom. The code can be in any of a variety of acceptable programming languages or formats depending on the blockchain for which the contract is to be used. In an example, the programming language is SOLIDITY.

Continuing the snowfall smart contract, the code may be code expected to implement the aspects of the contract described in the logic 55.

In some embodiments, the model is part of a deep learning system. In other embodiments, the large language model used for the operation 54 to generate the smart contract logic description also generates the software instructions for the smart contract at the operation 56. The smart contract code is configured to be able to be deployed on a desired blockchain (e.g., Bitcoin or Ethereum) and/or sidechain, layer-2 chain, etc., depending on the inputs at the operation 52.

In some examples, a same prompt for the large language model generates both the logic description 55 and the code 57. For example, the prompt may ask the large language model to generate a logic description and then use the logic description to generate smart contract code. While the above operations 54, 56 generally refer to single models and single rounds of prompt-response, an ensemble approach with or without multiple rounds may be used. For instance, adversarial models may be used. A model may generate the logic and then the same or a different model may be prompted to identify flaws or improvements in the resulting logic description 55 or code 57. Those identified flaws or improvements may then be used to generate new output that is an improvement beyond the original output. In another example, multiple different models or even the same model may be used to generate multiple outputs (e.g., logic descriptions 55 or code 57). The same or different models may then vote for a best output, where best is defined in any of a variety of useful ways (e.g., most accurate, most complete, fewest errors, etc.). In addition or instead, the output may be fed into another model tasked with combining different outputs (or different prompts used to produce such outputs) to produce a new output or prompt that can then be used further. In such a way, an evolutionary approach to input or output can be used to refine results.

Figure 4:
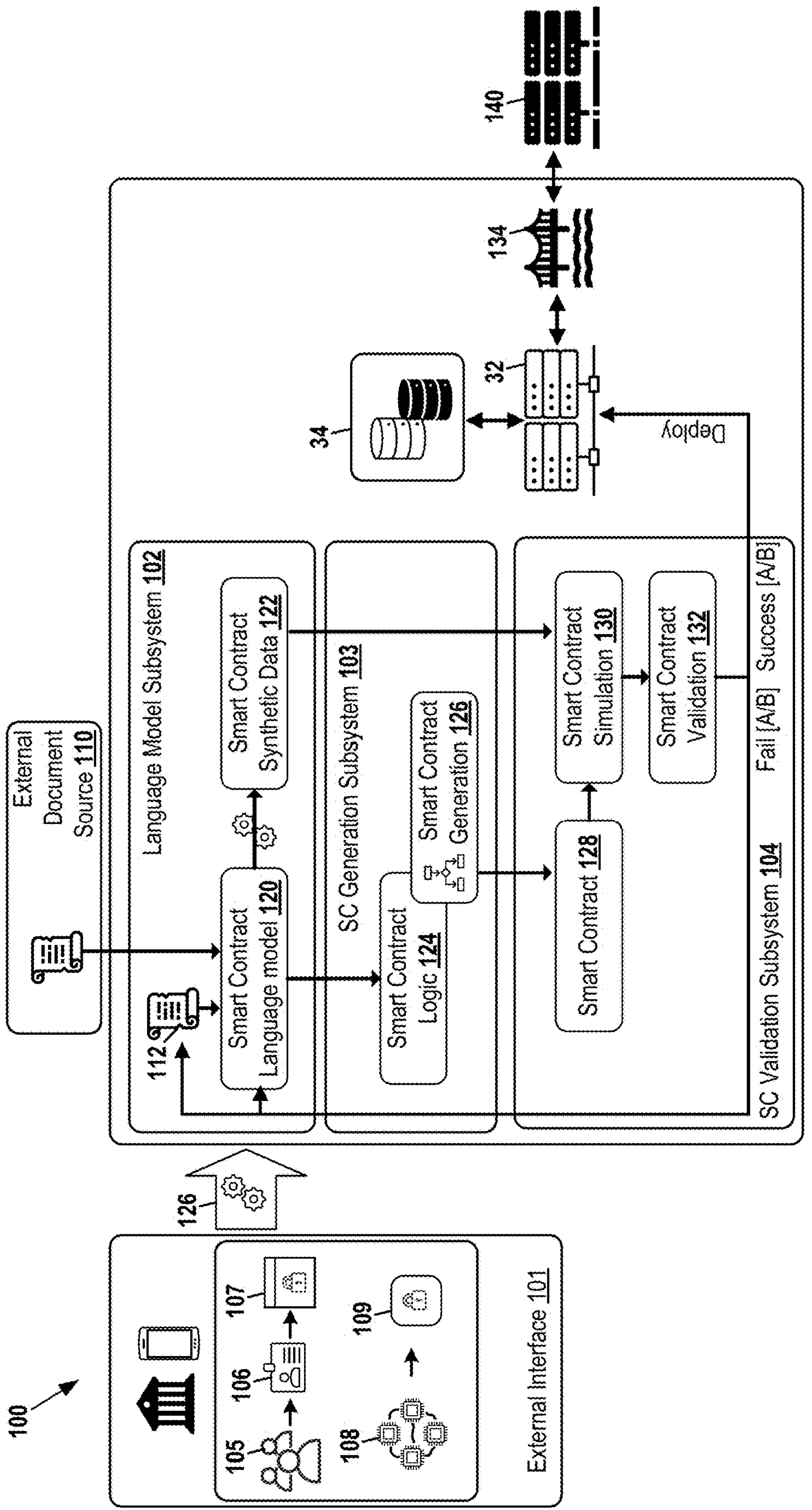
FIG. 4 is a system-flow diagram illustrating an example system for generating a smart contract, in accordance with some embodiments of the present disclosure.

In some embodiments, some or all of the operations 52, 54, and 56 are implemented within the system-flow diagram illustrated and described in FIG. 4.

Generally speaking, once a smart contract is generated (as defined by code 57, for example), one or more validation processes may be performed to increase the likelihood of its proper operation prior to deployment. FIG. 3 illustrates an example method 70 for validating a smart contract, in accordance with some embodiments of the present disclosure. In some embodiments, the method 70 is performed using the smart contract generation and validation system 20, illustrated and described in reference to FIG. 1. For example, steps may be performed as part of the execution of the synthetic data generator 26 and/or the smart contract validator 28, as shown in FIG. 1. Example system flow diagrams where the method 70 could be implemented within are illustrated and described in reference to FIGS. 4 and 5. The method 70 includes the operations 72, 74, 76, and 78.

In the example shown, operation 72 includes receiving text input describing a desired operation of a smart contract. In some embodiments, the operation 72 corresponds to the operation 52 as shown in FIG. 2. For example, a request is received to generate a smart contract to generate a smart contract according to a desired operation and this request triggers the generation of synthetic data. In examples, the text input is a human or computer written description of the smart contract. For instance, the same model that generates the logic 55 or the code 57 may generate the text input. In other examples, it can be beneficial to have the text input be the same as text 53 to increase a likelihood that the output of this method 70 validates the contract based on the user's request, rather than a downstream interpretation of that request. In some examples, it can be beneficial to include both the text 53 as well as some components of the code 57 or descriptions thereof. For example, the text input includes application programming interface descriptors for the application programming interfaces of the code 57 as well as the text 53 such that the resulting tests can validly interact with the application programming interfaces. In another example, the code can be provided and tests can be generated that are specifically designed to test vulnerabilities that may exist with the code 57.

Continuing the snowfall example, the revised text 53 is received.

Operation 74 can include processing the text input describing a desired operation of a smart contract to generate one or more datasets defining smart contract execution scenarios. In some embodiments the text input is processed using a generative AI technology, such as a large language model. In some embodiments, the same generative AI system that generates the smart contract logic description is also used to generate simulation datasets based on the same or similar inputs. The datasets can be descriptions of different scenarios in which the smart contract may operate. Examples of datasets defining smart contract execution scenarios include (a) an outside world interactions with smart contracts dataset, (b) an owner/user interactions with smart contracts dataset, (c) a smart contract-to-smart contract communications dataset, (d) a hacking scenarios dataset, or (e) any combination of (a), (b), (c), and (d). The datasets may take any of a variety of useful forms. In some examples, the datasets are textural descriptions of the scenarios.

Continuing the snowfall contract example, a model may process the text 53 with a prompt asking which discrete groups of users might interact with the smart contract. The model may provide output that indicates: owner, traders (e.g., buyer or seller), nodes, user interfaces, oracle, malicious actor, liquidity provider, and other smart contracts are groups that may interact with the smart contract.

In the example shown, operation 76 includes generating synthetic data for validating the smart contract for each of the one or more datasets defining smart contract execution scenarios. In some embodiments, operation 76 includes processing the one or more datasets defining smart contract execution scenarios with a model trained to generate large volumes of synthetic data for validating a specific smart contract. Examples of such a model could include one or both of a transformer and a deep learning model. In some embodiments, a synthetic data engine is used to produce a large volume of synthetic data for each of the scenario. The synthetic data can include potential input data or interactions for the smart contract and an expected output. For example, the generated smart contract may have an application programming interface and the synthetic data can be designed (or prompted) to interact with the application programming interface.

Continuing the snowfall contract example, the synthetic data for the owner dataset can include representations of API calls for creating the contract, publishing the contract, establishing conditions of the contract, establishing termination conditions for the contract, other API calls, or combinations thereof. The synthetic data for the traders data set can include representations of API calls for buying or selling shares, settling shares, other data, or combinations thereof. The synthetic data for nodes can include representations of API calls or operations callable or performable by nodes of a blockchain or a blockchain itself (e.g., the Ethereum virtual machine). The synthetic data for user interfaces can include representations of API calls relating to interfaces for interacting with the smart contract, such as calls relating to determining share price, liquidity amount, trading fees, balances, other information, or combinations thereof. The synthetic data for an oracle may simulate different values providable by the oracle that may cause the smart contract to behave in a particular way. The synthetic data for the malicious actor can include representations of API calls designed to cause the smart contact to behave in an unexpected or unwanted way, such as by breaking, crashing, malfunctioning, or consuming inordinate amounts of resources.

In the example shown, operation 78 includes validating the smart contract with the generated synthetic data. The synthetic data, when processed with the smart contract, simulates various transactions and interactions which impact the smart contract. The results are then validated against results which correspond to a desired functionality of the smart contract. The validation also checks for potential security and performance issues that may occur once the smart contract is deployed on a blockchain. In some embodiments, if the smart contract fails the validation step, the smart contract is destroyed and feedback is provided to the smart contract generator 24. In such an example, the overall flow can return to operation 54 or 56 for the creation of an updated contract.

Continuing the snowfall contract example, the smart contract can be simulated (e.g., by running on a side chain or a virtual chain) and the synthetic data used to determine whether the smart contract behaves appropriately.

FIG. 4 is a system-flow diagram illustrating an example system 100 for generating a smart contract using artificial intelligence. In some embodiments the system 100 is implemented on one or more servers with network connectivity to communicate with one or more user devices and one or more distributed ledgers, and may be initiated or monitored using one or more user computing devices, for example via an external interface. FIG. 4 includes an external interface 101, a smart contract generation and validation system 20, an external document source 110, and at least one distributed ledger 140 (such as Ethereum or Bitcoin).

The external interface 101 allows one or more users 105 and/or edge computing devices 108 within an overall computing infrastructure 150 to access and conduct transactions via the system 100. The edge computing devices 108 may include, for example, an automated teller machine, a camera, smart monitor (e.g., computing device collecting data via one or more sensors), a mobile device executing a mobile application useable to conduct or monitor transactions, or other edge device. Each edge device may have a protective ID 109 (e.g., a private key) and may interface with authenticated users 105, which can be uniquely authenticated. In some examples, the users 105 are authenticated through an interface 107 via an authentication subsystem 106. The interface 107 can be a page, application, or other interface that interacts with a user (or a device of a user) to authenticate the user. In an example, the interface is a way for a user to provide a username and password. A user may be given the option to login using an open authentication standard, such as OAuth 2.0. In another example the interface 107 may be configured to receive a digital signature. In some embodiments, the external interface provides access to the smart contract generation and validation system 20 via an access engine 152. In some embodiments, the external interface is cloud-based.

In some embodiments, the access engine 152 includes the components that allow a user to access smart contract generation systems. In some embodiments, the access engine 152 includes systems and procedures which allow a user (e.g., one of the users 105) on a user device to access a user interface (e.g., the Interface 107) for the smart contract generation and validation system 20. In some embodiments, the user accesses the interface via a user computing device. Examples of a user computing device include a mobile computing device, tablet, laptop, etc. Other examples are disclosed herein. In some examples, the authentication subsystem 106 is used to authenticate the user device. In some instances, artificial intelligence authentication protocols are used to improve security. For instance, an AI may be configured to detect anomalous behavior (e.g., access from an unusual location, at an unusual time, from an unusual device, or in other ways anomalous) and apply heightened scrutiny, such as by denying the login request or by requiring additional authentication before allowing access. In some embodiments, access engine 152 includes components for directly or indirectly verifying the protective ID 109 associated with an authenticated device.

The smart contract generation and validation system 20 includes a language model subsystem 102, a smart contract generation subsystem 103, a smart contract validation subsystem 104, an oracle 34, an internal sidechain 32, and an internal bridge 134. Examples of the oracle 34 and internal sidechain 32 are illustrated and described in reference to FIG. 1.

In the example shown, language model subsystem 102 is a portion of the system 20 that interfaces with a smart contract language model 120. The subsystem 102 can directly run the language model or interface with another computer (e.g., a compute cluster or server having sufficient resources to operate the language model 120). The language model subsystem 102 receives smart contract documentation provided by a user. In some embodiments, the smart contract documentation can be from either an internal source 112 or external document source 110. In some embodiments, the documentation includes text-based instructions (e.g., a prompt) defining the how the smart contract will function and/or operate after being deployed on a distributed ledger. In some embodiments, the external document source 110 includes documentation defining a business process (e.g., for an enterprise). In some examples the documentation may correspond to the text 53 of FIG. 2.

In the example shown, the documentation is provided to a smart contract language model 120. In some embodiments, the smart contract language model 120 processes the documentation and generates smart contract synthetic data 122 and/or smart contract logic description 124. Examples of the smart contract logic description 124 include a flow chart, logic diagram, or another way of describing the functions within the smart contract code, and may correspond to the logic 55 of FIG. 2. The smart contract synthetic data 122 contains different scenarios of smart contract interactions, including sets of interaction for different hacking scenarios. An example system-flow diagram illustrating a process for generating smart contract synthetic data is illustrated and described in reference to FIG. 5.

In the example shown, the smart contract generation subsystem 103 processes the smart contract logic description 124 with a generative smart contract model 126. Examples of the generative smart contract model 126 include a deep learning system and/or a generative AI system that is trained to generate a smart contract 128 based on the smart contract logic description 124. In some embodiments, the generative smart contract model 126 is trained to optimize the instructions in the smart contract 128.

In the example shown, the smart contract validation subsystem 104 validates the smart contract 128. Validating the smart contract can include simulating smart contract execution, at a smart contract simulator 130, using the smart contract synthetic data 122. In some embodiments, the synthetic data 122 includes simulated transactions and expected results for each of the simulated transactions. The simulation of the smart contract execution is validated at a smart contract validator 132, for example by comparing the output and behavior of the smart contract 128 relative to expected operation in response to the synthetic data 122. If validation of the smart contract fails, then feedback is provided to review the smart contract documentations and/or the smart contract logic (shown as [A/B] in FIG. 4). If validation of the smart contract is successful, then the smart contract can be deployed to a distributed ledger 140.

In the embodiment shown, the smart contract 128 is first deployed on an internal sidechain 32 (which may be hosted on a cloud-based organization network). The smart contract 128 is then able to interface with the distributed ledger 140 from the internal sidechain 32 via the internal bridge 134.

In some embodiments, the bridge is implemented as a software protocol and/or smart contract usable to facilitate movement of digital assets or data between the internal sidechain 32 and the distributed ledger 140. Examples of such bridges are illustrated and described herein.

One advantage of using a solution with multiple systems (e.g., for the smart contract language model 120 and the generative smart contract model 126) as disclosed in various examples herein, is that it allows each system to be trained on (or fine tuned based on) and optimized for the particular desired output with a specific input. This can result in a more accurate and optimized output, as the model is specifically trained for the purpose of the system. For example, the generative smart contract model 126 can be trained on a large corpus of optimized smart contract code utilizing the best security practices etc.

Figure 5:
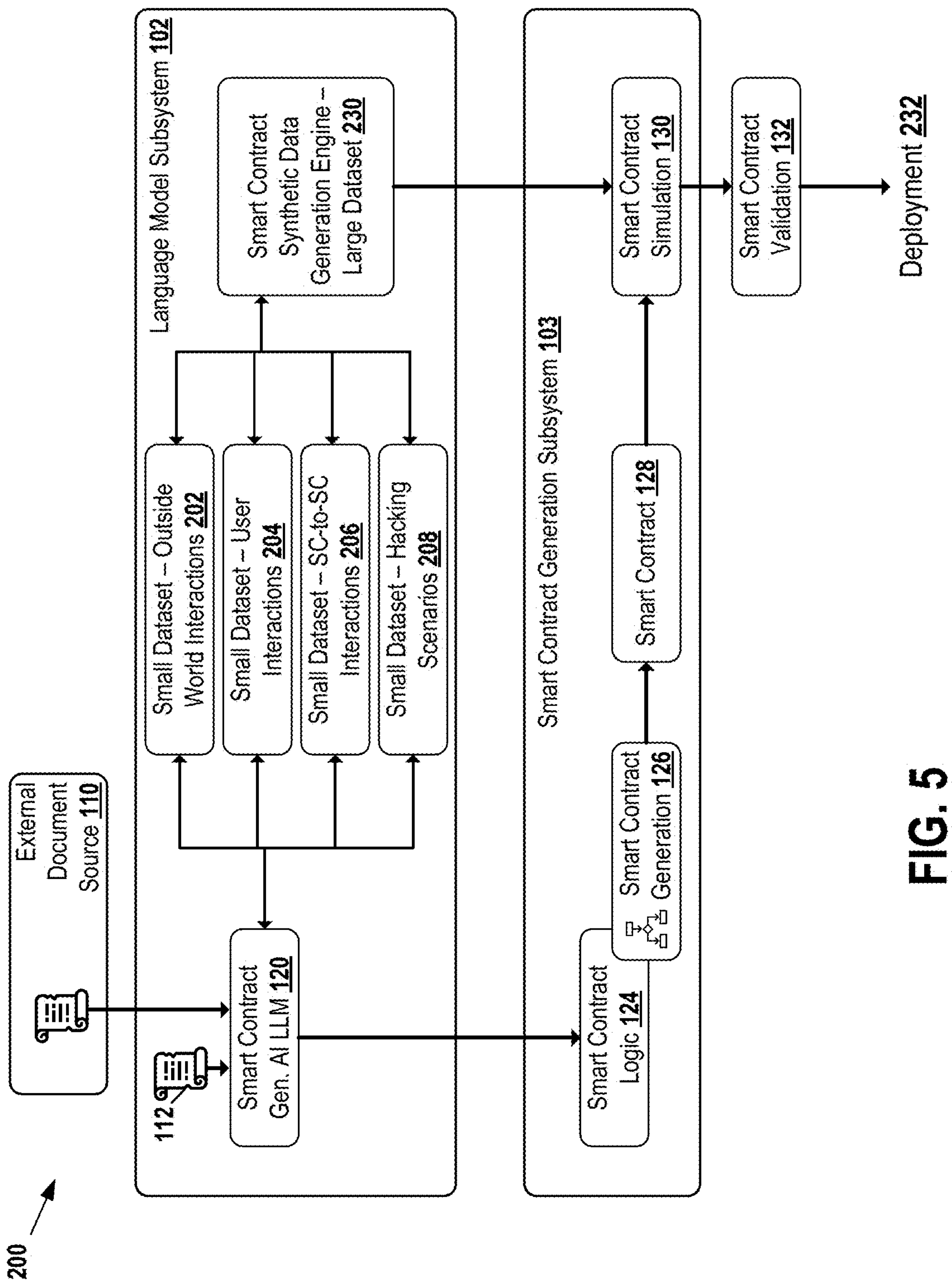
FIG. 5 is a system-flow diagram illustrating an example system for generating synthetic data to validate a smart contract, in accordance with some embodiments of the present disclosure.

FIG. 5 is a system-flow diagram illustrating an example method 200 for generating synthetic data to validate a smart contract. In some embodiments the method 200 is performed on one or more servers with network connectivity to communicate with one or more user devices and one or more distributed ledgers. In some embodiments, the smart contract synthetic data includes interactions and or hacking events. In some examples, the system flow diagram and method 200 is included within the system flow diagram illustrated in FIG. 4.

FIG. 5 includes a language model subsystem 102, a smart contract generation subsystem 103, an external document source 110, and a step 132 for smart contract validation. Examples of the external document source 110, language model subsystem 102, smart contract generation subsystem 103, as well as the smart contract simulator 130 and smart contract validator 132 are illustrated and described in FIG. 4.

The language model subsystem 102 receives a request to generate a smart contract from a user. For example, a user may upload a smart contract text-based document for consumption by the smart contract language model 120. The smart contract language model 120 generates smart contract logic description 124 and one or more interaction/scenario datasets. In the example shown, the one or more interaction/scenario datasets include: (1) outside world interactions with smart contracts dataset 202: (2) owners/users interactions with smart contracts dataset 204: (3) smart contract-to-smart contracts communications dataset 206; and (4) hacking scenarios dataset 208.

The one or more interaction/scenario datasets are provided to a synthetic data engine 230. In some embodiments, the synthetic data engine 230 includes transformers and deep learning models. The synthetic data engine 230 is configured to produce the smart contract synthetic data 122. In some embodiments, the smart contract synthetic data 122 includes a large volume of synthetic data for the one or more interaction/scenario datasets. In some embodiments, the one or more models include machine learning models (e.g., using the machine learning model framework 1700 illustrated and described in FIG. 23).

As described previously in conjunction with FIG. 4, the smart contract logic description 124 is processed with a generative smart contract model 126 to generate the smart contract 128. The smart contract is simulated with the smart contract synthetic data provided from the synthetic data engine 230 at a smart contract simulator 130. The smart contract 128 is evaluated by testing various interactions with the smart contract 128 using the synthetic data (e.g., with the different interactions and/or hacking scenarios). The smart contract 128 is then validated at a smart contract validator 132, for example, by comparing simulation output of the smart contract against expected resulting operation of the smart contract 128. An example of simulating the smart contract at smart contract simulator 130, and validating the results of such simulation at smart contract validator 132, is illustrated and described in reference to FIG. 4. Once validated the smart contract may be deployed at 232.

II. Cross-Chain Bridge Creation and Management

Various mechanisms leveraging one or more AI systems to create, recreate, clone, and destroy cross-chain bridges on demand are disclosed. In some embodiments, the AI systems can be used to enhance smart contract security and efficiency, where a smart contract is used to define a cross-chain bridge. Advantages of some of the embodiments disclosed herein includes improved performance across distributed ledger networks. In some embodiments, a mechanism retrains an AI system and creates the cross-chain bridge after receiving a recreate request signal. In some examples, the retraining and recreating of destroyed cross-chain bridge is on demand. In some examples, the retraining and recreating of destroyed cross-chain bridges is via an automated process. In some examples, the bridge is created as a smart contract using techniques described above. In some embodiments an AI system is used to clone cross-chain bridges on demand (e.g., in response to a clone request signal or based on need as determined by monitoring transactions with one of the blockchains). Examples of such mechanisms related to cross-chain bridges are illustrated and described in reference to FIGS. 6-14.

In some of these embodiments, an AI system is trained to create well optimized and secured cross-chain bridges on demand. In some of these embodiments, the AI system destroys cross-chain bridges if they are no longer used/needed or if there is a security alert present in the network traffic. Advantages of retraining and recreating of cross-chain bridges after destruction using AI include improvements to the security and optimization of the cross-chain bridge and the distributed ledger networks. In some embodiments, cloning cross-chain bridges on demand improves network performance and efficiency.

A cross-chain bridge (referred to herein as a "bridge") is a digital link that connects two different blockchains. For example, a cross-chain bridge may connect blockchain (A) of type layer 1 to blockchain (B) of type layer 2 (also referred to herein as an example of a layer 2 solution). Once the connection is established, the cross-chain bridge can be configured to transfer the digital asset between the two blockchains. For example, a token of type (A) from blockchain (A) is transferred to token type (B) on blockchain (B). To maintain the number of tokens across the network the transfer is done via a lock-and-mint procedure where the cross-chain bridge locks the (A) tokens when it mints new (B) tokens on the other chain. To transfer back the (B) tokens to blockchain (A) the cross-chain bridge will burn the (B) tokens in blockchain (B) and unlock the original (A) tokens. Advantages of the methods, systems and apparatuses disclosed includes improved interoperability between various blockchains and types of transactions, as well as enhanced security in transaction exchange across blockchains.

Figure 6:
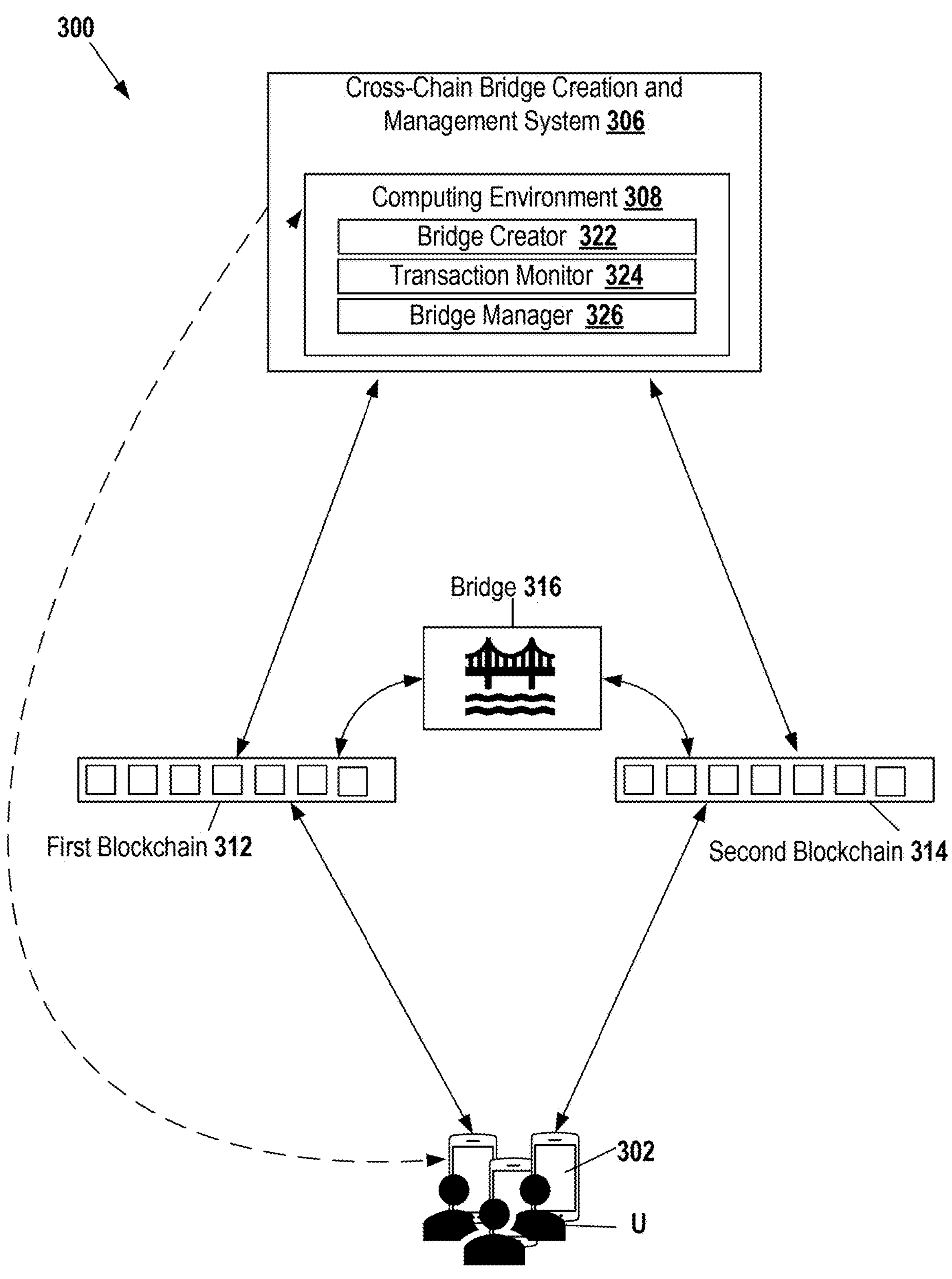
FIG. 6 illustrates an example environment for a cross-chain bridge creation and management system, in accordance with some embodiments of the present disclosure.

FIG. 6 illustrates an example environment 300 for a cross-chain bridge creation and management system 306, in accordance with some embodiments of the present disclosure. The environment includes user devices 302 with associated users U, interacting with one or both of a first blockchain 312 and a second blockchain 314. The first blockchain 312 is linked with the second blockchain 314 via a bridge 316. Also shown is a cross-chain bridge creation and management system 306 comprising a computing environment 308. The computing environment 308 operates a bridge creator 322, a transaction monitor 324, and a bridge manager 326.

The user devices 302 includes any type of computing device which allows the users to access at least one of the first blockchain 312, the second blockchain 314, and/or the cross-chain bridge creation and management system 306. Example user devices 302 are illustrated herein, and may include mobile computing devices or other personal computing devices, edge devices, point-of-sale devices, or other devices interacting with one or both blockchains 312, 314 to place records or transactions on a selected chain.

In the example shown, bridge 316 operates to link the first blockchain 312 and the second blockchain 314. In some embodiments, the bridge 316 allows for the transfer of a digital asset between the first blockchain 312 and the second blockchain 314. In some examples, the bridge 316 is a specific type of smart contract which links two or more different blockchains. In some examples, the first blockchain 312 is an internal sidechain (e.g., as shown in FIG. 1) and the second blockchain 314 is a layer-one blockchain, such as Bitcoin or Ethereum. Other arrangements are also possible.

In some examples, the bridge 316 uses a lock-and-mint procedure to transfer an asset from a layer 1 blockchain to a layer 2 blockchain. For example, the bridge 316 may lock tokens from the layer 1 blockchain and mint new tokens on the layer 2 blockchain. To transfer the digital asset back to the layer 1 blockchain, the bridge 316 destroys the layer 2 tokens and unlocks the layer 1 tokens.

In example embodiments, cross-chain bridge creation and management system 306 is used to create and manage cross-chain bridges, including the bridge 316. The cross-chain bridge creation and management system 306 includes a computing environment 308. Examples of computing environments are disclosed herein, including an example computing environment 1600, illustrated and described in reference to FIG. 22. The computing environment is configured to store and execute instructions corresponding to various modules including a bridge creator 322, a transaction monitor 324, and a bridge manager 326.

Bridge creator 322 operates to create bridges across different blockchains. For example, by generating a smart contract defining a bridge. In some embodiments, the bridge creator 322 creates a bridge on demand using one or more AI systems. In some embodiments, the one or more AI systems includes a generative AI system. An example method 350 for creating a bridge is illustrated and described in reference to FIG. 7.

In the example shown in FIG. 6, the transaction monitor 324 monitors transactions with the first blockchain 312 and/or the second blockchain 314. In some embodiments, the transaction monitor 324 uses AI to monitor and detect features in the transactions which indicate that the cross-chain bridge creation and management system 306 should take an action. For example, a certain transaction or pattern of transactions may indicate a new type of bridge should be created. Another transaction or set of interactions may indicate there is a security issue with a deployed bridge. Other examples are disclosed herein. Example of interactions include asset tokenization process, crypto trading, decentralized applications activities and/or edge compute devices communication with Blockchain.

The bridge manager 326 manages deployed bridges. Examples of bridge management mechanisms performed by the bridge manager include destroying a bridge, recreating a destroyed bridge, and cloning a bridge. The bridge manager 326 can be configured to perform other bridge management tasks described herein.

In some embodiments, the monitoring of the transactions with the blockchains triggers different actions by the cross-chain bridge creation and management system 306. For example, monitoring certain transactions may trigger the creation of a bridge with the bridge creator 322, other interactions may trigger the destruction of a bridge (e.g., as shown in the method 370 in FIG. 9), recreation of a bridge (e.g., as shown in the method 600 in FIG. 11), or to clone a bridge (e.g., as shown in the method 700 in FIG. 13) with the bridge manager 326.

Figure 7:
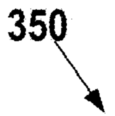
FIG. 7 illustrates an example method for generating a cross-chain bridge, in accordance with some embodiments of the present disclosure.
Figure 7:
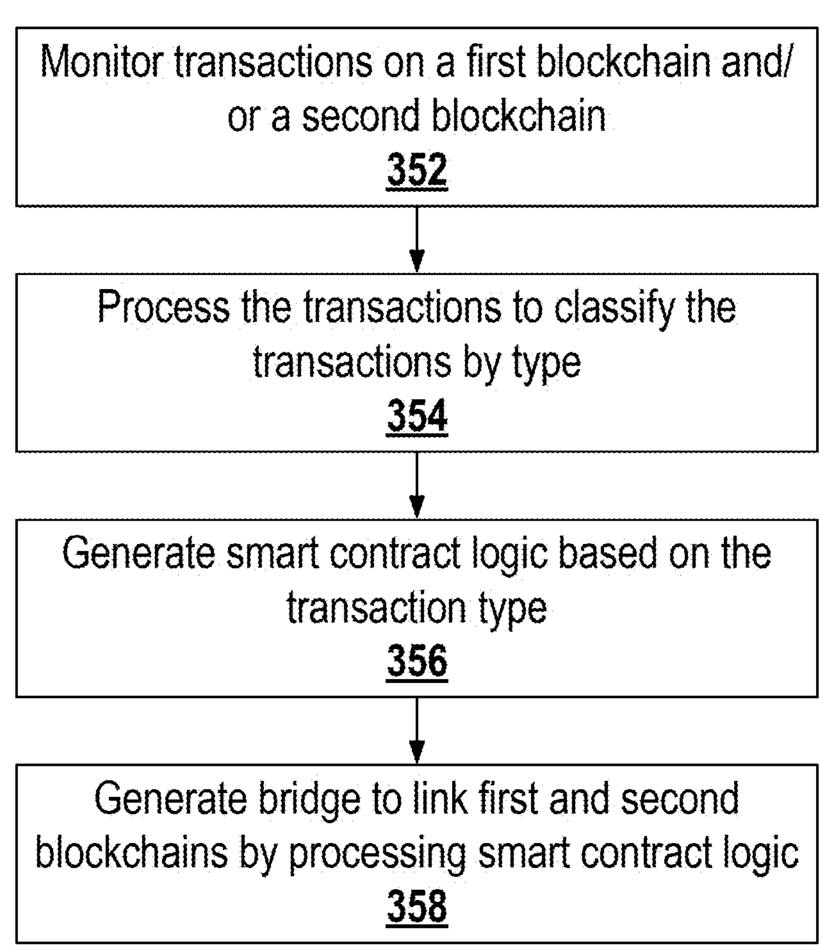

FIG. 7 illustrates an example method 350 for generating a cross-chain bridge, in accordance with some embodiments of the present disclosure. In some embodiments, the method is executed as instructions by the computing environment of 308 of the cross-chain bridge creation and management system 306, as shown in FIG. 6. The method 350 includes the operations 352, 354, 356, and 358.

In the example shown, operation 352 includes monitoring transactions on one or both of a first blockchain and a second blockchain. In some embodiments, an AI system tracks interactions of authenticated users with the monitored blockchains. In other embodiments, monitoring software may be generated and embedded as part of bridges or other locations that may have visibility to blockchain transactions, and logs may be collected related to such blockchain operations in a manner described below. In such examples, monitoring software may be automatically generated and included in bridges in accordance with the bridge creation processes described here.

In the example shown, operation 354 includes processing the monitored transactions to classify the transactions, such as by type. In some embodiments, transactions are grouped by transaction types. For purposes of grouping, transactions may be classified by type in a number of ways: for example, token transfers or other contract interactions, staking transactions, cross-chain transactions or swaps, privacy transactions, and/or account management transactions may be classified. Other transaction types or classifications may be used as well. The transaction data monitored at the operation 352 is classified to determine types of transactions that are occurring with each blockchain. An example of the classification process is illustrated and described in FIG. 10.

In the example shown, operation 356 includes generating smart contract logic based on the transaction type identified in operation 354. The classification of transactions is used to determine what smart contract logic to include within the definition of the bridge. In some embodiments a generative AI model is used to create a smart contract logic description for the bridge based on the classification of the transactions that are likely to interact with the bridge. The logic description and its generation can have one or more similarities with logic 55. In some instances, a description of a desired operation of the bridge is created first (e.g., using a language model) and then that description is converted into logic. In some embodiments the generative AI model creates smart contract logic descriptions per classified transaction type.

In the example shown, operation 358 includes generating a bridge to link the first blockchain to a second blockchain by processing the smart contract logic. The operation 358 includes, in such examples, generating smart contract code for a smart contract defining a bridge. In some embodiments, the code for the bridge is generated using a generative AI model. In some of these examples, the generative AI model is trained or fine tuned using a large set of training examples of well optimized and highly secured smart contract code from bridge examples. Optimization includes optimization for computational complexity (e.g., efficiency), memory usage, processor usage, etc.

In some embodiments, the systems, methods, and apparatuses disclosed in FIGS. 1-5 are used to generate the bridge. For example, the bridge can be generated via a smart contract, and validated by simulating various interactions and attacks with synthetic data representative of transactions and/or attacks likely to be experienced by the bridge.

Figure 8:
FIG. 8 illustrates an example method for destroying a cross-chain bridge, in accordance with some embodiments of the present disclosure.
Figure 8:
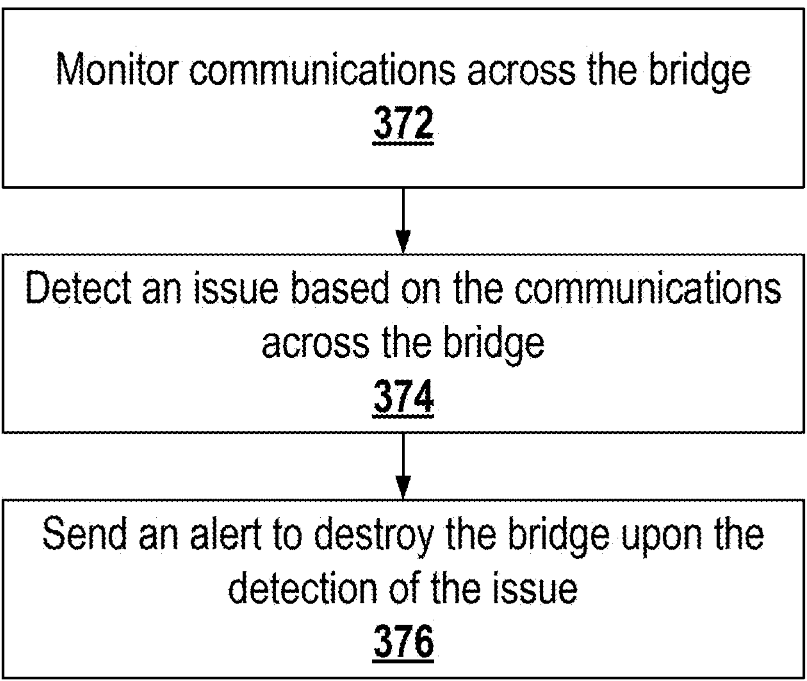

FIG. 8 illustrates an example method 370 for destroying a cross-chain bridge, in accordance with some embodiments of the present disclosure. In some embodiments, the method 370 is performed by the cross-chain bridge creation and management system 306 shown in FIG. 6. In the example shown, the method 370 includes operations 372, 374, and 376.

As illustrated, operation 372 includes monitoring communication across the bridge. In some embodiments, an AI system monitors communications across the bridge, and may aggregate information about communications across the bridge as transaction logs or the like. Such transaction logs may be processed at a computing system remote from the bridge, for example at cross-chain bridge creation and management system 306. The data output on either blockchain from interactions which require the bridge may also, or alternatively, be analyzed to detect an issue.

In the example shown, operation 374 includes detecting a potential issue based on the communications across the bridge. Example issues with a bridge include a bridge which is not being used, or a bridge which has a security issue (or a possible security vulnerability). Such example issues may be detected based on, for example, timestamps of transactions at the bridge (illustrating non-use of the bridge), or observed vulnerabilities elsewhere within a blockchain or other network which might imply vulnerability of the bridge. Example vulnerabilities may include observed bugs in smart contract logic, oracle failures, gaps or issues in security models used at the bridge, and the like.

Detecting the potential issue can occur in any of a variety of ways. For example, a machine learning algorithm may be trained on typical behavior of the bridge (e.g., traffic flow, traffic type, other behaviors, or combinations thereof) over time and configured to provide an alert if the current activity deviates from the trained behavior. In another example, a language model is provided with a prompt describing the bridge and asked to provide examples of expected and unexpected behavior. The output can be compared to the behavior of the bridge and, if the bridge's behavior is similar to the unexpected behavior, then a potential issue can be detected.

In the example shown, operation 376 includes sending an alert to destroy the bridge upon the detection of the issue. In some embodiments, certain alerts trigger the destruction of the bridge. In some embodiments, another AI system receives the alert and destroys the bridge. In some examples, the destruction of the bridge happens automatically. In other instances, the system alerts an administrator to the potential problem and asks whether to destroy the bridge. In response to receiving an instruction to destroy the bridge, the bridge can be destroyed. In some examples, the potential issue is classified according to severity or other classifications. Different levels of classifications can warrant different levels of responses. For instance, if a potential issue is classified as being a major security issue, then the bridge may be automatically destroyed. By contrast, if the potential issue is a minor performance issue, an administrator may be alerted and allowed to determine the correct course of action.

In examples, triggering destruction of the bridge involves communicating to the bridge to shut down: in other examples, triggering destruction of the bridge involves an external systems from the bridge destroying the bridge. Destroying the bridge may include preserving the locked transactions that are maintained at the bridge, or performing one or more emergency shutdown and/or escape mechanisms to allow users to reclaim assets locked at the bridge in the event of bridge destruction. In some examples where destroying the bridge is performed in combination with creation of a new bridge, the bridge, or a related system (such as the AI system described previously) may migrate transactions managed at the bridge to be destroyed to a new bridge, thereby providing seamless migration across bridges.

Figure 9:
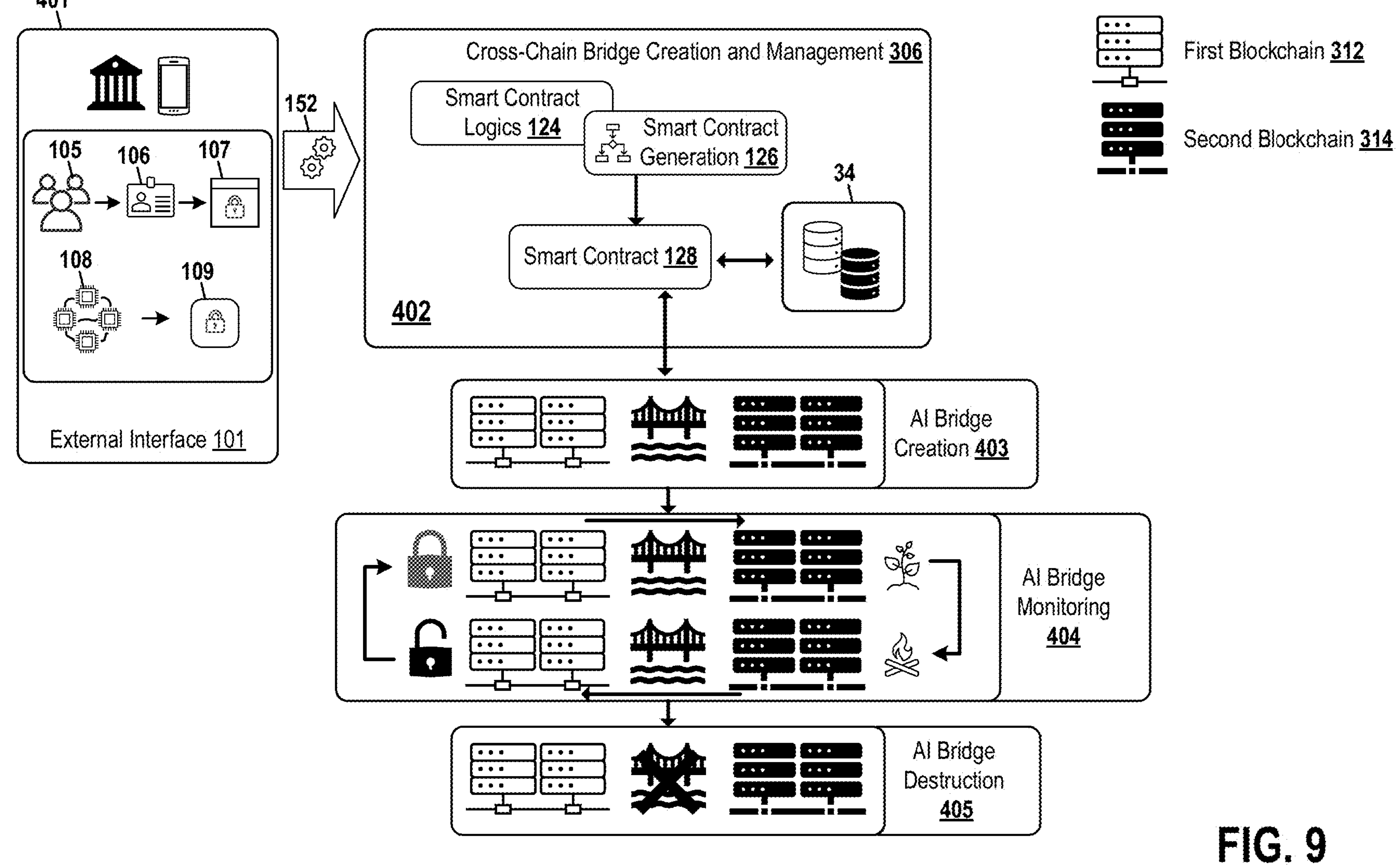
FIG. 9 is a system-flow diagram illustrating an example system for creating and destroying cross-chain bridges between different distributed ledgers, in accordance with some embodiments of the present disclosure.

FIG. 9 is a system-flow diagram illustrating an example system 400 for creating and destroying cross-chain bridges between different distributed ledgers. In the example shown, the system 400 may be implemented using the computing environment of 308 of the cross-chain bridge creation and management system 306, and performs operations 401, 402, 403, 404, and 405.

In the example shown, operation 401 includes authenticating users accessing the first blockchain 312, second blockchain 314, and/or the cross-chain bridge creation and management system 306. In the example shown, the operation 401 is executed, in whole or in part, using an external interface 101 of the cross-chain bridge creation and management system 306. Examples of an external interface 101 used for authenticating users 105 and/or edge computing devices 108 within an overall computing infrastructure 150 are illustrated and described in reference to FIG. 4. Examples of the AI authentication subsystem 106, interface 107, the protective ID 108, and the access engine 152 for authenticating users are also illustrated and described in reference to FIG. 4.

In the example shown, operation 402 includes generating one or more smart contacts defining the bridge 316 at the cross-chain bridge creation and management system 306. In some examples, the cross-chain bridge creation and management system 306 includes or interfaces with the smart contract generation and validation system 20 (as shown in FIG. 1 and FIG. 4) to generate the one or more smart contracts for the bridge 316. An example method 100 for generating a smart contract is illustrated and described in reference to FIG. 4.

As discussed in reference to operation 403, the cross-chain bridge creation and management system 306 includes processing the smart contract logic description 124 with a generative smart contract model 126 to output a smart contract 128 defining the bridge 316. In the example shown, the smart contract 128 interfaces with an oracle 34. Examples of the smart contract logic description 124, generative smart contract model 126, smart contract 128, and oracle are disclosed herein.

In some embodiments, operation 402 includes collection of information produced by the users' activities, such as during an asset tokenization process, crypto trading, decentralized application activities, and/or edge compute device communication with the distributed ledger. In some embodiments, an access engine 152 receives a request from the smart contract generation system at sub-step (A) to produce a smart contract. Next, the smart contract generation system can process the information collected and produce different types of cross-chain bridges as output based on the classification of the collected data/information. The smart contract generation system may be trained to produce such output based on such input. An example classification method 500 is illustrated and described in reference to FIG. 10.

In the example shown, operation 403 includes training an optimized generative AI model to consume the smart contract logic description 124 to create the bridge 316. In some embodiments, the code created for the cross-chain bridge is optimized using the generative smart contract model 126 to create the code for the bridge 316 with security aspects, such as multi-signature approvals, monitoring, emergency shutdowns/escape mechanisms, and the like. In some embodiments the generative smart contract model 126 is trained to produce data to monitor traffic across the cross-chain bridges. In some embodiments, simulations for testing attacks on the bridge are generated and executed using a generative AI system.

In the example shown, operation 404 includes observing communications across the bridge 316 after deploying the bridge on the first blockchain 312. In some embodiments, the first blockchain 312 is a layer 2 solution (e.g., sidechain), and an AI monitoring system observes communications across the cross-chain bridge using the data produced by the deployed cross-chain bridges (e.g., by observing the cross-chain bridges' data). For example, the AI monitoring system can look for anomalies in crypto traffic, bridge load/capacity, and interactions with the one or more smart contracts. This may be accomplished through one or more of listening nodes, smart contract triggers within the bridge itself to generate logs, alert systems accompanying the bridge, and the like, to generate consolidated monitoring logs of such communication.

In the example shown, operation 405 includes destroying the bridge 316 if a destruction signal is received from the AI monitoring system. In some embodiments, another AI system is used to destroy the cross-chain bridge. In some instances, a bridge may be destroyed if it is no longer being used. In other instances, the bridge may be destroyed if a security issue is detected (e.g., the number of tokens being deposited to the bridge is inconsistent with a value being withdrawn from the bridge). In some examples, an AI system may monitor transactions for threats to the bridge itself. As noted above, destroying the bridge may involve removal of the bridge immediately, or may involve one or more shutdown or emergency procedures useable to preserve and/or migrate locked transactions or assets at the bridge to another bridge.

Figure 10:
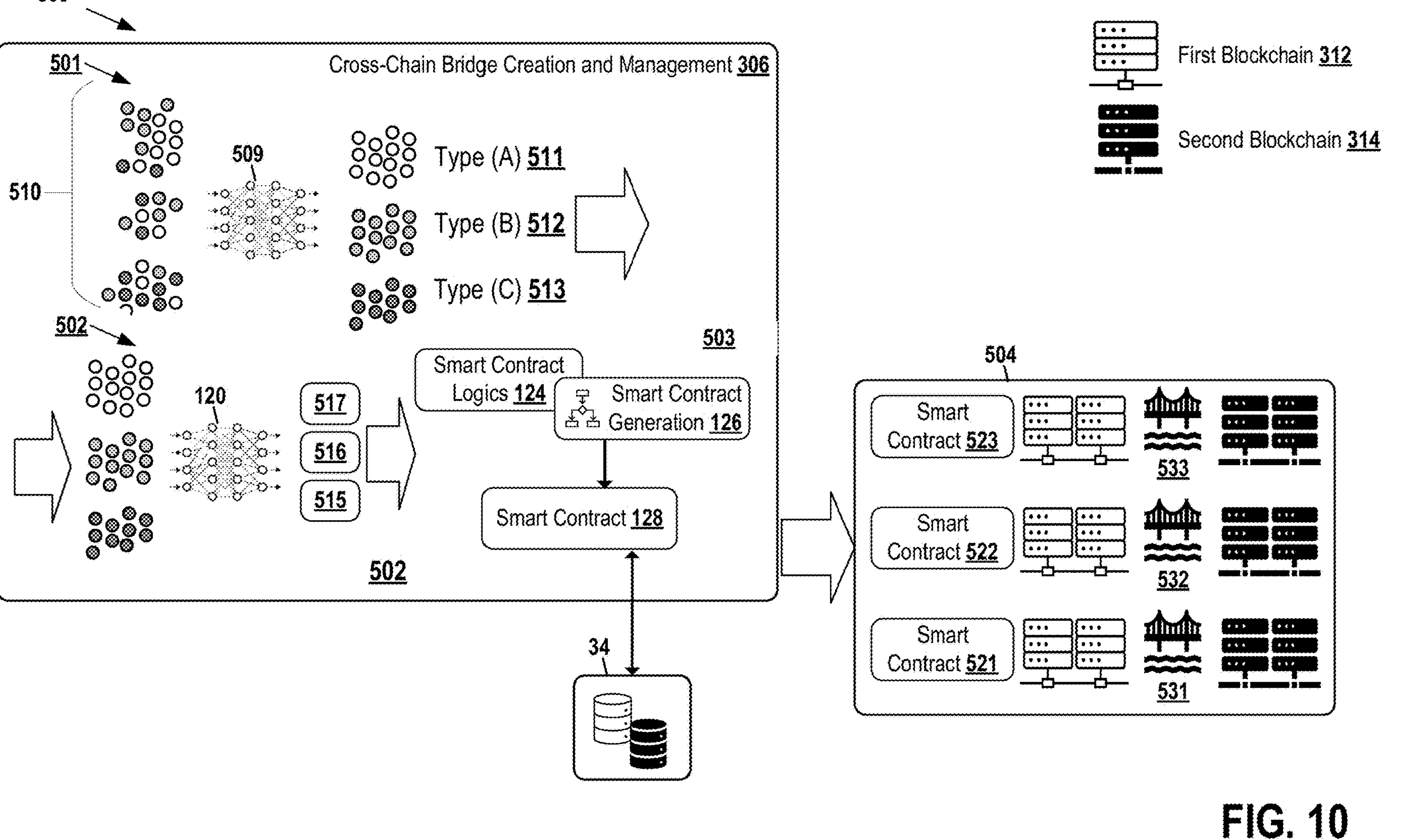
FIG. 10 is a system-flow diagram illustrating an example system for classification process for users' interactions with a distributed ledger system, in accordance with some embodiments of the present disclosure.

FIG. 10 is a system-flow diagram illustrating an example system 500 for classification for users' interactions with a distributed ledger system. In some embodiments, the system 500 may be utilized to accomplish a part of operation 402 of FIG. 9, or operation 354 of FIG. 7, described above. In examples, the system 500 performs operations 501, 502, 503, and 504.

In the embodiment shown, operation 501 includes classifying transactions 510. In some embodiments, model 509 is designed to consume transaction data to classify the transactions. For example, the transaction data can include a user's interactions with a distributed ledger, and these interactions can be classified into groups that correspond to different transaction types (e.g., asset tokenization can be classified as transaction type (A), while other transaction types may be identified as well based on the types of user activities performed). In some embodiments the model 509 is a deep learning model. In the example shown, three transaction types are identified, type (A) 511, type (B) 512, and type (C) 513.

In the example shown, operation 502 includes producing a smart contract logic description 124 per transaction type. In the embodiment shown, the smart contract language model 120 processes each transaction type to generate smart contract logic descriptions 515, 516, and 517 for transaction type (A) 511, type (B) 512, and type (C) 513, respectively. Examples of the smart contract language model 120 are described herein. In some embodiments, smart contract logic per transaction type is produced using a deep learning system trained using specific transaction types and desired logic outputs, to produce smart contract logic based on transaction classification inputs.

In the example shown, operation 503 creates the smart contract code. In some embodiments, the smart contract code is optimized and secured using another AI system. In the embodiment shown, the generative smart contract model 126 processes each output the smart contract logic description 124 to generate the smart contract 128. In the example shown the smart contract 128 may be configured to interface with the oracle 34.

Specifically, in the example shown, a first smart contract 521 defining a first bridge 531 is generated using the smart contract logic description 515, a second smart contract 522 defining a second bridge 532 is generated using the smart contract logic description 516, and third smart contract 523 defining a third bridge 533 is generated using the smart contract logic description 517. Other configurations, and numbers of bridges and smart contracts, may be utilized in other implementations.

In the example shown, operation 504 includes deploying bridges 531, 532, and 533 linking the first blockchain 312 and the second blockchain 314, where the bridge 531 corresponds to transaction type (A) 511, the bridge 532 corresponds to transaction type (B) 512, and the bridge 533 corresponds to transaction type (C) 513.

Figure 11:
FIG. 11 illustrates an example method for a cross-chain bridge recreation mechanism, in accordance with some embodiments of the present disclosure.
Figure 11:
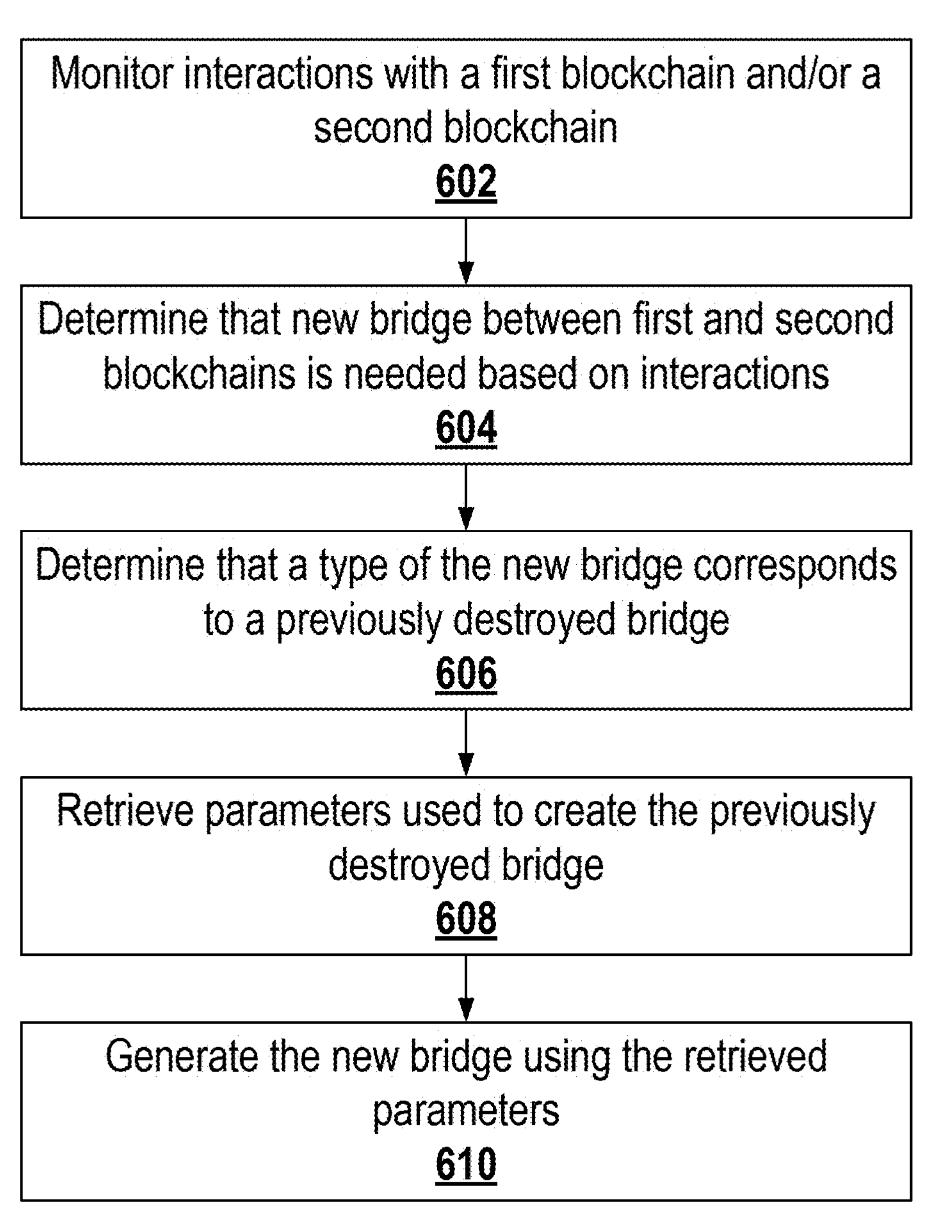
Figure 12:
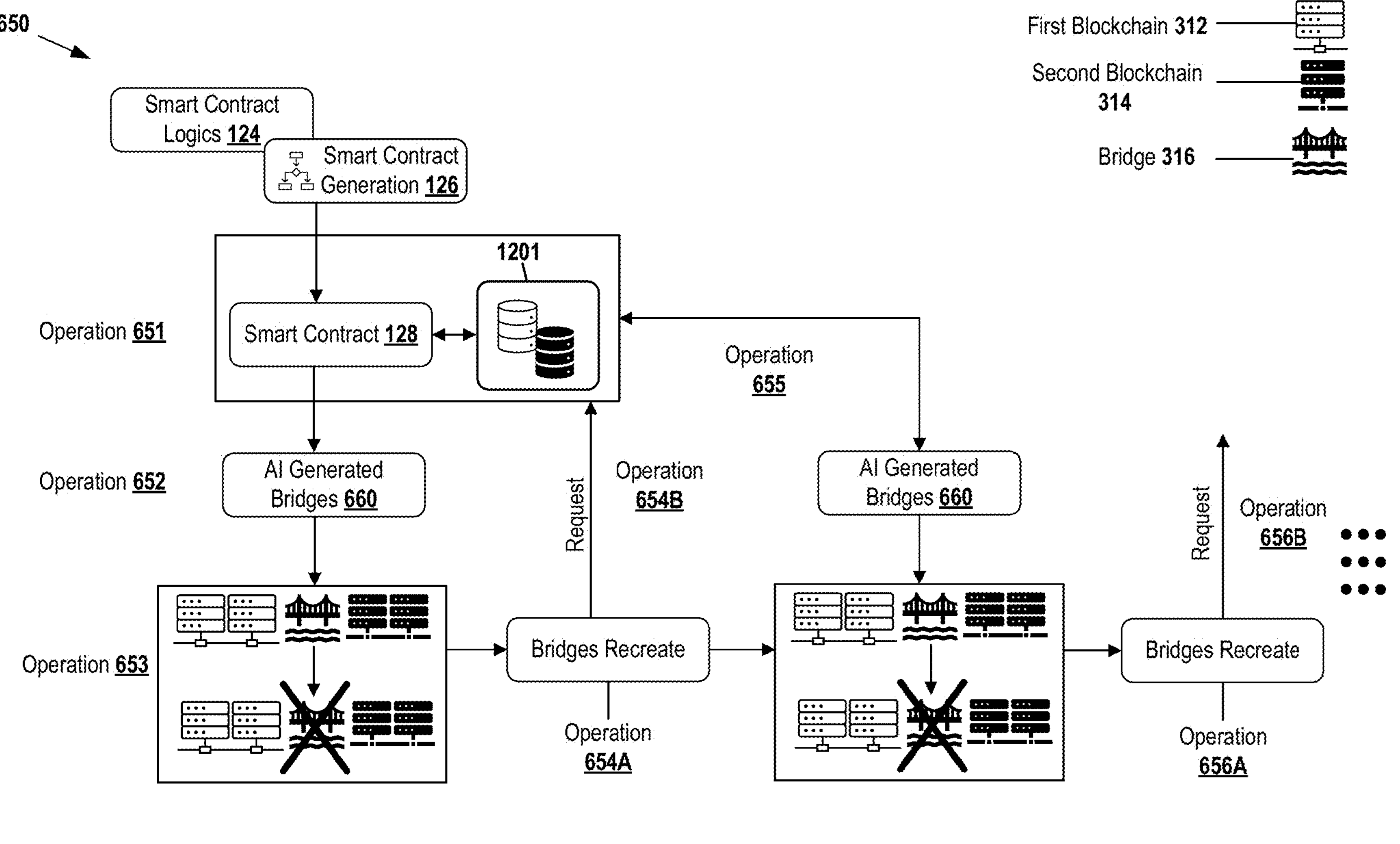
FIG. 12 is a system-flow diagram illustrating an example method for a cross-chain bridge recreation mechanism, in accordance with some embodiments of the present disclosure.

FIGS. 11 and 12 illustrate examples of a mechanism for recreating a destroyed bridge. In some embodiments, an automated process is used to recreate destroyed bridges (e.g., in response to receiving a recreate request signal from the transaction monitor 324 and/or the bridge manager 326, as shown in FIG. 6).

In some examples, parameters used for creating the original bridge are stored in a secure database at the cross-chain bridge creation and management system 306. For example, bridge manager 326 may include a database for storing bridge parameters. In some embodiments, the parameters are encrypted before being stored. In some examples, the bridge parameters or source code are stored in a database or elsewhere. After the bridge is destroyed, an AI system can determine whether to recreate the bridge based on user interactions with one or more blockchains. When the system determines that the bridge should be recreated, bridge's parameters or source code are used to generate the new bridge.

In some examples, an AI system monitors communications across the bridge. The AI system may monitor such communications directly, or may monitor logs of communications generated from monitors either at the bridge or elsewhere within an overall system, as described in further detail in Part III, below. A bridge may be destroyed if it is no longer being used and/or if a security threat is detected. In some examples, a bridge will not be recreated if it was destroyed because of a detected security threat, but might be recreated if the bridge was destroyed because it was no longer being used. In the second instance, it may be determined at a future time that a replica of the original bridge is needed based on user interactions with the blockchain.

FIG. 11 illustrates an example method 600 for a cross-chain bridge recreation mechanism, in accordance with some embodiments of the present disclosure. In some embodiments, the method 600 is performed, in whole or in part, by the cross-chain bridge creation and management system 306 shown in FIG. 6. As illustrated, method 600 includes operations 602, 604, 606, 608, and 610.

In the example shown, operation 602 includes monitoring interactions with a first blockchain and/or a second blockchain. Monitoring interactions may be performed, as noted above, by an AI system, which may monitor interactions at the bridge directly, or may analyze logs gathered in accordance with the monitoring processes described below in Part III.

In the example shown, operation 604 includes determining that a new bridge between the first blockchain and the second blockchain is needed based on the interactions. Examples for monitoring transactions to determine whether a new bridge between blockchains is needed are described herein. Briefly, new bridges might be desired when it is desired to create multiple bridges between blockchains, for example, per transaction type, and where a bridge may be needed to accommodate a new transaction type. Alternatively, a new bridge may be desirable if a vulnerability or performance issue is detected in an existing bridge.

In the example shown, operation 606 includes determining that a type of the new bridge corresponds to a previously destroyed bridge (e.g., a bridge for which a vulnerability was detected, or where a previous bridge was destroyed due to non-use).

In some embodiments, an AI system monitors transactions at the operation 602 and determines that a new bridge is needed at the operation 604, and determines that the type of the new bridge corresponds to a previously destroyed bridge at the operation 606. The AI system may be used to automatically determine whether to recreate a previously destroyed bridge. In some embodiments, it may be determined, at operation 606, to not recreate a same bridge because the previously destroyed bridge was destroyed because of a security threat: rather, a different bridge may be created.

In the example shown, operation 608 includes retrieving bridge parameters or bridge source code used to create the previously destroyed bridge, such as from a secured database or data store, e.g., at bridge manager 326.

Additionally, in the example shown, operation 610 includes generating the new bridge using the retrieved parameters or code. In some embodiments, the new bridge is created with an AI system, such as in accordance with the bridge and smart contract creation processes described above. In an example, one or both of the model parameters and source code are provided to a generative AI model with a prompt that includes a request to correct one or more issues with the original bridge (e.g., problems that originally caused the bridge to be destroyed).

In some examples, parameters of an AI algorithm (e.g., a language model) used to create the previously destroyed bridge are stored for later use in generating a new bridge.

FIG. 12 is a system-flow diagram illustrating an example system 650 for a cross-chain bridge recreation mechanism. In some embodiments, AI is used to recreate destroyed cross-chain bridge on demand or via an automated process. In some embodiments, the AI system retrains and recreates the cross-chain bridge in response to receiving a recreate request signal. The system 650 may be implemented, in whole or in part, on the cross-chain bridge creation and management system 306, and performs operations 651, 652, 653, 654A, 654B, 655, 656A. and 656B.

At operations 651 and 652, an AI system is trained to create the bridge 316 to allow for transactions between the first blockchain 312 and the second blockchain 314. In some embodiments, the smart contract 128 defining the bridge 316 is generated by processing the smart contract logic description 124 with the generative smart contract model 126. Examples of such an arrangement are disclosed herein.

In some embodiments, the parameters used to generate the bridge 316 are stored in a database along with the bridge digital asset (e.g., via a database 1201). An example method 400 for creating the cross-chain bridges is illustrated and described in reference to FIG. 9.

In the example shown, operation 653 includes destroying the bridge 316 in response to receiving a destruction signal (e.g., the operation 405 of FIG. 9).

At operation 654A, a deep learning system determines from the users' interactions whether to recreate the bridge 316 after the bridge has been destroyed. If it is determined to recreate the cross-chain bridge, the operation 654B transmits a request signal to initiate the cross-chain bridge recreation process in which the AI system is responsible for recreating the bridge 316.

At the operation 605, the AI system regenerates the bridge 316. For example, the bridge may be re-generated using the model parameters used to generate the original bridge.

Operations 656A and 656B repeat the process of operations 654A and 654B, respectively, in response to receiving a request to recreate a destroyed bridge. This process can be repeated on demand, e.g., destroying and recreating bridges based on the monitored transactions with the first blockchain 312 and the second blockchain 314.

Figure 13:
FIG. 13 illustrates an example method for cloning a cross-chain bridge, in accordance with some embodiments of the present disclosure.
Figure 13:
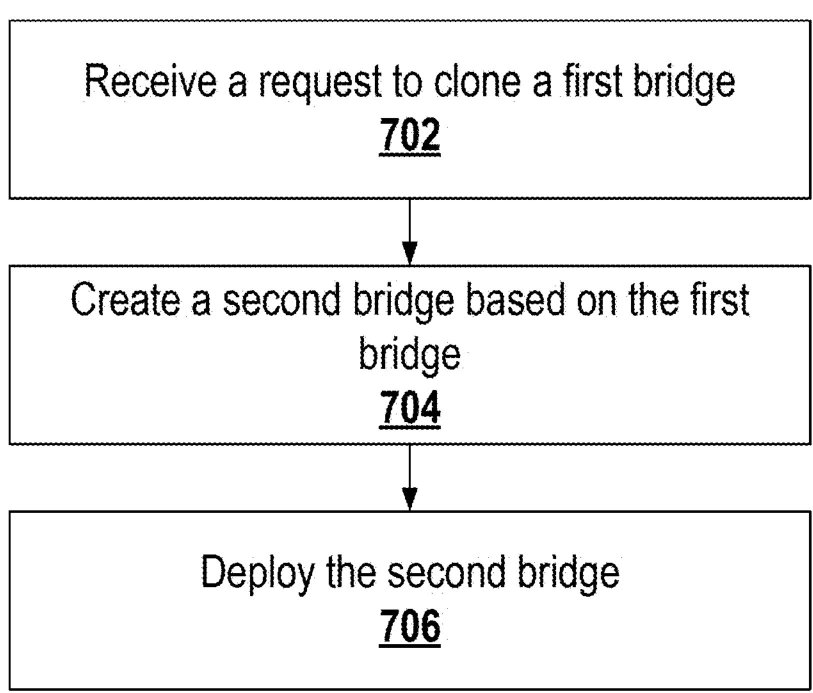
Figure 14:
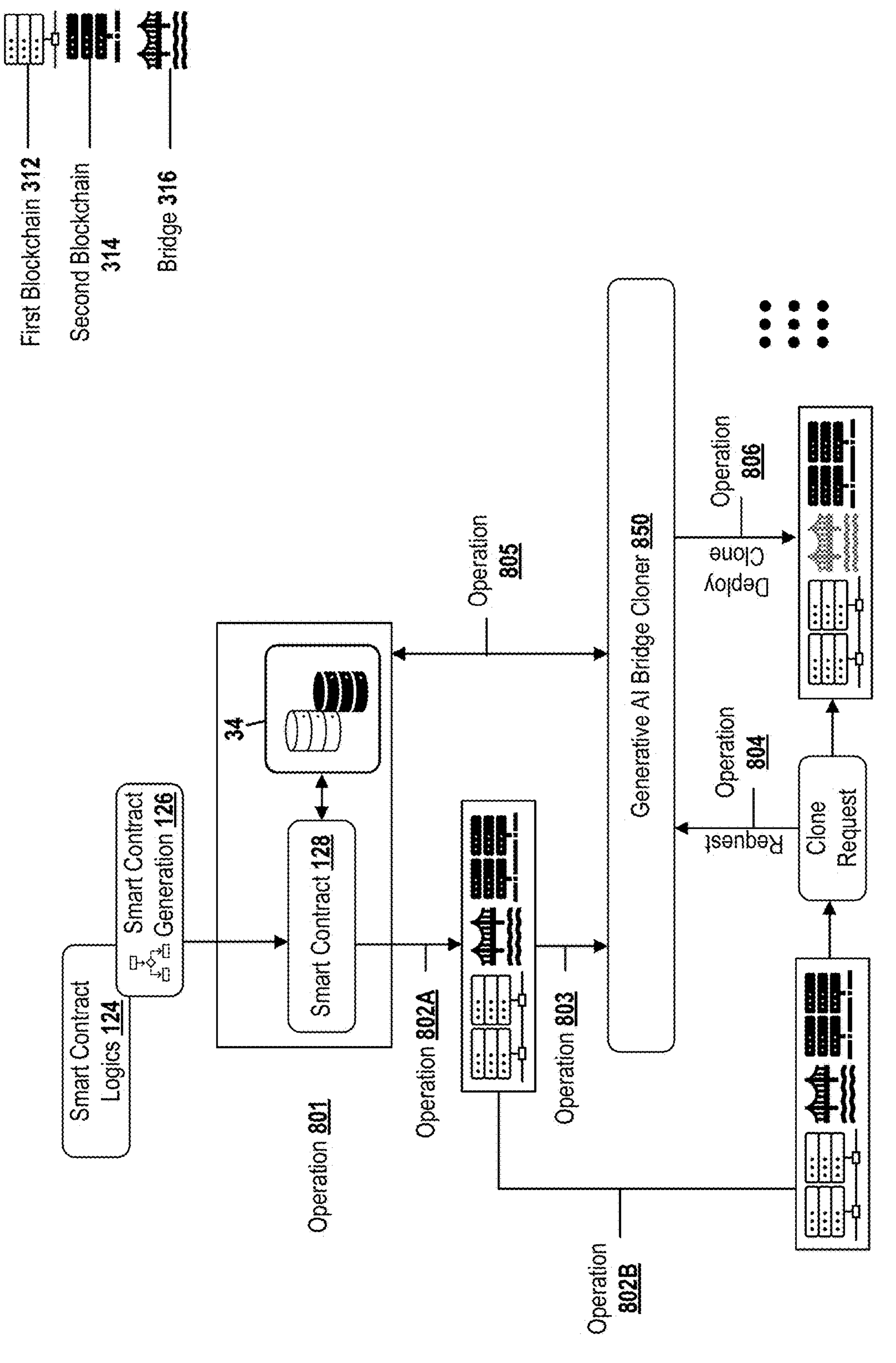
FIG. 14 is a system flow diagram illustrating an example method using the AI system to clone a cross-chain bridge, in accordance with some embodiments of the present disclosure.

FIGS. 13 and 14 illustrate examples of a mechanism for cloning a bridge. In some embodiments, the mechanism is used to clone a bridge on demand, for example to enhance the efficiency of one or more blockchain networks. In some embodiments, an AI system monitors interactions with a blockchain and triggers the cloning of a bridge based on the observed demand for certain types of transactions.

In some examples, an AI system is trained to recreate a bridge for example, in response to a smart contract condition or based on the interactions with a blockchain indicating an identical bridge is needed. In some examples, the cloned bridge is identical to the original bridge but configured to operate with one or more different blockchains. In some examples, a few parameters of the cloned bridge are modified to operate in the new context (e.g., to allow the cloned bridge to operate in a different operating environment/system architecture) but across the same or different blockchains as might be required. In some examples, the parameters are the same and the cloned bridge is used for redeployment.

For example, based on transaction volumes of a particular type, it may be determined that a duplicate or cloned bridge may be required to assist with transaction processing. Such a bridge may be automatically created to improve transaction processing performance.

In some examples, a generative AI bridge cloner is trained to clone bridges when a clone request signal is received. The AI bridge cloner interfaces with an oracle (e.g., oracle 34) to acquire the bridge digital asset and/or smart contract instructions. After the bridge is generated, it can be deployed on a blockchain. In some embodiments, the AI bridge cloner is a component of the bridge manager 326 illustrated and described in FIG. 6.

FIG. 13 illustrates an example method 700 for cloning a cross-chain bridge, in accordance with some embodiments of the present disclosure. In some embodiments, the method 700 is performed at the cross-chain bridge creation and management system 306 as shown in FIG. 6. In the example shown, the method 700 includes operations 702, 704, and 706.

In the example shown, operation 702 includes receiving a request to clone a first bridge. In some embodiments, the request is received form an AI system monitoring transactions with at least one of the blockchains linked by the bridge (e.g., at cross-chain bridge creation and management system 306). In some embodiments, the request to clone the bridge is sent based on a smart contract condition occurring or executing.

In the example shown, operation 704 includes creating a second bridge which is a copy of or based on the first bridge. In some embodiments, the second bridge is created using a generative AI system to clone the first bridge. In some embodiments, the second bridge includes modified parameters based on a context of the environment that the second bridge is to be deployed. For instance, a generative AI system can be provided with a prompt that includes parameters or code of the first bridge along with one or more desired modifications for the second bridge.

As illustrated, operation 706 includes deploying the second bridge. Deploying the second bridge may include deploying the one or more smart contract to establish the interface between blockchains, as well as any listening nodes, validators, or other monitoring/audit tools that may accompany the bridge.

FIG. 14 is a system flow diagram illustrating an example system 800 that utilizes the AI system to clone a cross-chain bridge. In some embodiments, the AI system is trained to create well optimized and secured cross-chain bridges and clone them on demand. In some embodiments, the AI system clones a cross-chain bridge after receiving clone request signal. In some embodiments, AI is used to clone and deploy a cross-chain bridge on demand or via an automated process. In the example shown, the system 800 performs the operations 801, 802A, 802B, 803, 804, 805, and 806.

In the example shown, operation 801 includes the AI system creating a smart contract 128 defining the bridge 316 and provides the digital asset to the bridge 316 via the oracle 34. In the embodiment shown, the smart contract 128 is generated by processing the smart contract logic description 124 with a generative smart contract model 126.

Operation 802A includes creating the bridge 316 based on a condition in the smart contract. Examples for generating a smart contract 128 are disclosed herein. Operation 802B includes deploying the cross-chain bridge, as described above. Once deployed the bridge 316 operates to allow transactions between a first blockchain 312 and a second blockchain 314.

Operation 803 includes training the AI system to clone the bridge 316. In some embodiments, the AI system includes a bridge cloner 850. The bridge cloner 850 can be configured to clone a bridge using generative AI. At the operation 804, the network sends a clone request signal to the bridge cloner 850. In some embodiments, the clone request signal is sent on-demand. In response to receiving the clone request signal, the bridge cloner 850 communicates with a database to acquire the cross-chain bridge digital asset and/or smart contract instruction at the operation 805. The operation 806 deploys the cloned bridge.

Referring to FIGS. 6-14 overall, use of automated bridge creation, cloning, destruction may allow for convenient migration across bridges, which may limit the extent to which a connection between blockchains, such as blockchains 312, 314, may be interrupted, and may also improve security overall by improving the convenience with which bridges may be replaced with new bridges having improved security features. Furthermore, in particular in circumstances where bridges are managed on a per-transaction type basis, may have particular advantages. For example, it may be easier to detect suspect activity within a particular transaction type: as such, monitoring of a bridge used only for that transaction type may allow for improved detection of fraud or hacking activity, or other bridge malfunction. Also, if a bridge is required to be destroyed, migrated, or cloned, such operations may be performed without affecting operation of other bridges between blockchains 312, 314 without affecting operation of other bridges which may remain operational.

III. Layer 2 Monitoring

Example aspects of the present disclosure also include a system for monitoring and analyzing network data for a layer 2 blockchain solution. In some instances, a layer 2 solution performs operations that would otherwise be performed by a layer 1 blockchain, thereby offloading some work from layer 1 to layer 2 and improving the scalability of the layer 1 blockchain. Thus, layer 2 solutions may operate on top of a layer 1 blockchain (e.g., Bitcoin or Ethereum as described above) to improve scalability, privacy, and other characteristics of the layer 1 blockchain.

In example aspects, the layer 2 monitoring and analysis system may receive information at a log collector from different collection points, both internally (private to an organization or enterprise) and externally (public or related to a third party). The collected information may be monitored and analyzed via traditional techniques and/or artificial intelligence models. In example embodiments, analysis of logged transaction data might be done by an adaptation of network optimization monitoring techniques into blockchain network monitoring. Additionally, the system may be used to provide actions to optimize a blockchain network in an online fashion or offline fashion. This may include optimizing a layer 2 solution.

Figure 15:
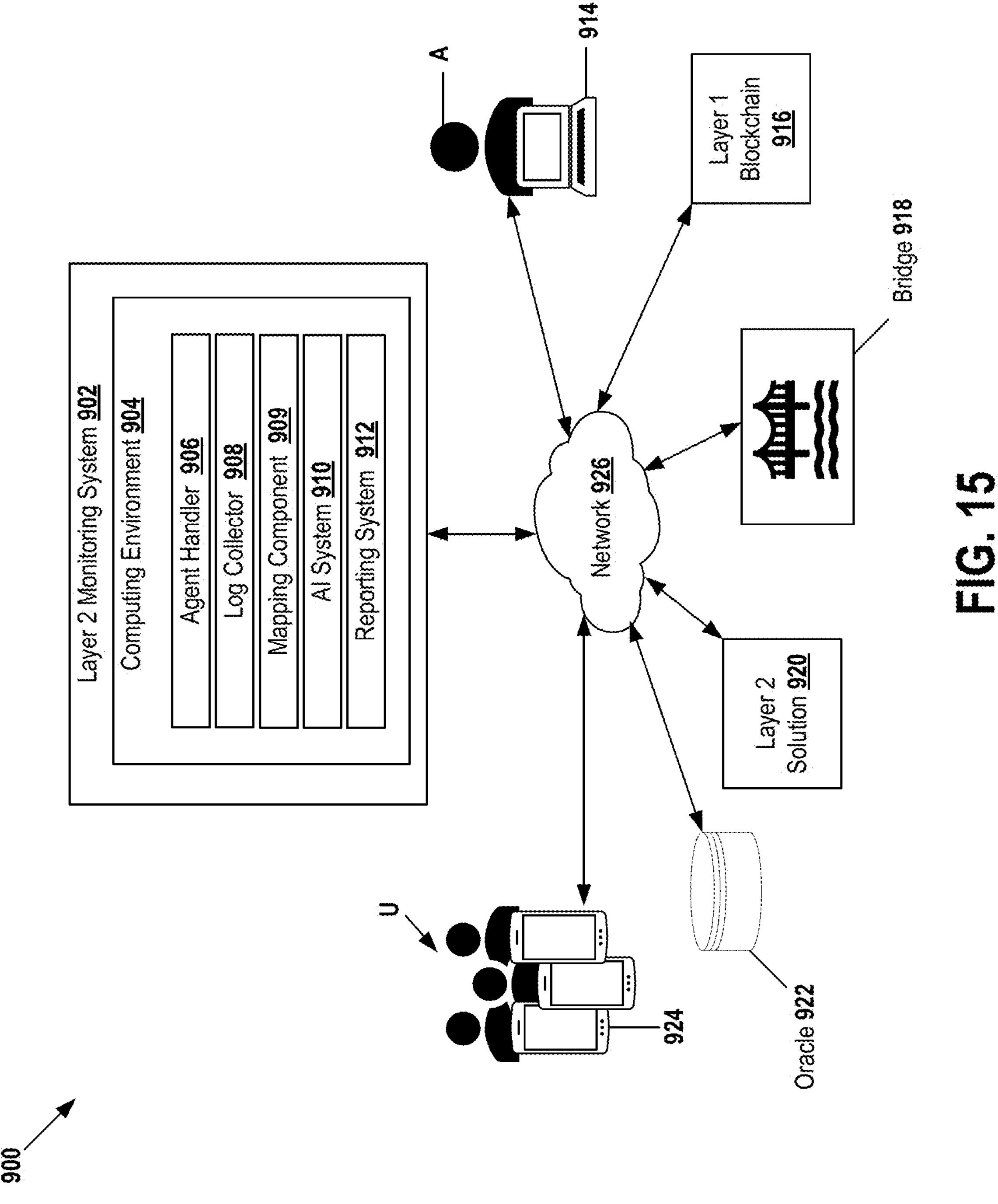
FIG. 15 illustrates a network environment in which a layer 2 monitoring system may be implemented.

FIG. 15 illustrates an example environment 900 for a layer 2 monitoring system 902, in accordance with some embodiments of the present disclosure. In the example shown, the environment 900 includes the layer 2 monitoring system 902, an administrator device 914, a layer 1 blockchain 916, a bridge 918, a layer 2 solution 920, an oracle 922, and a plurality of user devices 924. The example of FIG. 15 further includes an administrator A and a plurality of users U.

In example embodiments, the layer 2 monitoring system 902 includes a collection of hardware and software that may receive network activity data from a blockchain network, analyze the information, and correct one or more parameters of the blockchain network based on the analysis of the information. In the example of FIG. 15, the layer 2 monitoring solution 902 includes a computing environment 904, an agent handler 906, a log collector 908, a mapping component 909, an AI system 910, and a reporting system 912. In some embodiments, one or more of the components of FIG. 15 may be part of a blockchain network. In some embodiments, a blockchain network may include the layer 1 blockchain 916 and layer 2 solutions (e.g., the layer 2 solution 920) that are coupled to the layer 1 blockchain 916.

In example embodiments, computing environment 904 may comprise one or more computing devices which provide layer 2 monitoring services described herein. In some embodiments, the computing environment 904 includes the components and functionality of the computing environment 1600, as illustrated and described in FIG. 22. In the example shown, the computing environment 904 includes modules for the agent handler 906, the log collector 908, the mapping component 909, the AI system 910, and the reporting system 912.

An agent handler 906 can be a software program that manages agents, such as by generating, deploying, and interacting with agents. An agent may be a software program that detects or monitors network activity data and provides the network activity data to the layer 2 monitoring system 902. In some embodiments, an agent may call a smart contract to retrieve data related to a blockchain on which the smart contract is deployed or to retrieve other data that can be accessed by the smart contract. In some embodiments, the configuration of an agent may depend on the component that the agent is monitoring. For instance, an agent deployed to monitor data on a layer 2 sidechain may differ from an agent deployed to monitor a bridge, which may be different from an agent that is deployed to monitor an oracle. An agent can monitor transactions on a chain. An example of using the agent handler 906 to generate and deploy agents is further described below in connection with FIG. 16.

A log collector 908 can be a software program configured to receive data from agents (e.g., directly or via the agent handler 906) and store the data, such as in a data store. To do so, the log collector 908 may include an endpoint for interacting with a plurality of distributed agents, and the log collector 908 may interact with one or more data storage systems (e.g., cloud storage systems). As part of receiving and storing data, the log collector 908 may, in some embodiments, generate additional data (e.g., metadata, such as a time at which network data was received by the log collector, an identification of the agent that collected the network data, etc.), or the log collector 908 may format or otherwise alter data received from agents. Additionally, in some embodiments, the log collector 908 may use the mapping component 909 to map blockchain operation parameters to non-blockchain operation parameters, which may be analyzed by the AI system 910.

The mapping component 909 can be a software program that maps network activity data from a blockchain network to traditional, non-blockchain network operation parameters. For example, for a given component of a blockchain network (e.g., transactions at a layer 2 solution, such as a sidechain, or activity at an oracle), the mapping component 909 may map data retrieved from that component to a metric or parameter that may be monitored in typical networks. Example operation parameters to which data may be mapped include the following: throughput, network latency, network utilization, packet loss, jitter, network faults, network anomalies, bandwidth or other resource usage, quality of service parameters, traffic patterns, application performance, user activity, or another metric. The log collector 908 may use the mapping component 909 to map the data received from a plurality of agents to traditional network monitoring metrics. In some embodiments, by mapping blockchain network metrics to traditional network parameters, the blockchain metrics may be analyzed by downstream services. Advantageously, by mapping blockchain network operation parameters to non-blockchain operation parameters, analysis systems (e.g., the AI system 910) that may be trained on non-blockchain data may be used as part of analyzing and monitoring blockchain network activity data.

In example aspects, each component of a blockchain network may require a different mapping. Some examples mappings may include:

At a sidechain, a mapping of transaction volume in the web to sidechain channel, or sidechain network metrics, such as processing speed/frequency, network capacity, transactions per second, processing unit overload and the like, may be mapped to non-blockchain network diagnostics, such as packet processing speed/capacity, transactions per second, and the like.

At a blockchain oracle, distribution of data, data sharding, speed and latency to gather and provide external data, fault points, and the like may be mapped to other non-blockchain network or processing diagnostics, such as storage and retrieval latencies of data storage networks and devices.

Similar mapping of potential network monitoring and optimization metrics to those occurring at a bridge (e.g., bridge throughput, transaction volumes, delays in lock/unlock of assets or token minting, and the like) may be mapped to non-blockchain transaction processing time/bandwidth measures.

In example embodiments, the AI system 910 includes one or more AI models or applications for analyzing network activity data. The AI system 910 may include one or more generative AI systems, deep learning models, and/or multi-modal or classifier models, and may be used to detect an event based on the network activity data collected at the log collector 908. In some embodiments, an event may be an occurrence, trend, or condition in the blockchain network. In some embodiments, the AI system 910 may, based on a network event or condition, determine one or more optimization values for one or more operation parameters of the blockchain network. In some embodiments, the AI system may include one or more models that are trained using layer 2 blockchain processing information. For example, the models may be trained using historical or synthetic data (e.g., transaction) that occur in connection with a layer 2 solution.

In some embodiments, the AI system 910 may perform one or more of the following: anomaly detection to determine anomalies in transaction traffic: analysis of transaction data to determine possible failures of individual entities or devices, including endpoints, but also devices hosting the layer 2 solution 920, oracle 922, and/or bridge features; capacity planning and/or network performance optimization: identifying performance and security issues: root cause analysis; and user behavior analysis, for example to identify potential fraud or security threats. Other types of transaction information may be determined as well, such as traffic classification (port-based, payload-based, flow-based, etc.), fault management (fault detection, isolation, correlation, etc.), network security (anomaly detection, misuse detection, bot detection, malware detection, etc.), traffic prediction, and others. More generally, use cases to which the AI system 910 may be applied may involve traditional AI/ML models for classification, regression, clustering, pattern detection, anomaly detection, or also more advanced reinforcement learning settings for online network optimization.

In some embodiments, the AI system 910 may generate an optimized parameter template that includes one or more optimization values that may be used to set parameters at the layer 2 solution 920 or that may be provided to the reporting system 912. In some embodiments, the AI system 910 may provide analysis of the network activity data to the reporting system 912. The AI system 910 may provide the collected and extracted information to the reporting system 910 so that the information may be accessed privately in an internal system and/or publicly.

In example embodiments, reporting system 912 receives data from one or more other components of the layer 2 monitoring system 902 and displays the data. In some embodiments, the reporting system 912 includes a reporting application that may be accessed by the administrator device 914. The reporting application may include one or more of a web application, a mobile application, or a desktop application. The reporting system 912 may include a graphical user interface via which the reporting system 912 may display data related to a blockchain network. In some embodiments, the reporting system 912 may display reports that include analysis from the AI system 910. In some embodiments, the reporting system 912 may provide an alert or notification to a user in response to the AI system 910 detecting an event (e.g., an anomalous transaction or a condition indicating that resources of the blockchain network are overloaded or underutilized). In some embodiments, an administrator or engineer may alter an operation parameter of a blockchain network using the reporting system 912.

In example embodiments, administrator device 914 may be used by the administrator A to access the layer 2 monitoring system 902. The administrator device 914 may be a computing device, examples of which are described above in connection with the device 12 of FIG. 1. In some embodiments, the administrator A may use the administrator device 914 to view data of the reporting system 912, to update the mapping component 909, or to retrain or reconfigure one or more models of the AI system 910.

As noted above, the layer 1 blockchain 916 may be a blockchain, such as Bitcoin or Ethereum. Example aspects of the layer 1 blockchain 916 are described above in connection with the blockchain 40 of FIG. 1. There may be one or more layer 2 solutions associated with the layer 1 blockchain 916, one or more of which may offload traffic (e.g., transactions) from the layer 1 blockchain 916 to the layer 2 solution. Such layer 2 solutions may be managed by individual entities or organizations, such as financial institutions, credit companies, insurance companies, or other transaction facilitation entities, In example embodiments, bridge 918 communicatively couples the layer 1 blockchain 916 and the layer 2 solution 920, in accordance with the discussion provided above in Parts I-II. In some examples, the bridge 918 may include a plurality of bridges, such as a first, internal bridge that is associated with a first, internal layer 2 solution, and a second, external bridge that is associated with a second, external layer 2 solution, as described below in connection with FIG. 18. In example implementations, the one or more bridges 918 are implemented as software protocols and/or smart contracts useable to facilitate movement of digital assets or data between the layer 2 solution 920 and the main, layer 1 blockchain 916. When a user sends assets from the layer 2 solution 920 to the layer 1 blockchain, for example, the bridge 918 may lock the assets on the layer 2 solution 920 and issue a corresponding token on the layer 1 blockchain 916. Similarly, when assets are sent from the main blockchain 916 to the layer 2 solution 920, the bridge 918 may mint new tokens on the sidechain and lock the corresponding assets on the main chain. Implementation details of the bridge 918 may depend on a type of layer 2 solution that the bridge 918 couples with the layer 1 blockchain 916. For example, a first type of bridge may be used to couple a sidechain with the layer 1 blockchain 916, whereas a second type of bridge may be used to couple a rollup with the layer 1 blockchain 916.

Depending on the embodiments, the layer 2 solution 920 may take various forms. For example, the layer 2 solution may be a sidechain. A sidechain may be a blockchain that connects to, but runs independently from, a layer 1 blockchain 916. As a sidechain, the layer 2 solution 920 may be separate from the main, layer 1 blockchain 916, and can operate with its own unique consensus rules, transaction types, and token economics relative to the main blockchain 916. As another example, the layer 2 solution 920 may be a rollup. A rollup may be a system that aggregates transactions and then provides the aggregated transaction to the layer 1 blockchain 916. Example types of rollups include optimistic roll-ups and zero knowledge roll-ups. Irrespective of how it is implemented, the layer 2 solution 920 may be communicatively coupled to one or more of the layer 1 blockchain 916 or the oracle 922 to access information or data that is not available within the layer 2 solution 920 itself.

In some embodiments, the layer 2 solution 920 may include multiple systems. For example, the layer 2 solution 920 may include multiple sidechains, including private sidechains (e.g., those maintained or owned by an enterprise) and public sidechains (e.g., available Layer 2 s solutions, such as Polygon Matic, Optimism, etc.). In some embodiments, the layer 2 solution 920 may include a plurality of different types of sidechains, including both a sidechain and a rollup.

In example embodiments, the oracle 922 provides a mechanism for the layer 2 solution 920 to access information from external sources. For example, the layer 2 solution 920 may access data that may not be natively available on the layer 2 solution 920 itself. In various embodiments, the oracle 922 can be implemented in a variety of ways, depending on the specific needs of the layer 2 solution 920. For example, in an example, the oracle 922 may be configured to obtain data from trusted third-party data sources and/or decentralized data feeds to ensure accuracy and integrity of obtained data, and may provide additional descriptive information that may be relevant to a smart contract maintained on the layer 2 solution 920, for example related to a transaction that may not be obtained directly as part of the transaction itself. In some embodiments, the layer 2 solution 920 may use the oracle 922 to provide information to an external, off-chain resource.

In example embodiments, user devices 924 are computing devices that are used by the users U to interact with components of a blockchain network, such as the layer 1 blockchain 916, the layer 2 solution 920, or another component of the computing environment 1600. Example aspects of the user devices 924 are further described above in connection with the user device 12 of FIG. 1.

In example embodiments, the network 926 communicatively couples components of the computing environment 1600. The network 926 may be, for example, a wireless network, a wired network, a virtual network, the internet, or another type of network. Furthermore, the network 926 may be divided into subnetworks, and the subnetworks can be different types of networks or the same type of network.

Figure 16:
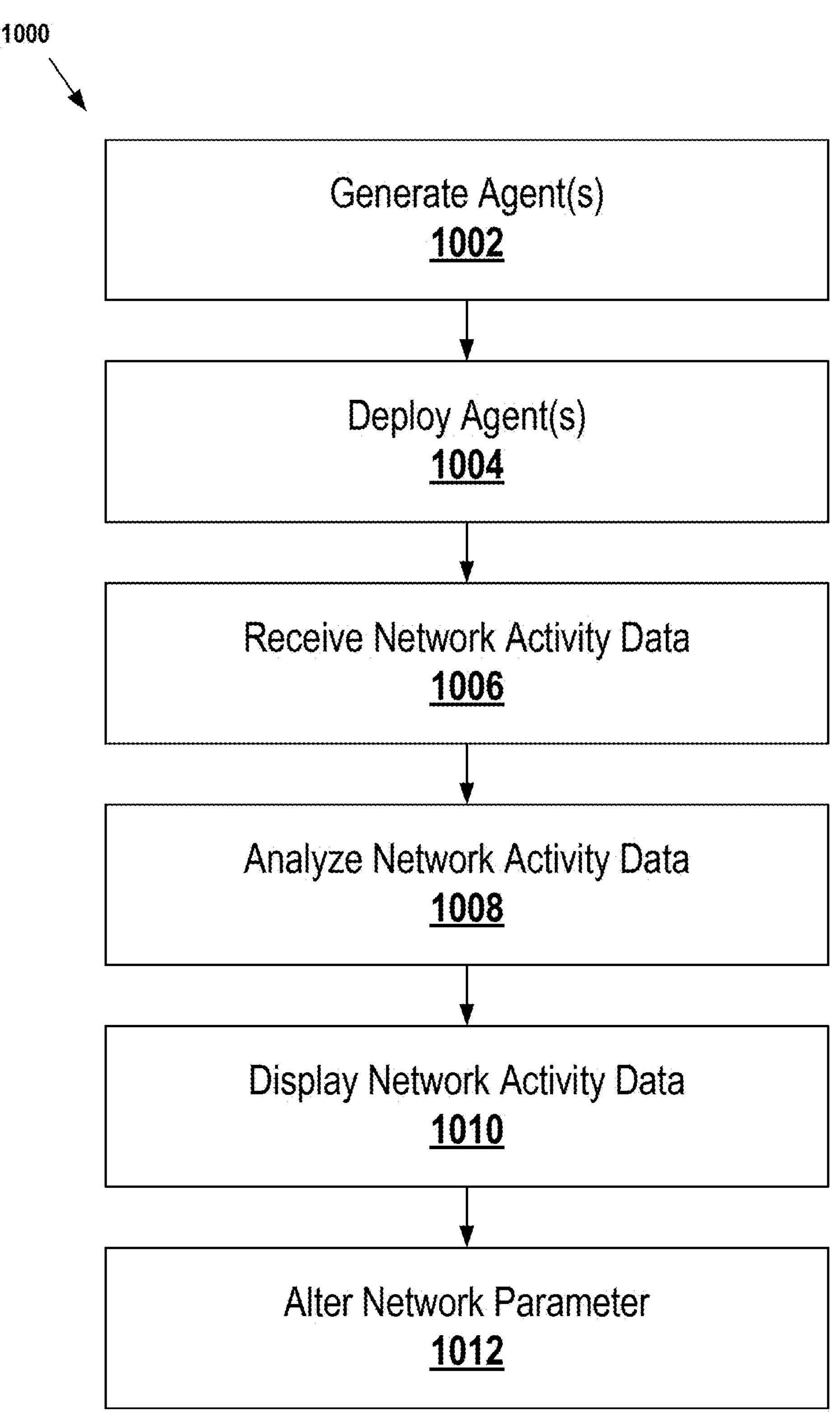
FIG. 16 is a flow chart of an example method for monitoring a blockchain network.

FIG. 16 is a flowchart of a method 1000 for monitoring a blockchain network. As described herein, operations of the method 1000 may be performed by certain components of the layer 2 monitoring system 902. In some embodiments, however, other components may perform the operations of the method 1000.

In the example shown, at operation 1002, the agent handler 906 may generate agents. For example, the agent handler 906 may identify one or more components of a blockchain network to monitor. In some embodiments, the agent handler 906 may identify components that may be part of a layer 2 blockchain network, such as a layer 2 solution, a bridge coupled to the layer 2 solution, and an oracle coupled to the layer 2 solution. In some embodiments, for each component to monitor, the agent handler 906 may generate an agent.

The configuration of an agent may depend on the component that the agent is to monitor. In some embodiments, an agent may be configured to call a smart contract to receive network activity data, such as a smart contract that is part of a sidechain or bridge. In some embodiments, one agent may monitor a plurality of components of a blockchain network. In some embodiments, the agent handler 906 may use AI to generate an agent. To do so, the agent handler may use techniques described above in Part I, related to AI-generated smart contracts. In an example, a prompt describing the purpose of the agent is generated and provided to a generative AI to produce code that, when executed, acts as an agent that fulfills the purpose. In some embodiments, generating an agent may include cloning an agent.

In the example shown, at operation 1004, the agent handler 906 may deploy agents. For example, for a given agent that is configured to monitor a given blockchain network component, the agent may be installed on a server. The server may be a common server as the blockchain network component or on a different server from the blockchain network component. In some embodiments, an agent may be deployed in a cloud-based computing environment.

In the example shown, at operation 1006, the log collector 908 may receive network activity data. For example, from one or more deployed agents, the log collector 908 may receive network activity data corresponding to blockchain network components that are being monitored by the deployed agents. The network activity data may represent transactions at a layer 1 blockchain or a layer 2 solution, and the network activity data may include data exchanges between blockchain network components. In some embodiments, the log collector 908 may receive data in real time from agents. In some embodiments, one or more deployed agents may call an endpoint exposed by the log collector 908 to provide data to the log collector 908. In some embodiments, the log collector 908 may poll one or more of the deployed agents to receive network activity data. In some embodiments, the log collector 908 may map the received network activity data to typical network parameters, as described above in connection with the mapping component 909. The log collector 908 may also, in some embodiments, receive data from sources other than the agents.

In the example shown, at operation 1008, the AI system 910 may analyze the network activity data. For example, the AI system 910 may apply one or more models or applications to the network activity to detect an event, which may include identifying a trend, condition, or occurrence in the blockchain network. Aspects of the AI system 910 are described above in connection with FIG. 15.

In the example shown, at operation 1010, the reporting system 912 may display network activity data. For example, the reporting system 912 may receive data from one or more of the log collector 908 or the AI system 910, and the reporting system 912 may display at least some of this data, as described above in connection with FIG. 15.

In the example shown, at operation 1012, the layer 2 monitoring system 902 may alter a network parameter. For example, the layer 2 monitoring system 902 may alter an operation parameter of one or more of the layer 1 blockchain 916, the bridge 918, the layer 2 solution 920, the oracle 922, or any hardware or software components coupled with components in a blockchain network. In some embodiments, altering the network parameter may be a corrective action taken in response to detecting, at the AI system 910, an event or condition in the network activity data. In some embodiments, altering the network parameter may be performed by the layer 2 monitoring system 902 based on an input from a network administrator or engineer. Examples of altering a network parameter may include the following: halting a transaction: generating an alert or notification: displaying the alert or notification: destroying a bridge: provisioning or retracting computational resources for use by a layer 2 solution or another component of a blockchain network: or updating an operation parameter of a component in a blockchain network, such as a layer 2 solution.

In some embodiments, the layer 2 monitoring system 902 may update an operation parameter of a blockchain network according to an optimized value for the parameter, as determined by the AI system 910. This may take the form of optimized parameter templates produced by one or more AI models of the AI systems 910, which are then distributed to the layer 2 solution 920, oracle 922, bridge 918, and/or log collector 908 itself. Additionally, layer 2 monitoring system 902 may, by use of the AI systems 910 and reporting system 912 (e.g., via an administrative user) create scenarios for best practices (e.g., what parameters to tune to achieve best performance at high volume of transactions).

Figure 17:
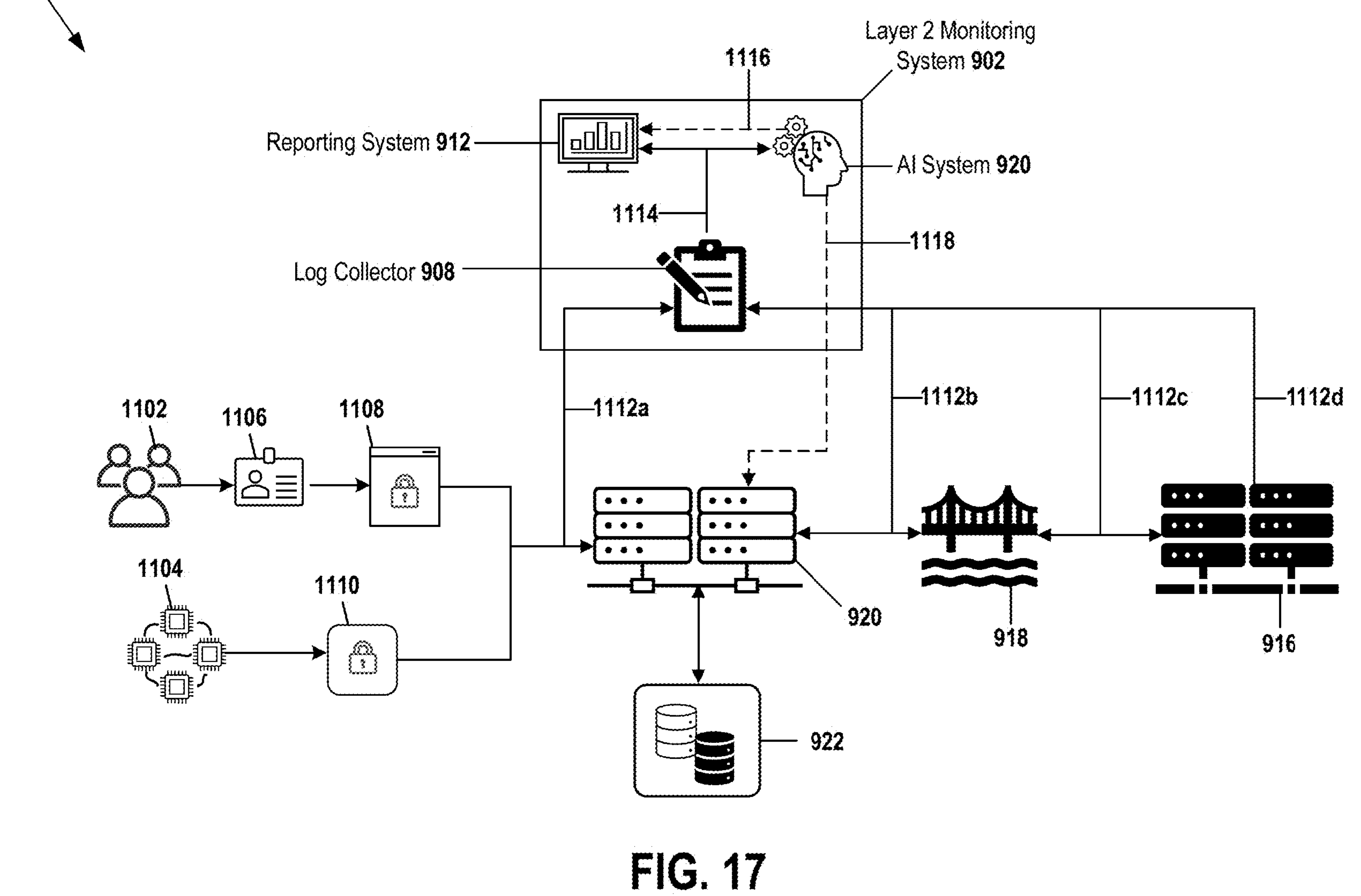
FIG. 17 illustrates a system flow diagram illustrating an example method for monitoring a blockchain network.

FIG. 17 illustrates a system-flow diagram of a system 1100 that depicts a blockchain network in context. The system 1100 includes components from the computing environment 1600, and the system 1100 includes operations 1112-1116, which depict example operations of and data flows between components of the system 1100. Aspects of the operations 1112-1116 are described above in connection with FIG. 16.

The system 1100 may involve one or more users 1102 and/or edge computing devices 1104 within an overall computing infrastructure. An access engine 1108 may perform authentication via a decentralized authentication interface 1106 to authenticate one or more of the users 1102, and the users 1102 may use the access engine 1108 to interact with components of a blockchain network, such as the layer 2 solution 920. The edge computing devices 1104 may include, for example, an automated teller machine (ATM), a camera, or other edge devices. Each edge device may have a protective device ID 1110 and may interact with the users 1102, which may also be uniquely authenticated. In some examples, users 1102 and/or edge computing devices 1104 may be as described above in conjunction with the external interface 101 of FIG. 4.

In the example shown, the layer 2 solution 920 is a sidechain. The sidechain may register a variety of transactions by users 15042 and/or edge computing devices 1104, as well as transactions bridged to the layer 2 solution 920 from the layer 1 blockchain 916. In this context, the users 1102 may be customers that, via an authentication interface 1106, may interact with the main blockchain 916 with an access engine 1108 via the layer 2 solution 920. The edge computing devices may also interact with the layer 2 solution 920 via transactions. In example implementations, the layer 2 solution 920 may be used to process transactions of smart contracts, for example to approve smart contract-based transactions that are performed separately from the main blockchain 916.

In the embodiment shown, the log collector 908 is communicatively coupled within the system 1100, and gathers information from different components of the network, including the users 15042 and edge computing devices 1104. The collected information is reported in a monitoring interface of the reporting system 912. Reports presented in the monitoring interface may be enhanced by one or more models or applications of the AI system 910. The information gathered in the log collector 908 may be used for an online or offline optimization of the layer 2 solution 920. As described above, the log collector 908 may map network optimization techniques that might otherwise be used in a standard communication network onto block chain layer 2. This mapping allows for use of traditional (non-blockchain) monitoring and optimization techniques within the block chain context.

In the example shown, the operations 1112-1116 illustrate operations of and data flows between components of the system 1100.

At operations 1112*a-d*, the log collector 908 may receive network activity data from a plurality of components of the system 1100. To do so, the log collector 908 may receive data from a plurality of agents deployed to monitor components of the system 1100, as described above in connection with FIG. 16.

At operation 1114, the log collector 908 may provide the network activity data to one or more of the AI system 910 or the reporting system 912. Furthermore, the log collector 908 may map the network activity data to operation parameters of non-blockchain networks.

At operation 1116, the AI system 910 may provide data to the reporting system 912. For example, the AI system 910 may provide an analysis of the network activity data to the reporting system 912. For example, the AI system 910 may provide one or more of a report, a notification, an alert, or other data to the reporting system 912.

At operation 1118, the layer 2 monitoring system 902 may update a network parameter, as described above in connection with FIG. 16. In the example of FIG. 17, the AI system 910 may alter a parameter of the layer 2 solution 920. As an example, the AI system 910 may automatically halt a transaction on the layer 2 solution 920 in response to detecting anomalous activity related to the layer 2 solution 920, or the AI system 910 may sever a connection between the layer 2 solution 920 and the bridge 918.

Figure 18:
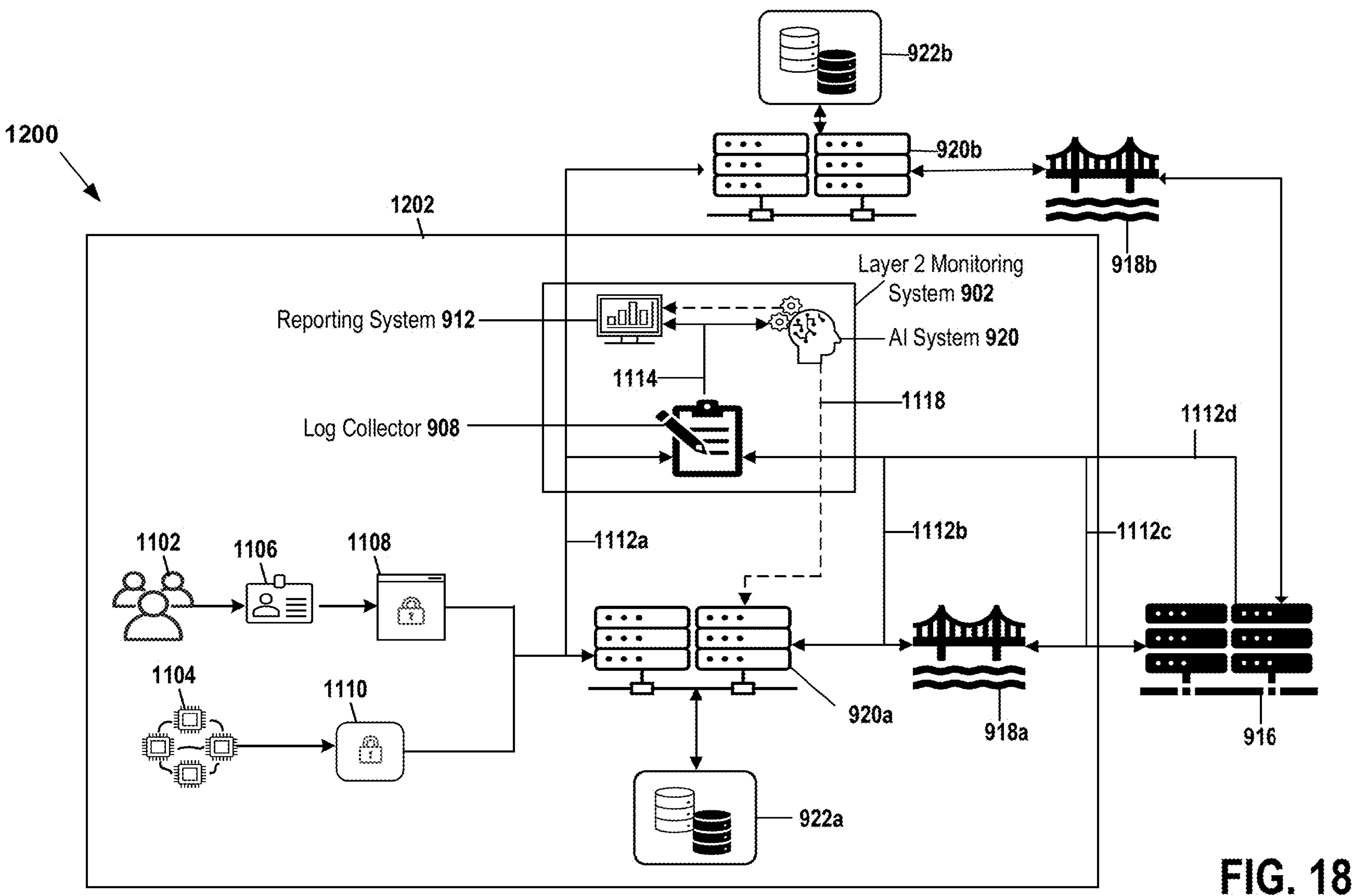
FIG. 18 illustrates a system flow diagram illustrating an example method for monitoring a blockchain network.

FIG. 18 illustrates a system-flow diagram of a system 1200. The system 1200 includes components that are illustrated and described above in connection with the FIGS. 15 and 17. The system 1200 further includes operations and data flows that are analogous to those described above in connection with FIGS. 16 and 17. The system 1200 further includes an organization 1202. As illustrated by the box depicted in FIG. 18, the organization 1202 may own, operate, or otherwise be affiliated with some components of the system 1200 but not others. For example, the components that are described in connection with FIG. 18 as "internal" may be owned, operated, or otherwise affiliated with the organization 1202, whereas components that are described as "external" may not be owned, operated, or affiliated with the organization 1202. In the system 1200, the bridge 918 includes an internal bridge 918*a* and an external bridge 918*b*. The layer 2 solution 920 includes an internal layer 2 solution 920*a* and an external layer 2 solution 920*b*. The oracle 922 includes an internal oracle 922*a* and an external oracle 922*b*.

In the system 1200, the users 1102 are affiliated with the organization 1202. For example, the organization 1202 may be a bank, and the users 1102 may be customers of the bank. Furthermore, one or more of the edge computing devices 1104, the authentication interface 1106, the access engine 1108, and the protected device identifiers 1110 may be affiliated with the organization 1202. Furthermore, the layer 2 monitoring system 902 and one or more components thereof may be owned, operated, or otherwise affiliated with the organization 1202. As noted previously, users 1102 and/or edge computing devices 1104 may be as described above in conjunction with the external interface 101 of FIG. 4.

In the example shown, the internal layer 2 solution 920*a* and the external layer 2 solution 920*b* may be sidechains. In some embodiments, the external layer 2 solution 920*b* may differ from the internal layer 2 solution 920*a* based on their respective relationships to a main blockchain 916, and to each other. Each sidechain may be a separate blockchain that is attached to the main blockchain by a two-way peg. This two-way peg allows for transfer of assets and information between blockchains. Where an internal sidechain, such as the layer 2 solution 920*a*, is a blockchain owned and operated by an organization 1202, the external sidechain may be owned and operated by a separate entity from the organization 1202 and from the main blockchain overall. This separate entity may have different goals, priorities, and governance structures than the mainchain or internal sidechain. Two chains may still be connected through a two-way peg, but the external sidechain operates independently of the main blockchain.

In some embodiments, the system 1200 may include more or fewer components than those illustrated. For example, the system 1200 may not include the internal layer 2 solution 920*a* or the external layer 2 solution 920*b*, the system 1200 may not include the internal oracle 922*a* or the external oracle 922*b*, or the system 1200 may not include the internal bridge 918*a* or the external bridge 918*b*.

In the example shown, the log collector 908 may gather information from the different actors within the system 1200 including internal and external components. In some embodiments, the layer 2 monitoring system 902 may operate as described above, but may either separately or collectively identify trends and/or alerts for internal and external portions of the blockchain network. Additionally, the information gathered in the log connector may be used for an online optimization of the sidechain(s), either collectively or individually (internal and external).

Referring to FIGS. 15-18 generally, the monitoring and artificial intelligence-based analysis of transaction data and parameters may be performed at a respective node in charge of data collection, whether internal, external or a mix thereof, as illustrated in the above figures. Furthermore, the collected information may be analyzed online and/or offline, for monitoring and optimizing operation of the various components of a blockchain network (including, e.g., a sidechain, bridges, oracles, and the like as described above).

Furthermore, it is noted that the systems and methods described herein provide a number of advantages over existing blockchain technologies, in particular when implementing a layer 2 solution. For example, by providing a clear infrastructure to collect data, monitor, analyze and optimize the network, administrators of a sidechain may use an AI-enhanced monitoring and reporting system to more quickly identify issues on the blockchain, including to better understand and control the state of the blockchain. Additionally, use of such a log and reporting structure that uses AI models in the disclosed context may be used to analyze real-time information and forecast parameters to optimize the sidechain in an online fashion. Such monitoring and data collection may be used to improve operation of blockchain systems, such as bridges, and may be used in conjunction with the automated bridge creation, cloning, and destruction using AI-generated smart contracts to iteratively and continuously monitor and improve performance and security of blockchain components and interfaces therebetween. Other advantages are apparent as well from the present disclosure.

IV. Data Transfer Across Layer 2 Networks

In example aspects of the present disclosure, a platform for facilitating communication across layer 2 networks is disclosed. For example, the platform may enable interoperability between a layer 2 network of an organization with a layer 2 network of another organization or with a layer 1 blockchain. The present disclosure enables the synchronization and transfer of data between such networks. In some embodiments, by enabling direct communication between layer 2 networks, as opposed to layer 2 networks communicating by writing to and reading from a layer 1 blockchain, communications within a blockchain network may be made more efficient (e.g., faster or requiring less computational resources).

Furthermore, in example aspects, the platform implements AI to enable an efficient network of nodes, oracles, bridges, and wallet authentication. The platform may include an authentication system that implements an AI system, and the platform may include an internal layer 2 solution (e.g., an internal sidechain) that is configured to directly communicate with an external layer 2 solution (e.g., an external sidechain). The platform may use one or more AI systems to maintain privacy, security, or performance of the internal layer 2 solutions, and the platform may use one or more AI systems to create protocols for communicating with external layer 2 solutions.

Figure 19:
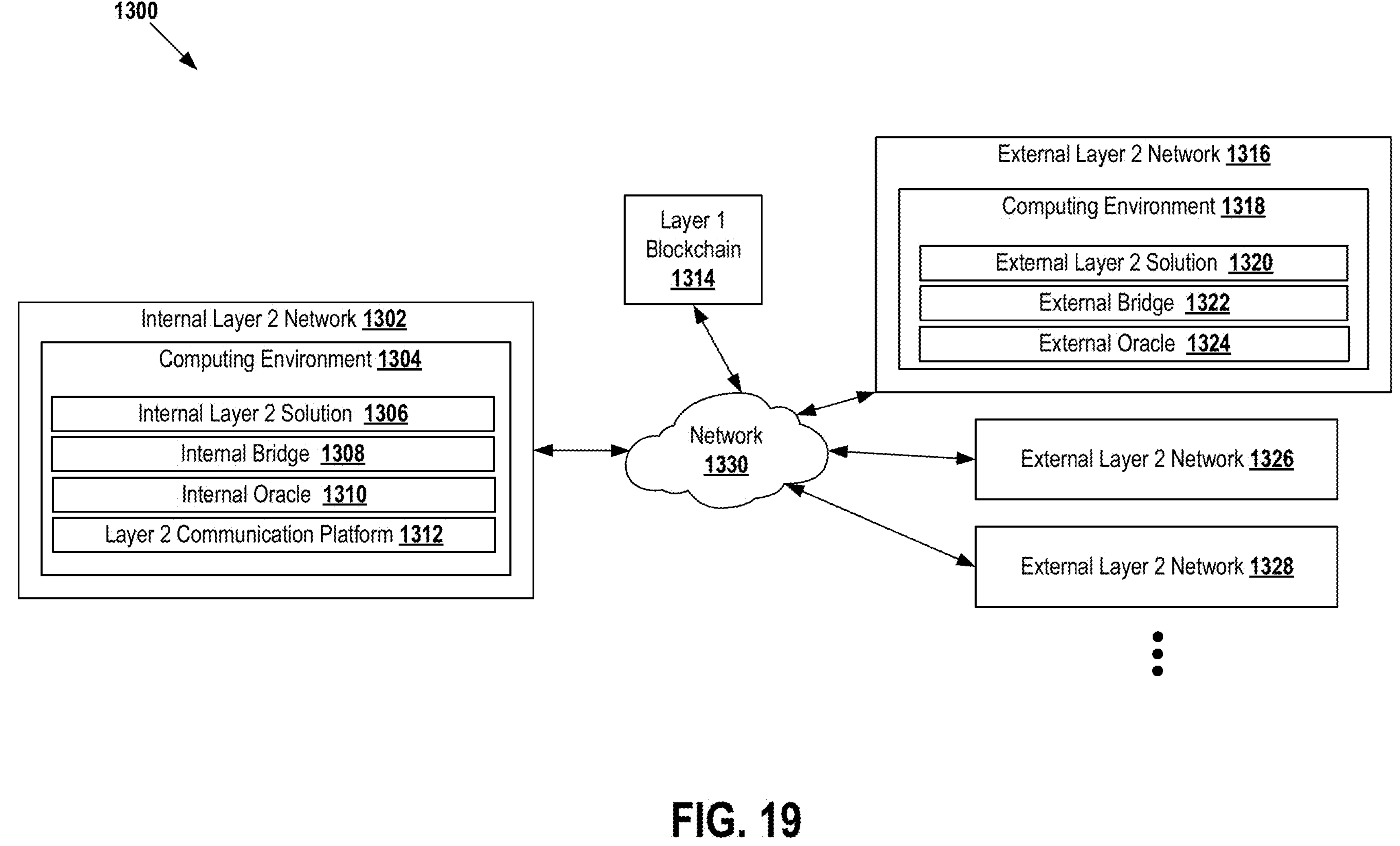
FIG. 19 illustrates a network environment in which a plurality of layer 2 networks may be communicatively coupled.

FIG. 19 illustrates a network environment 1300 in which aspects of the present disclosure may be implemented. The environment 1300 includes a layer 1 blockchain 1314. The layer 1 blockchain 1314 may be communicatively coupled with a plurality of layer 2 networks that include layer 2 solutions that may perform operations that enable the layer 1 blockchain 1314 to scale or operate more efficiently. In the example shown, the layer 1 blockchain 1314 is communicatively coupled with the internal layer 2 network 1302, the external layer 2 network 1316, the external layer 2 network 1326, and the external layer 2 network 1328. Other components, including other layer 2 networks, are also possible in the environment 1300.

Example aspects of the layer 1 blockchain 1314 are described above in connection with the blockchain 40 of FIG. 1. In some embodiments, as described above, the blockchain 1314 may be Bitcoin or Ethereum.

The internal layer 2 network 1302 may include one or more components related to providing layer 2 services in connection with the layer 1 blockchain 1314. In the example shown, the internal layer 2 network 1302 includes a computing environment 1304 in which the following components may be implemented: an internal layer 2 solution 1306, an internal bridge 1308, an internal oracle 1310, and a layer 2 communication platform 1312. In some embodiments, the internal layer 2 network 1302 may include more or fewer components than those illustrated in FIG. 19. For example, the internal layer 2 network 1302 may include a first internal bridge 1308 for communicating with the layer 1 blockchain 1314 and one or more additional bridges for communicating with external layer 2 networks.

In some embodiments, the internal layer 2 network 1302 and the components associated with the internal layer 2 network 1302 may be owned by, operated by, or otherwise affiliated with an organization. In contrast, the external layer 2 networks 1316, 1326, and 1328, and the components associated therewith, may not be owned by, operated by, or otherwise affiliated with the organization. In some embodiments, the organization is a bank or other financial institution. Other organizations, such as governmental organizations, insurance or payment/transaction processing entities, may use such external layer 2 networks as well.

Example aspects of the internal layer 2 solution 1306 and the external layer 2 solution 1320 are described above (e.g., in connection with the layer 2 solution 920 of FIG. 15). Example aspects of the internal bridge 1308 and the external bridge 1322 are described above (e.g., in connection with the bridge 918 of FIG. 15). Example aspects of the internal oracle 1310 and the external oracle 1324 are described above (e.g., in connection with the oracle 922 of FIG. 15).

Though not illustrated, the external layer 2 networks 1326 and 1328 may include one or more of a layer 2 solution, a bridge, or an oracle.

The layer 2 communication platform 1312 may be configured to couple the layer 2 network 1302 with other layer 2 networks, such as the external layer 2 network 1316. Specifically, in some embodiments, the layer 2 communication protocol 1312 may communicatively couple the internal layer 2 solution 1306 with the external layer 2 solution 1320. In some embodiments, the layer 2 communication platform 1312 may identify an external layer 2 network, define a protocol for communicating with the external layer 2 network, and generate a bridge between the internal layer 2 solution 1306 and an external layer 2 solution, thereby coupling the internal layer 2 network 1302 with the identified external layer 2 network. Example operations of the layer 2 communication platform 1312 are described below in connection with FIG. 20.

In some embodiments, the layer 2 communication platform 1312 includes an AI system that may be used to perform operations of the layer 2 communication platform 1312. For example, the AI system may be used to identify external layer 2 networks, define a communication protocol, and/or generate a bridge for communication with the external layer 2 network. In some embodiments, the AI system of the layer 2 communication platform 1312 may include one or more models or applications of the AI system 910 of FIG. 15.

The network 1330 may communicatively couple components of the network environment 1300. The network 1330 may be, for example, a wireless network, a wired network, a virtual network, the internet, or another type of network. Furthermore, the network 1330 may be divided into subnetworks, and the subnetworks can be different types of networks or the same type of network.

Figure 20:
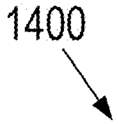
FIG. 20 is a flow chart of an example method for enabling communication between layer 2 networks.
Figure 20:
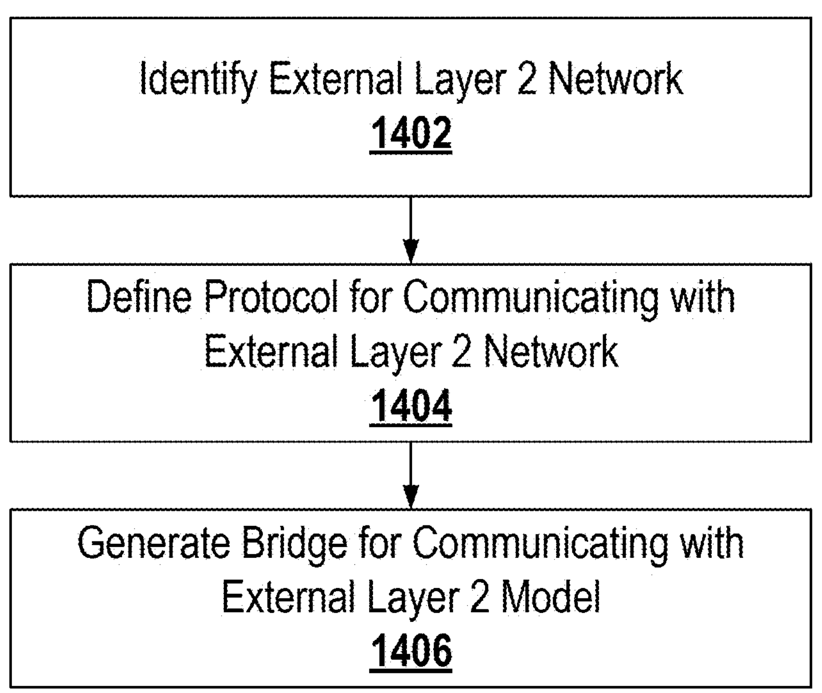

FIG. 20 is a flowchart of an example method 1400 for enabling communication between different layer 2 networks. Operations of the method 1400 are described as being performed by the layer 2 communication platform 1312. However, depending on the embodiment, other components may perform one or more operations of the method 1400. In some embodiments, an AI system of the layer 2 communication platform 1312 may perform one or more of the operations of the method 1400. Example aspects of operations of the method 1400 are further described below in connection with FIG. 21.

In the example shown, at operation 1402, the layer 2 communication platform 1312 may identify an external layer 2 network (e.g., the external layer 2 network 1316). To do so, the layer 2 communication platform 1312 may use the internal oracle 1310 to retrieve data related to layer 2 solutions that are coupled with the layer 1 blockchain 1314. As another example, the layer 2 communication platform 1312 may receive an input from a user that identifies the external layer 2 solution. As another example, the layer 2 communication platform 1312 may use a smart contract or an internal or external bridge to identify an external layer 2 network.

In the example shown, at operation 1404, the layer 2 communication platform 1312 may define a protocol for communicating with the identified external layer 2 network. As part of doing so, the layer 2 communication platform 1312 may identify or create a data structure that may be used to communicate with the external layer 2 network. The data structure may define data fields or a data format for communicating with the external layer 2 network. Defining the protocol to communicate with the external layer 2 network may also include identifying a layer 2 solution associated with the external layer 2 network (e.g., whether the layer 2 solution is a sidechain, rollup, or another type of layer 2 solution).

In the example shown, at operation 1406, the layer 2 communication platform 1312 may generate a bridge for communicating with the identified external layer 2 network. The bridge may be generated based at least in part on the protocol defined for communicating with the external layer 2 network. In some embodiments, the bridge may couple an internal sidechain of the internal layer 2 network with an external sidechain of the identified external layer 2 network. In some embodiments, to generate the bridge, the layer 2 communication platform 1312 may use techniques described above in connection with the FIGS. 6-14.

In some embodiments, the layer 2 communication platform 1312 may repeat aspects of the method 1400. For example, the layer 2 communication platform 1312 may identify additional external layer 2 networks (or additional layer 2 solutions of an already identified external layer 2 network), and the layer 2 communication platform 1312 may enable communication between the internal layer 2 network with the additional external layer 2 network. For each external layer 2 network, the protocol for communicating with the external layer 2 network may vary.

In some embodiments, the layer 2 communication platform 1312 may sever communication with an external layer 2 network. For example, the layer 2 communication platform 1312 may destroy a bridge that couples the internal layer 2 network 1302 with the external layer 2 network. To do so, the layer 2 communication platform 1312 may use techniques described above in connection with FIGS. 6-14. In some embodiments, the layer 2 communication platform 1312 may automatically sever communication with an external layer 2 network in response to identifying an event or condition (e.g., an anomaly or a risk) associated with the external layer 2 network. In some embodiments, the event or condition may be detected by the AI system 910 described above in connection with FIG. 15.

Figure 21:
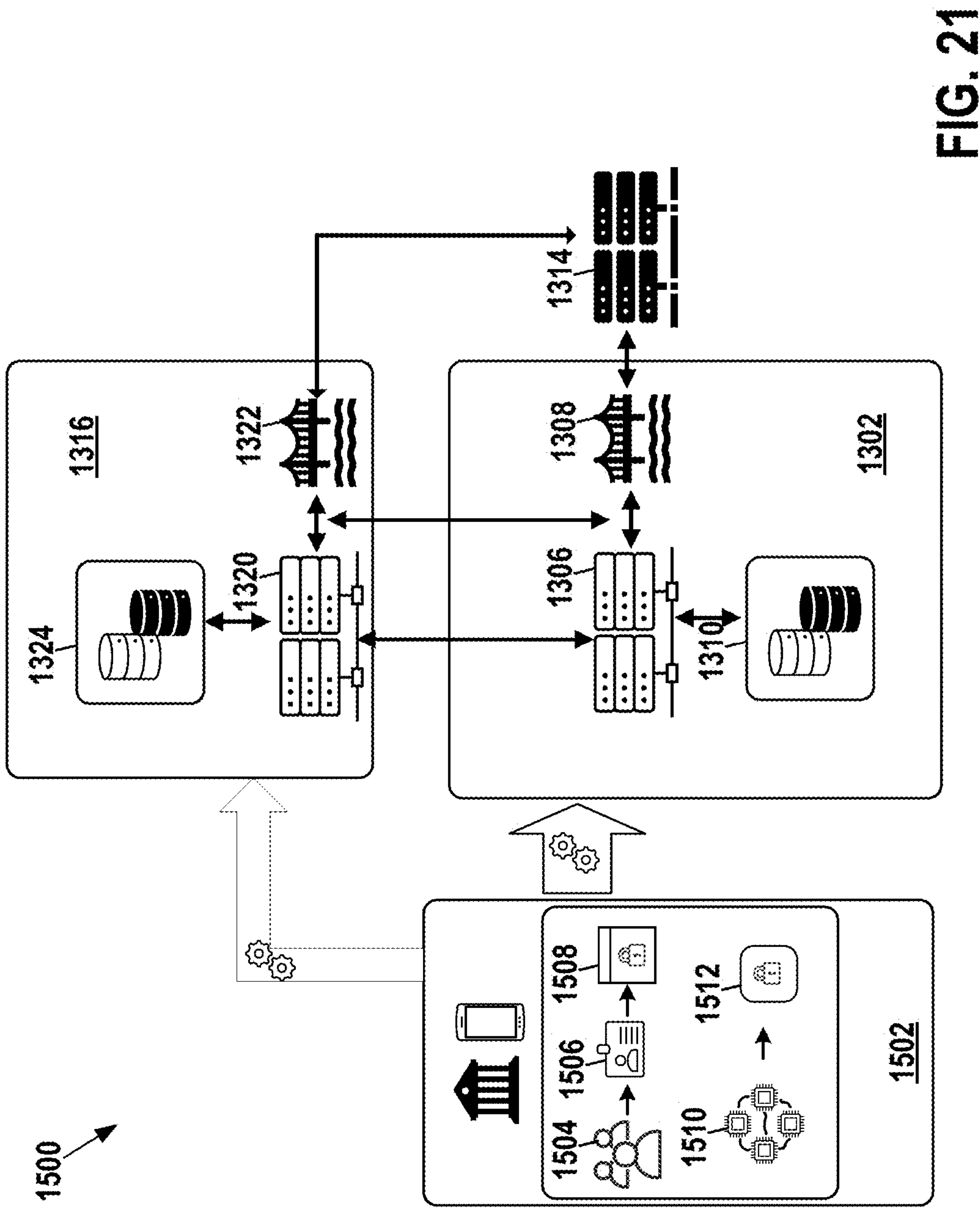
FIG. 21 illustrates a system flow diagram of an example blockchain network.

FIG. 21 illustrates an example system 1500 representing an overview of aspects of an example blockchain network. The example system 1500 includes an authentication system 1502, the internal layer 2 network 1302, the external layer 2 network 1316, and the layer 1 blockchain 1314. In example embodiments, one or more of the components illustrated as part of the example system 1500 may be implemented on a cloud platform. Analogous components to those of the system 1500 are described above.

In the example shown, the authentication system 1502 includes users 1504, AI-enabled authentication 1506, a web interface 1508, edge computing devices 1510, and protected device IDs 1512. In some embodiments, the users 1504 may be customers of a bank. In some embodiments, the users 1504 may utilize a service that uses the layer 1 blockchain 1314. In an example, the users 1504 may be authenticated using the AI-enabled authentication 1506. The AI-enabled authentication 1506 may be a process or system that uses artificial intelligence to authenticate a user.

In examples, the AI-enabled authentication 1506 implements a decentralized AI-assisted authentication approach. In some embodiments, the AI-enabled authentication 1506 may use artificial intelligence to validate that a user is authorized to access one or more of the internal layer 2 solution 1306, the external layer 2 solution 1320, or the layer 1 blockchain 1314. The AI-enabled authentication 1506 may implement one or more of a plurality of AI-related authentication techniques, including but not limited to the following: AI-implemented multi-factor authentication: multi-layer (e.g., physical and application layer) authentication; AI-driven biometric authentication: behavior recognition and authentication: network authentication: context or risk-based authentication: or another authentication technique that is based at least in part on AI. Example AI systems that may be used by the authentication system 1502 are further describes in connection with the internal layer 2 network 1302.

Having been authorized by the AI-enabled authentication 1506, the user 1504 may access a web interface 1508. In examples, the web interface 1508 is a web 2.0 interface. In other examples, the web interface 1508 is a web 3.0 interface. In some embodiments, the web interface 1508 may receive data from the AI-enabled authentication 1506 regarding authentication of one or more users 1504.

Continuing with the example of FIG. 21, the authentication system 1502 may include edge computing devices 1510. The edge computing devices 1510 may include, for example, mobile phones, ATM components, cameras, sensors, or other decentralized computing devices. One or more the edge computing devices 1510 may be associated with a protected device ID 1512. In some embodiments, the authentication system 1502 may implement artificial intelligence processes to generate or verify a protected device ID. In some embodiments, communication between the authentication system 1502 (or components of the authentication system 1502) and the internal layer 2 network 1302 (or components of the internal layer 2 network 1302) or the external layer 2 network 1316 (or components of the external layer 2 network 1316) may be enabled by one or more access engines.

In examples, the internal layer 2 network 1302 is a blockchain infrastructure that may perform layer-2 blockchain operations, as described above. In the example shown, the internal layer 2 network is internally hosted by an organization. In some embodiments, the internal layer 2 network may be centralized. In other embodiments, the internal layer 2 network 1302 may be decentralized, but may nevertheless provide integration protocols to transfer data or messages via bridges or oracles.

In some embodiments, the organization that hosts the internal layer 2 network 1302 also hosts or develops components of the authentication system 1502. In some embodiments, the internal layer 2 network utilizes artificial intelligence (e.g., machine learning, task-specific artificial intelligence services, intelligent decision-making systems, etc.) to provide layer-2 services-services such as data and transaction processing for increased scalability and throughput—in a secure and private manner. In some embodiments, the internal layer 2 network 1302 may process data and transactions outside of a main blockchain while still using the security of a blockchain. In the example shown, the internal layer 2 network 1302 includes an internal layer 2 solution 1306, an internal oracle 1310, and an internal bridge 1308. In other embodiments, however, the internal layer 2 network 1302 may include more or fewer components than those illustrated. In the example shown, the internal layer 2 solution 1306 is an internal sidechain.

In examples, the internal layer 2 network 1302 may provide integration protocols to transfer data via bridges or oracles. An organization may, in some embodiments, use AI systems to implement such protocols. For example, an AI system may be used to learn a data structure of a subsequent layer 2 solution (e.g., the external layer 2 solution 1320), and the protocol may be configured for data transfer based on a proposed data format from the AI system. Furthermore, when there is a plurality of external layer 2 solutions, AI systems may generate data protocols for each of the plurality of external layer 2 solutions, so that data may be transferred and synched between the internal layer 2 solution 1306 and each of the external layer 2 solutions. Furthermore, in some embodiments, the AI systems may detect a change to a data format used by an external layer 2 solution, and the AI system may automatically adapt a protocol associated with that external layer 2 solution. In some embodiments, the use of AI systems to create, monitor, and/or update protocols may limit the amount of code that developers must write to enable interoperability between blockchain Layers.

In some embodiments, the internal layer 2 network 1302 may also use AI systems to maintain security and privacy (e.g., AI systems may be used to detect incoming threats to the internal layer 2 network 1302, detect anomalous activity within the internal layer 2 solution 1306, authorize users or systems accessing the internal layer-2 solution, check particular messages, transactions, or other data, or perform other processes for maintaining privacy and/or security).

In some embodiments, aspects of the internal layer 2 network 1302 (e.g., the layer 2 communication platform) enable run-time compatibility with bridges and oracles outside of an intranet's firewall. For example, the internal layer 2 network 1302 may include protocols (created, in some embodiments, by an AI system) for synchronizing and transferring data with such bridges and oracles.

As shown in the example of FIG. 21, users of the authentication system 1502 may access both the internal layer 2 network 1302 and the external layer 2 network 1316. In some embodiments, a user may provide data to the internal layer 2 network 1302, and the internal layer 2 network 1302 may route the data to the external layer 2 network 1316, thereby allowing the user to securely communicate with the external layer 2 network 1316 without directly connecting to a component of the external layer 2 network 1316.

In some embodiments, the external bridge 1322 enables communication between the external layer 2 solution 1320 and the layer 1 blockchain 1314 and the internal layer 2 solution 1306. In some embodiments, the external layer 2 solution 1320 may communicate directly with the internal layer 2 solution 1306. In examples, the external layer 2 solution 1320 may be configured to receive and process data (e.g., transactions, messages, or other data) having a certain format, and communicating with the external layer 2 solution 1320 may require that data follow that format. In examples, an AI system may learn or detect a data format associated with the external layer 2 solution 1320 and create a protocol that enables communication between one or more of the authentication system 1502 or the internal layer 2 protocol 104 with the external layer 2 solution 1320.

Although the example of FIG. 21 illustrates only one external layer 2 network 1316, aspects of the present disclosure may be implemented with a plurality of external layer 2 networks. Furthermore, two or more external layer 2 networks may use different data formats and communication systems, and an AI system may customize a protocol for enabling communication with each of the two or more external layer 2 networks, despite different data formats or communication systems.

As an example application of aspects of FIGS. 19-21, a layer 2 network may be associated with a centralized entity, such as a bank or other financial institution, a governmental entity, and the like. The layer 2 network may include a layer 2 solution (e.g., a sidechain) that is coupled to an external, decentralized layer 1 blockchain. The bank may use the layer 2 solution to process high-volume transactions, such as payments, deposits, or withdrawals by users of the bank. Periodically, the layer 2 solution may commit the transactions to the layer 1 blockchain (e.g., a batch of transactions may be committed to the main blockchain). Such a configuration may enable the bank to efficiently process large number of transactions while still taking advantage of a decentralized and secure layer 1 blockchain.

In some instances, however, a user transaction may involve a third-party entity, such as a different bank or a payment processing network. Such transactions may not be executable in the bank's internal layer 2 network alone. This third-party entity may also, in some instances, have a layer 2 solution that is coupled to the main layer 1 blockchain. In such instances, to settle the user transaction that involves two entities having layer 2 solutions, layer 2 communication techniques described herein may be implemented.

For example, settling the transaction may include executing a smart contract on an internal sidechain (associated with an entity, such as a bank) that is coupled via a bridge to an external sidechain (associated with a third-party entity, such as a payment processing network). The smart contract execution may update a state of both the internal sidechain and the external sidechain to reflect the user transaction. Then one or more of internal or external sidechains may update the layer 1 blockchain. Thus, rather than communicating indirectly by writing to and reading from a layer 1 blockchain, two entities having layer 2 solutions may directly update states of layer 2 solutions of the respective entities.

As another example, a user may have an asset that is tokenized on an internal layer 2 solution. For example, the user may have title to a car, house, deposit, or other asset that is tokenized on a layer 2 solution of a bank. To transfer the title to a different party, the user may submit a request to the bank, which may cause an execution of a smart contract that references the token. Specifically, the smart contract may be configured to transfer the token to a second user. The second user may not have an account at the bank, but the second user may have an account at a second bank, which has its own layer 2 solution.

Thus, to transfer the token, the smart contract may be configured to commit the token transfer to the external layer 2 solution by using a bridge configured to couple an internal and external layer 2 network. Once the token is transferred to the external layer 2 solution, the external layer 2 solution may update the layer 1 blockchain. As a result, a single transaction with the layer 1 blockchain may be executed, rather than a first transaction to write the token transfer to the layer 1 blockchain by the internal layer 2 solution and a second transaction to read the token transfer from the layer 1 blockchain by the external layer 2 solution. In these and other ways, enabling layer 2 to layer 2 communication may enhance the capabilities of layer 2 solutions to assist a layer 1 blockchain to scale, to increase transaction processing, and reduce fees on the layer 1 blockchain.

V. Computing Environment

Figure 22:
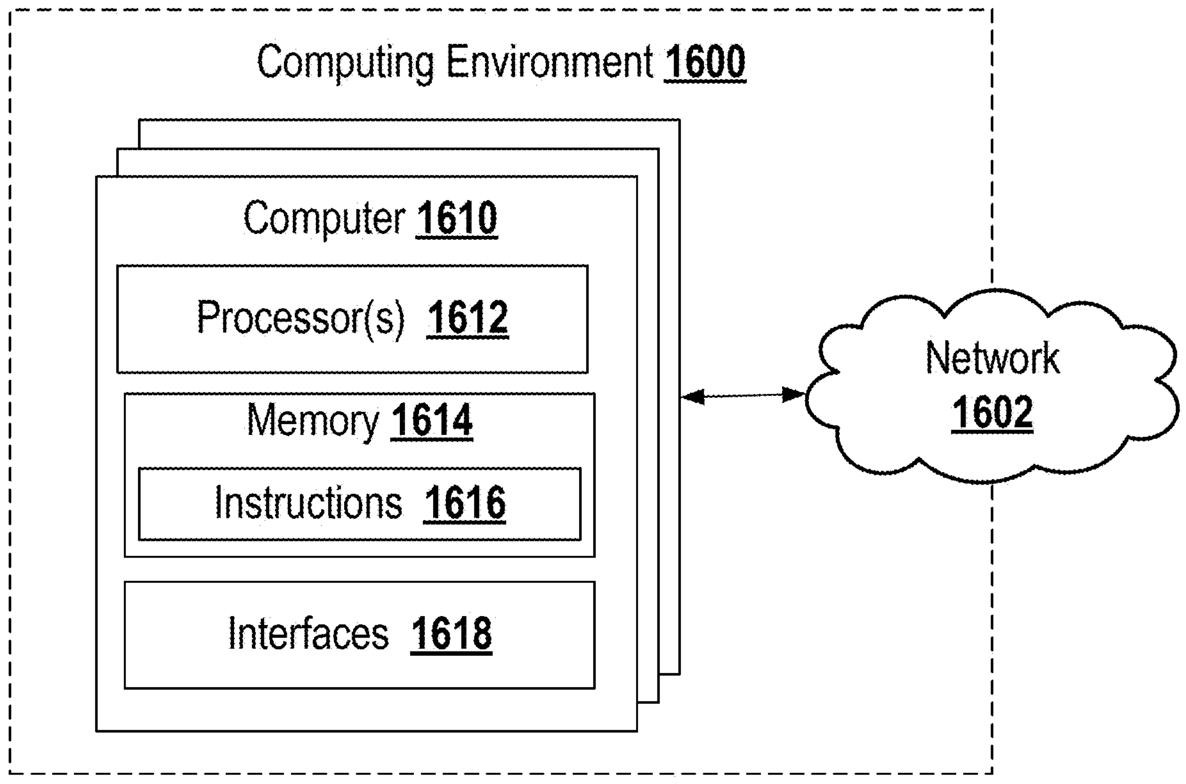
FIG. 22 illustrates an example computing environment, in accordance with some embodiments of the present disclosure.

FIG. 22 illustrates an example computing environment 1600, in accordance with some embodiments of the present disclosure. A computing environment 1600 is a set of one or more virtual or physical computers 1610 that individually or in cooperation achieve tasks, such as implementing one or more aspects described herein. The computers 1610 have components that cooperate to cause output based on input. Example computers 1610 include desktops, servers, mobile devices (e.g., smart phones and laptops), wearables, virtual/augmented/expanded reality devices, spatial computing devices, virtualized devices, other computers, or combinations thereof. In particular example implementations, the computing environment 1600 includes at least one physical computer.

The computing environment 1600 may be used in a variety of contexts, such as to implement any of the devices on which the systems and methods described above in conjunction with FIGS. 1-21 are implemented, As such, the computing environment 1600 may represent a mobile device, a personal computing device, a server system, or a distributed set of computing systems across which instructions may be executed to perform tasks.

The computing environment 1600 can be arranged in any of a variety of ways. The computers 1610 can be local to or remote from other computers 1610 of the computing environment 1600. The computing environment 1600 can include computers 1610 arranged according to client-server models, peer-to-peer models, edge computing models, other models, or combinations thereof.

In many examples, the computers 1610 are communicatively coupled with devices internal or external to the computing environment 1600 via a network 1602. The network 1602 is a set of devices that facilitate communication from a sender to a destination, such as by implementing communication protocols. Example networks 1602 include local area networks, wide area networks, intranets, or the Internet.

In some implementations, computers 1610 can be general-purpose computing devices (e.g., consumer computing devices). In some instances, via hardware or software configuration, computers 1610 can be special purpose computing devices, such as servers able to practically handle large amounts of client traffic, machine learning devices able to practically train machine learning models, data stores able to practically store and respond to requests for large amounts of data, other special purposes computers, or combinations thereof.

Many example computers 1610 include one or more processors 1612, memory 1614, and one or more interfaces 1618. Such components can be virtual, physical, or combinations thereof.

The one or more processors 1612 are components that execute instructions, such as instructions that obtain data, process the data, and provide output based on the processing. The one or more processors 1612 often obtain instructions and data stored in the memory 1614. The one or more processors 1612 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1612 include at least one physical processor implemented as an electrical circuit. Example providers processors 1612 include INTEL, AMD, QUALCOMM, TEXAS INSTRUMENTS, and APPLE.

The memory 1614 is a collection of components configured to store instructions 1616 and data for later retrieval and use. The instructions 1616 can, when executed by the one or more processors 1612, cause execution of one or more operations that implement aspects described herein. In many examples, the memory 1614 is a non-transitory computer readable medium, such as random access memory, read only memory, cache memory, registers, portable memory (e.g., enclosed drives or optical disks), mass storage devices, hard drives, solid state drives, other kinds of memory, or combinations thereof. In certain circumstances, transitory memory 1614 can store information encoded in transient signals.

The one or more interfaces 1618 are components that facilitate receiving input from and providing output to something external to the computer 1610, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 1618 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 1618 can facilitate connection of the computing environment 1600 to a network 1602.

The computers 1610 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

VI. Machine Learning Framework

FIG. 17 illustrates an example machine learning framework 1700, in accordance with some embodiments of the present disclosure. Techniques described herein may benefit from or use artificial intelligence, such as decision trees, Markov models, and machine learning techniques. Machine learning can be implemented with a machine learning framework 1700, illustrated in FIG. 17. A machine learning framework 1700 is a collection of software and data that implements artificial intelligence trained to provide output, such as predictive data, based on input. Examples of artificial intelligence that can be implemented with machine learning way include neural networks (including recurrent neural networks), language models (including so-called “large language models”), generative models, natural language processing models, adversarial networks, decision trees, Markov models, support vector machines, genetic algorithms, others, or combinations thereof. Machine learning frameworks 1700 or components thereof are often built or refined from existing frameworks, such as TENSORFLOW by GOOGLE, INC. or PYTORCH by the PYTORCH community.

The machine learning framework 1700 can include one or more models 1702 that are the structured representation of learning and an interface 1704 that supports use of the model 1702.

The model 1702 can take any of a variety of forms. In many examples, the model 1702 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1702 can include a representation of memory (e.g., providing long short-term memory functionality). Where the set includes more than one model 1702, the models 1702 can be linked, cooperate, or compete to provide output.

The interface 1704 can include software procedures (e.g., defined in a library) that facilitate the use of the model 1702, such as by providing a way to establish and interact with the model 1702. For instance, the software procedures can include software for receiving input, preparing input for use (e.g., by performing vector embedding, such as using Word2Vec, BERT, or another technique), processing the input with the model 1702, providing output, training the model 1702, performing inference with the model 1702, fine tuning the model 1702, other procedures, or combinations thereof.

In an example implementation, interface 1704 can be used to facilitate a training method 1710 that can include operation 1712. Operation 1712 includes establishing a model 1702, such as initializing a model 1702. The establishing can include setting up the model 1702 for further use (e.g., by training or fine tuning). The model 1702 can be initialized with values. In examples, the model 1702 can be pretrained. Operation 1714 can follow operation 1712. Operation 1714 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1702. Operation 1716 can follow operation 1714. Operation 1716 includes providing a portion of the training data to the model 1702. This can include providing the training data in a format usable by the model 1702. The framework 1700 (e.g., via the interface 1704) can cause the model 1702 to produce an output based on the input. Operation 1718 can follow operation 1716. Operation 1718 includes comparing the expected output with the actual output. In an example, this can include applying a loss function to determine the difference between expected an actual. This value can be used to determine how training is progressing. Operation 1720 can follow operation 1718. Operation 1720 includes updating the model 1702 based on the result of the comparison. This can take any of a variety of forms depending on the nature of the model 1702. Where the model 1702 includes weights, the weights can be modified to increase the likelihood that the model 1702 will produce correct output given an input. Depending on the model 1702, backpropagation or other techniques can be used to update the model 1702. Operation 1722 can follow operation 1720. Operation 1722 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include whether a trained version of the model 1702 satisfies particular conditions that triggered a retraining process.

If the stopping criterion has not been satisfied, the flow of the method can return to operation 1714. If the stopping criterion has been satisfied, the flow can move to operation 1722. Operation 1722 includes deploying the trained model 1702 for use in production, such as providing the trained model 1702 with real-world input data and produce output data used in a real-world process. The model 1702 can be stored in memory 1614 (shown in FIG. 22) of at least one computer 1610, or distributed across memories of two or more such computers 1610 for production of output data (e.g., predictive data).

VII. Application Techniques

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

VIII. Example Embodiments

Aspects of the present disclosure may also be described by the embodiments that follow: The features or combination of features disclosed in the following can also be included with any of the other embodiments disclosed herein.

Embodiment 1 is a method for generating and validating a smart contract, the method comprising: receiving text input describing a desired operation of a smart contract; processing the text input with a language model to output a smart contract logic description and synthetic data for validating the smart contract: processing the smart contract logic description with a generative artificial intelligence model to generate smart contract code; validating the smart contract code using the synthetic data to simulate transactions with the smart contract; and deploying the smart contract code on a blockchain upon successful validation of the smart contract code.

Embodiment 2 is the method of embodiment 1, wherein the blockchain is a layer 2 network configured to interface with a layer 1 blockchain network.

Embodiment 3 is the method of any of embodiments 1-2, wherein the smart contract defines a bridge linking the blockchain to the layer 1 blockchain network.

Embodiment 4 is the method of any of embodiments 1-3, wherein generating the synthetic data further comprises processing one or more datasets output from the language model with a second model to generate a plurality of simulated interactions with the smart contract for each of the one or more datasets, wherein the one or more datasets define smart contract execution scenarios.

Embodiment 5 is the method of any of embodiments 1-4, wherein the one or more datasets defining smart contract execution scenarios include at least one of: (a) an outside world interactions with smart contracts dataset: (b) an owner/user interactions with smart contracts dataset: (c) a smart contract-to-smart contract communications dataset: (d) a hacking scenarios dataset: or (e) any combination of (a), (b), (c), and (d).

Embodiment 6 is the method of any of embodiments 1-5, wherein the generative artificial intelligence model is trained on a corpus of optimized and validated example smart contract code.

Embodiment 7 is the method of any of embodiments 1-6, further comprising, upon an unsuccessful validation of the smart contract code: providing feedback to the language model to generate an updated smart contract logic description based on the feedback.

Embodiment 8 is the method of any of embodiments 1-7, wherein the smart contract logic description includes a flow chart illustrating the desired operation of the smart contract when executed on the blockchain.

Embodiment 9 is the method of any of embodiments 1-8, wherein one or more of the receiving text input, the processing the text input, the processing the spart contract logic description, the validating the smart contract code, and the deploying the smart contract code are executed in a cloud based environment.

Embodiment 10 is a system comprising: a processor; and memory storing instructions which, when executed by the processor, cause the system to: receive text input describing a desired operation of a smart contract: process the text input with a language model to output a smart contract logic description and synthetic data for validating the smart contract; process the smart contract logic description with a generative artificial intelligence model to generate smart contract code: validate the smart contract code using the synthetic data to simulate transactions with the smart contract; and deploy the smart contract code on a blockchain upon successful validation of the smart contract code.

Embodiment 11 the system of embodiment 10, wherein the text input includes a prompt uploaded from a user device of an authenticated user of the system.

Embodiment 12 is the system of any of embodiment 10-11, wherein the text input includes documentation defining business logic.

Embodiment 13 is the system of any of embodiment 10-12, wherein the system is accessible to authenticated users of an enterprise associated with the system.

Embodiment 14 is the system of any of embodiment 10-13, wherein a user can observe output of the smart contract when executed on the blockchain through both the system and directly from the blockchain.

Embodiment 15 is a smart contract generation and validation system comprising: a language model configured to process text input describing a desired operation of a smart contract to generate a smart contract logic description and synthetic data for validating the smart contract: a generative artificial intelligence model configured to process the smart contract logic description to generate smart contract code; and a validation module configured to validate the smart contract code using the synthetic data to simulate transactions with the smart contract.

Embodiment 16 is the system of embodiment 15, further comprising an internal sidechain, wherein the smart contract code is deployed on the internal sidechain upon successful validation of the smart contract code.

Embodiment 17 is the system of any of embodiments 15-16, wherein the internal sidechain is linked to a layer 1 blockchain via an internal bridge.

Embodiment 18 is the system of any of embodiments 15-17, wherein the internal sidechain is configured to interface with an internal oracle to access data associated with the smart contract.

Embodiment 19 is the system of any of embodiments 15-18, wherein the language model outputs seed data and a synthetic data engine is configured to generate the synthetic data by processing the seed data with a model.

Embodiment 20 is the system of any of embodiments 15-19, wherein the model includes a transformer neural network.

Embodiment 21 is a method for generating a bridge to facilitate transactions between a first blockchain and a second blockchain, the method comprising: monitoring transactions on a first blockchain and a second blockchain: classifying the monitored transactions into one or more transaction types: for each classified transaction type of the one or more transaction types: generating, with a generative artificial intelligence model, a smart contract defining a bridge to link the first blockchain with the second blockchain based on the classified transaction type; and deploying the smart contract defining the bridge.

Embodiment 22 is the method of embodiment 21, a second artificial intelligence system is used to monitor the transactions on the first blockchain and the second blockchain.

Embodiment 23 is the method of any of embodiments 21 and 22, wherein a model is used to classify the monitored transactions into the one or more transaction types.

Embodiment 24 is the method of any of embodiments 21-23, further comprising: monitoring interactions with the smart contract defining the bridge: detecting an issue in the monitored interactions; and sending a request to destroy the smart contract defining the bridge upon detecting the issue.

Embodiment 25 is the method of any of embodiments 21-24, wherein the request to destroy the smart contract defining the bridge is sent to an artificial intelligence system which is configured to destroy the smart contract.

Embodiment 26 is the method of any of embodiments 21-25, wherein the monitored interactions with the smart contract defining the bridge are monitored with an artificial intelligence system trained to detect security threats for deployed bridges.

Embodiment 27 is the method of any of embodiments 21-26, wherein the smart contract defining the bridge is destroyed in response to determining that the bridge is no longer being used.

Embodiment 28 is the method of any of embodiments 21-27, wherein parameters used by the generative artificial intelligence model to generate the smart contract are encrypted and stored in a secured database.

Embodiment 29 is the method of any of embodiments 21-28, wherein generating the smart contract defining the bridge further comprises: determining that the classified transaction type corresponds to a transaction type of a destroyed smart contract defining a destroyed bridge: retrieving parameters used by the generative artificial intelligence model to generate the destroyed smart contract; and generating the smart contract defining the bridge using the retrieved parameters with the generative artificial intelligence model.

Embodiment 30 is the method of any of embodiments 21-29, wherein the parameters are not retrieved or used when it is determined that the destroyed smart contract was destroyed due to a detected security issue.

Embodiment 31 is the method of any of embodiments 21-30, the method further comprising: determining the bridge should be cloned based on monitored transactions with the first blockchain and the second blockchain; and cloning the smart contract defining the bridge to generate a cloned smart contract defining a cloned bridge.

Embodiment 32 is the method of any of embodiments 21-31, wherein determining the bridge should be cloned occurs in response to receipt of a request to clone the bridge.

Embodiment 33 is the method of any of embodiments 21-32, wherein the request to clone the bridge is sent based on a smart contract condition being met.

Embodiment 34 is the method of any of embodiments 21-33, wherein the cloned smart contract defining the cloned bridge includes a copy of the smart contract defining the bridge with modified parameters based on a context of an environment in which the cloned smart contract is to be deployed.

Embodiment 35 is the method of any of embodiments 21-34, wherein the smart contract defining the bridge is generated on-demand based on the monitored transactions with the first blockchain and the second blockchain.

Embodiment 36 is a system comprising: a processor: memory storing instructions which, when executed by the processor, cause the system to: monitor transactions on a first blockchain and a second blockchain: classify the monitored transactions into one or more transaction types: for each classified transaction type of the one or more transaction types: generate, with a generative artificial intelligence model, a smart contract defining a bridge to link the first blockchain with the second blockchain based on the classified transaction type; and deploy the smart contract defining the bridge.

Embodiment 37 is the system of embodiment 36, wherein the instructions further cause the system to store a bridge digital asset associated with the smart contract defining the bridge.

Embodiment 38 is a cross-chain bridge creation and management system comprising: a transaction monitor configured to: monitor transactions on a first blockchain and a second blockchain; and classify the monitored transactions by transaction type; and a generative artificial intelligence system configured to generate a smart contract defining a bridge to link the first blockchain and the second blockchain based on the transaction type.

Embodiment 39 is the system of embodiment 38, wherein the transaction monitor includes a deep learning model designed to consume the monitored transactions and classify the monitored transactions into groups corresponding to transaction types.

Embodiment 40 is the system of any of embodiments 38 or 39, wherein the generative artificial intelligence system includes: a language model configured to generate a smart contract logic description based on the classified transaction type; and a generative artificial intelligence model configured to generate smart contract code based on the smart contract logic description output by the language model.

Embodiment 41 is a system for monitoring network activity data in a blockchain network, the system comprising: a layer 1 blockchain: a layer 2 solution communicatively coupled, via a bridge, with the layer 1 blockchain; an oracle communicatively coupled with the layer 2 solution; and a monitoring system comprising a log collector, an artificial intelligence (AI) system, and a reporting system: wherein the log collector is configured to: receive network activity data from the layer 2 solution and the oracle; and provide the network activity data to the AI system: wherein the AI system is configured to: receive, from the log collector, the network activity data: analyze the network activity data; and determine a corrective action based on analyzing the network activity data: wherein the reporting system is configured to display a report of the network activity data via a user interface; and wherein the monitoring system is configured to perform the corrective action.

Embodiment 42 is the system of embodiment 41, wherein the AI system includes one or more AI models trained using layer 2 blockchain processing information.

Embodiment 43 is the system of any of embodiments 41-42, wherein the log collector is further configured to receive the network activity data from the bridge and the layer 1 blockchain.

Embodiment 44 is the system of any of embodiments 41-43, wherein the report includes layer 2 blockchain operation parameters that are based, at least in part, on a mapping between one or more layer 2 blockchain network operation parameters and one or more non-blockchain network operating parameters.

Embodiment 45 is the system of any of embodiments 41-44, wherein the layer 2 solution is maintained within an organization.

Embodiment 46 is the system of any of embodiments 41-45, wherein the layer 2 solution comprises an internal layer 2 solution and an external layer 2 solution; wherein the bridge comprises an internal bridge and an external bridge; and wherein the oracle comprises an internal oracle and an external oracle.

Embodiment 47 is the system of any of embodiments 41-46, wherein the log collector is further configured to receive the network activity data from each of the external layer 2 solution, the external oracle, the external bridge, the internal layer 2 solution, the internal oracle, and the internal bridge.

Embodiment 48 is the system of any of embodiments 41-47, wherein the AI system is configured to generate, based on the network activity data, an optimized parameter template useable to optimize performance of the layer 2 solution.

Embodiment 49 is the system of any of embodiments 41-48, wherein the AI system is configured to send the optimized parameter template to the layer 2 solution.

Embodiment 50 is the system of any of embodiments 41-49, wherein the layer 2 solution is a sidechain.

Embodiment 51 is the system of any of embodiments 41-50, wherein the layer 2 solution is a rollup.

Embodiment 52 is the system of any of embodiments 41-51, further comprising an agent handler: wherein the agent handler is configured to: generate an agent; and deploy the agent to monitor the network activity data of the layer 2 solution.

Embodiment 53 is the system of any of embodiments 41-52, wherein receiving the network activity data from the layer 2 solution comprises receiving the network activity data from the agent.

Embodiment 54 is the system of any of embodiments 41-53, wherein generating the agent comprises using the AI system.

Embodiment 55 is the system of any of embodiments 41-54, wherein the corrective action includes one or more of: halting a transaction: generating an alert: destroying the bridge; updating an operation parameter of the layer 2 solution: or provisioning computational resources to be used by layer 2 solution.

Embodiment 56 is the system of any of embodiments 41-55, wherein analyzing the network activity data comprises applying a deep learning model.

Embodiment 57 is the system of any of embodiments 41-56, wherein the layer 1 blockchain is associated with Bitcoin or Ethereum transactions.

Embodiment 58 is a method for monitoring a blockchain network, the method comprising: deploying a first agent to monitor a layer 2 solution, the layer 2 solution being communicatively coupled with a layer 1 blockchain via a bridge: deploying a second agent to monitor an oracle, the oracle being communicatively coupled with the layer 2 solution; receiving network activity data from the first agent and the second agent: at an AI system, analyzing the network activity data: by analyzing the network activity data, determining a corrective action, wherein the corrective action includes altering an operating parameter of one or more of the layer 2 solution, the bridge, or the oracle: performing the corrective action; and displaying, via a user interface, a report that is based at least in part on the analysis, at the AI system, of the network activity data.

Embodiment 59 is the method of embodiment 58, wherein the layer 2 solution includes a plurality of blockchains distinct from the layer 1 blockchain.

Embodiment 60 is a system for monitoring a blockchain network, the system comprising: a processor; and memory storing instructions that, when executed by the processor, cause the system to: deploy a first agent to monitor a layer 2 solution, the layer 2 solution being communicatively coupled with a layer 1 blockchain via a bridge: deploy a second agent to monitor an oracle, the oracle being communicatively coupled with the layer 2 solution: receive network activity data from the first agent and the second agent: at an AI system, analyze the network activity data: by analyzing the network activity data, determine a corrective action, wherein the corrective action includes altering an operating parameter of one or more of the layer 2 solution, the bridge, or the oracle: perform the corrective action; and display, via a user interface, a report that is based at least in part on the analysis, at the AI system, of the network activity data.

Embodiment 61 is a system for facilitating communication between layer 2 networks, the system comprising: a first layer 2 network comprising a first layer 2 solution, a first bridge coupling the first layer 2 solution with a layer 1 blockchain, and a layer 2 communication platform: a second layer 2 network comprising a second layer 2 solution and a second bridge coupling the second layer 2 solution with the layer 1 blockchain: wherein the layer 2 communication platform is configured to: define a protocol for establishing communication between the first layer 2 network and the second layer 2 network; and based at least in part on the protocol, generate a third bridge coupling the first layer 2 network and the second layer 2 network.

Embodiment 62 is the system of embodiment 61, wherein generating the third bridge coupling the first layer 2 network and the second layer 2 network comprises generating a smart contract configured to communicate with the first layer 2 solution and the second layer 2 solution.

Embodiment 63 is the system of any of embodiment 61 or 62, wherein the layer 2 communication platform comprises an artificial intelligence system.

Embodiment 64 is the system of any of embodiment 61-63, wherein the artificial intelligence system is configured to monitor a security or privacy of the first layer 2 network and to define the protocol based on a data structure associated with the second layer 2 network.

Embodiment 65 is the system of any of embodiment 61-64, wherein the first layer 2 solution is a sidechain; and wherein the artificial intelligence system is further configured to analyze transactions processed by the sidechain.

Embodiment 66 is the system of any of embodiment 61-65, wherein the artificial intelligence system is configured to generate the third bridge; and wherein the artificial intelligence system is configured to destroy the third bridge in response to an alert associated with the second layer 2 network.

Embodiment 67 is the system of any of embodiment 61-66, further comprising an authentication system configured to perform an AI-enabled authentication of a user prior to granting access to the first layer 2 network.

Embodiment 68 is the system of any of embodiment 61-67, wherein the layer 2 communication platform is configured to route a communication from the user from the first layer 2 network to the second layer 2 network.

Embodiment 69 is the system of any of embodiment 61-68, wherein the layer 2 communication platform is further configured to update the protocol in response to detecting a change of a data format associated with the second layer 2 network.

Embodiment 70 is the system of any of embodiment 61-69, further comprising a plurality of external layer 2 networks communicatively coupled with the first layer 2 network.

Embodiment 71 is the system of any of embodiment 61-70, wherein the first layer 2 network and the second layer 2 network are hosted by different organizations.

Embodiment 72 is the system of any of embodiment 61-71, wherein the first layer 2 network is configured to synch with the second layer 2 network.

Embodiment 73 is the system of any of embodiment 61-72, wherein the layer 1 blockchain is associated with Bitcoin or Ethereum transactions.

Embodiment 74 is the system of any of embodiment 61-73, wherein the first layer 2 network includes an internal oracle; and wherein layer 2 communication platform identifies the second layer 2 network by using the internal oracle.

Embodiment 75 is the system of any of embodiment 61-74, wherein the first layer 2 solution is a first type of layer 2 solution and the second layer 2 solution is a second type of layer 2 solution.

Embodiment 76 is the system of any of embodiment 61-75, wherein the first layer 2 solution is a sidechain and the second layer 2 solution is a rollup.

Embodiment 77 is a method for enabling communication between layer 2 networks, the method comprising: identifying an external layer 2 network: defining a protocol for establishing communication between an internal layer 2 network and the external layer 2 network, wherein the internal layer 2 network includes a first layer 2 solution communicatively coupled with a layer 1 blockchain, and wherein the external layer 2 network includes a second layer 2 solution communicatively coupled with the layer 1 blockchain; and based at least in part on the protocol, generating a bridge coupling the first layer 2 solution and the second layer 2 solution.

Embodiment 78 is method of embodiment 77, wherein the first layer 2 solution is a first sidechain; and wherein the second layer 2 solution is a second sidechain.

Embodiment 79 is the system of any of embodiments 77-78, further comprising automatically destroying the bridge in response to receiving an alert associated with the external layer 2 network.

Embodiment 80 is a platform for enabling communication between layer 2 networks, the platform comprising: a processor; and memory: wherein the memory stores instructions that, when executed by the processor, cause the platform to: identify an external layer 2 network: define a protocol for establishing communication between an internal layer 2 network and the external layer 2 network, wherein the internal layer 2 network includes a first layer 2 solution communicatively coupled with a layer 1 blockchain, and wherein the external layer 2 network includes a second layer 2 solution communicatively coupled with the layer 1 blockchain; and based at least in part on the protocol, generate a bridge coupling the first layer 2 solution and the second layer 2 solution.

In general, functionality of computing devices described herein may be implemented in computing logic embodied in hardware or software instructions, which can be written in a programming language, such as C, C++, COBOL, JAVA, PHP, Perl, HTML, CSS, JavaScript, VBScript, ASPX, Microsoft .NET languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for enabling communication between layer 2 networks, the method comprising:

generating a bridge coupling a first layer 2 solution and a second layer 2 solution, wherein the first layer 2 solution is coupled with a layer 1 blockchain, wherein the second layer 2 solution is coupled with the layer 1 blockchain, and wherein the bridge comprises a smart contract; and transferring a digital asset from the first layer 2 solution to the second layer 2 solution, wherein transferring the digital asset comprises executing the smart contract, locking the digital asset on the first layer 2 solution, and minting a second digital asset corresponding to the digital asset on the second layer 2 solution, wherein transferring the digital asset causes only a single transaction with the layer 1 blockchain to be executed.

2. The method of claim 1, wherein the first layer 2 solution is a first sidechain; and wherein the second layer 2 solution is a second sidechain.

3. The method of claim 1, further comprising automatically destroying the bridge in response to receiving an alert associated with the external layer 2 network.

4. A platform for enabling communication between layer 2 networks, the platform comprising:

a processor; and memory;

wherein the memory stores instructions that, when executed by the processor, cause the platform to:

generate a bridge coupling a first layer 2 solution and a second layer 2 solution, wherein the first layer 2 solution is coupled with a layer 1 blockchain, wherein the second layer 2 solution is coupled with the layer 1 blockchain, and wherein the bridge comprises a smart contract; and transfer a digital asset from the first layer 2 solution to the second layer 2 solution, wherein transferring the digital asset comprises executing the smart contract, locking the digital asset on the first layer 2 solution, and minting a second digital asset corresponding to the digital asset on the second layer 2 solution, wherein transferring the digital asset causes only a single transaction with the layer 1 blockchain to be executed.

5. A system for facilitating communication between layer 2 networks, the system comprising:

a first layer 2 network comprising a first layer 2 solution comprising a token associated with a first user, a first bridge coupling the first layer 2 solution with a layer 1 blockchain, and a layer 2 communication platform comprising a processor and memory storing instructions;

a second layer 2 network comprising a second layer 2 solution and a second bridge coupling the second layer 2 solution with the layer 1 blockchain;

wherein the instructions, when executed by the processor, cause the layer 2 communication platform to:

generate a third bridge comprising a smart contract coupling the first layer 2 solution and the second layer 2 solution; and transfer an asset from the first user to a second user associated with the second layer 2 network by executing the smart contract, wherein executing the smart contract comprises locking the token on the first layer 2 solution and minting a second token corresponding to the token on the second layer 2 solution, wherein transferring the asset causes only a single transaction with the layer 1 blockchain to be executed.

6. The system of claim 5, wherein the layer 2 communication platform comprises an artificial intelligence system.

7. The system of claim 6, wherein the artificial intelligence system is configured to monitor a security or privacy of the first layer 2 network and to define the protocol based on a data structure associated with the second layer 2 network.

8. The system of claim 6, wherein the first layer 2 solution is a sidechain; and wherein the artificial intelligence system is further configured to analyze transactions processed by the sidechain.

9. The system of claim 6, wherein the artificial intelligence system is configured to generate the third bridge; and wherein the artificial intelligence system is configured to destroy the third bridge in response to an alert associated with the second layer 2 network.

10. The system of claim 5, further comprising an authentication system configured to perform an authentication of a user prior to granting access to the first layer 2 network.

11. The system of claim 10, wherein the layer 2 communication platform is configured to route a communication from the user from the first layer 2 network to the second layer 2 network.

12. The system of claim 5, wherein the layer 2 communication platform is further configured to update a protocol for establishing communication between the first layer 2 network and the second layer 2 network in response to detecting a change of a data format associated with the second layer 2 network.

13. The system of claim 5, further comprising a plurality of external layer 2 networks communicatively coupled with the first layer 2 network.

14. The system of claim 5, wherein the first layer 2 network and the second layer 2 network are hosted by different organizations.

15. The system of claim 5, wherein the layer 1 blockchain is associated with Bitcoin or Ethereum transactions.

16. The system of claim 5, wherein the first layer 2 network includes an internal oracle; and wherein layer 2 communication platform identifies the second layer 2 network by using the internal oracle.

17. The system of claim 5, wherein the first layer 2 solution is a first type of layer 2 solution and the second layer 2 solution is a second type of layer 2 solution.

18. The system of claim 17, wherein the first layer 2 solution is a sidechain and the second layer 2 solution is a rollup.

19. The system of claim 5, wherein the first layer 2 network is associated with a first entity and wherein the second layer 2 network is associated with a second entity different from the first entity.

* * * * *